United States Patent [19]

Jang

[11] Patent Number: 5,888,169
[45] Date of Patent: Mar. 30, 1999

[54] HYDRAULIC CONTROL SYSTEM FOR AUTOMATIC TRANSMISSIONS USED IN VEHICLES

[75] Inventor: Jaeduck Jang, Kyungki-do, Rep. of Korea

[73] Assignee: Hyundai Motor Company, Seoul, Rep. of Korea

[21] Appl. No.: 943,278

[22] Filed: Oct. 3, 1997

[30] Foreign Application Priority Data

Oct. 15, 1996 [KR] Rep. of Korea .................. 1996-45878

[51] Int. Cl.⁶ .................................................. F16H 61/26
[52] U.S. Cl. ........................... 477/130; 477/62; 477/131; 477/158; 477/906; 475/128
[58] Field of Search .................... 477/130, 131, 477/62, 158, 906; 475/128, 131, 134

[56] References Cited

U.S. PATENT DOCUMENTS

| | | | |
|---|---|---|---|
| 4,896,568 | 1/1990 | Gierer | 477/906 X |
| 5,669,853 | 9/1997 | Jang | 477/130 X |
| 5,674,152 | 10/1997 | Lee | 477/131 |
| 5,690,574 | 11/1997 | Jang | 475/128 |

*Primary Examiner*—Charles A. Marmor
*Assistant Examiner*—Sherry Lynn Estremsky

[57] ABSTRACT

The hydraulic control system for an automatic transmission having a plurality of friction elements includes a pressure regulator which regulates hydraulic pressure produced by an oil pump, a plurality of valves selectively supplying hydraulic pressure to the plurality of friction elements, and a pressure controller controlling and selectively supplying hydraulic pressure to a plurality of pressure control lines operationally connected to the plurality of valves and at least one of the plurality of valves. The plurality of valves include a first valve operationally controlled by hydraulic pressure in a first one of the pressure control lines to pass the hydraulic pressure output by the pressure controller to at least one of the plurality of friction elements in each operational range except a first speed stage of a drive range. A second valve is operationally controlled by hydraulic pressure in a second one and third one of the pressure control lines to selectively pass the hydraulic pressure output from the first valve to a first and second friction element in the drive range. A control switch valve in the plurality of valves is operationally controlled by a fourth one of the pressure control lines to selectively supply hydraulic pressure from at least one of the first and second pressure control lines and the first valve to the second friction element in second, third and fourth speed stages of the drive range, and to a third friction element in the third and fourth speed stages, of the drive range.

12 Claims, 53 Drawing Sheets

Engine RPMs

A First Solenoid Valve

A Second Solenoid Valve

A Third Solenoid Valve Duty (%)

Shift Starting — Shift Completion

Engine RPMs

Shift Startig Point

A First Solenoid Valve

A Second Solenoid Valve

A Third Solenoid Valve Duty (%)

Shift Starting    Kick-down Switch Off    Shift Completion

Engine RPMs

Shift Starting Poiint

A First Solenoid Valve

A Second Solenoid Valve

A Third Solenoid Valve Duty (%)

Shift Starting     Shift Completion

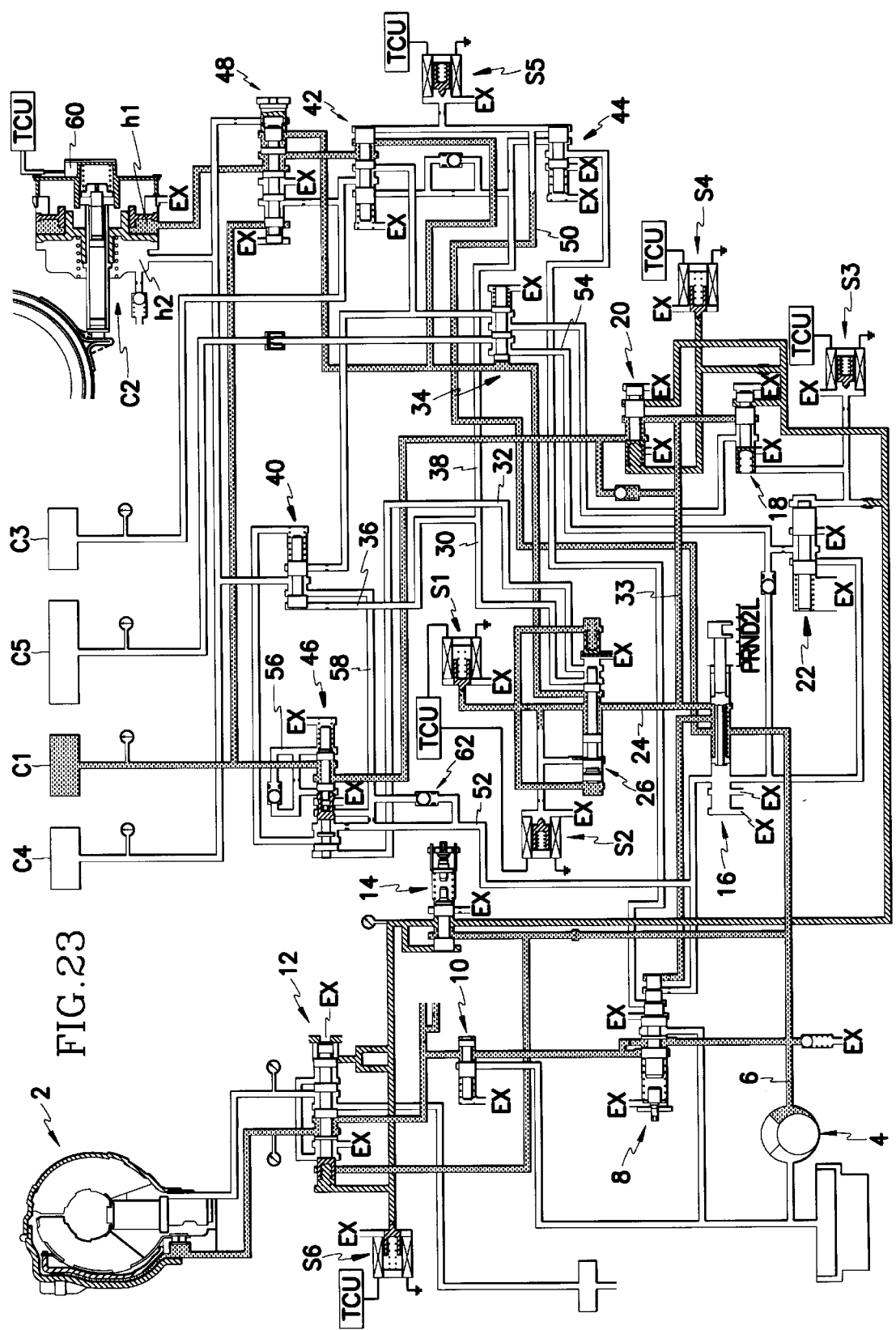

Engine RPMs

Shift Starting Point — Time

A First Solenoid Valve

A Second Solenoid Valve

A Third Solenoid Valve Duty (%)

Shift Starting

Engine RPMs

Shift Starting Point

A First Solenoid Valve

A Second Solenoid Valve

A Third Solenoid Valve Duty (%)

Shift Starting

Engine RPMs

Shift Starting Point → Time

A First Solenoid Valve

→ Time

A Second Solenoid Valve

→ Time

A Third Solenoid Valve Duty (%)

Shift Starting → Time

Engine RPMs

Shift Starting Point → Time

A First Solenoid Valve

→ Time

A Second Solenoid Valve

→ Time

A Third Solenoid Valve Duty (%)

Shift Starting

→ Time

HYDRAULIC CONTROL SYSTEM FOR AUTOMATIC TRANSMISSIONS USED IN VEHICLES

BACKGROUND OF THE INVENTION

The present invention relates to a hydraulic control system for automatic transmissions used in vehicles.

Generally, a conventional automatic transmission for a vehicle includes a torque convertor, a multi-stage gear shift mechanism, and a plurality of friction elements, actuated by hydraulic pressure and which select a gear range of the gear shift mechanism according to a driving state of a vehicle.

A hydraulic control system. for automatic transmissions used in vehicles operates by the selection of friction elements using hydraulic pressure, created in a hydraulic pump, which passes through a control valve. As a result, shifting can be realized automatically, and an appropriate driving state of the vehicle is achieved.

The above hydraulic control system includes a pressure regulator, which regulates hydraulic pressure created in a hydraulic pump; manual and automatic shift controllers, which control shifting; a hydraulic controller, which controls shift quality and shift response for a smooth shift; a damper clutch controller, for operation of a torque convertor damper clutch; and hydraulic pressure distributer, which supplies an appropriate amount of hydraulic pressure to each of the friction elements.

In the hydraulic control system structured as above, through the ON/OFF and duty control of solenoid valves by a transmission control unit, the hydraulic pressure distributer changes the hydraulic distribution and thus friction elements to be operated so as to control the shifting between shift stages.

However, when controlling shifting from the present shift stage to a different shift stage in the above hydraulic control system, the timing required to release hydraulic pressure operating on the present friction element and to supply hydraulic pressure to a new friction element greatly influences shift quality. Also, in the prior art hydraulic control system, engine rpms can quickly increase, the shift mechanism can become interlocked, and the engine can briefly enter a neutral state.

To improve shift quality by controlling the timing of supplying hydraulic pressure, the prior art changes a structure of the shift valves. But this change results in the drawback of complicating the shift valve structure, and if an ECU malfunctions, fail-safe functions can only operate for one shift stage.

SUMMARY

One object of the present invention is to overcome the drawbacks and problems discussed above.

It is another object of the present invention to improve the durability of friction elements and shift quality by reducing centrifugal force and shift shock created in the shift process.

A further object of the present invention is to improve responsiveness when skip shifting.

A still further object of the present invention is to make line pressure control easy by independently controlling line pressure.

Also, an object of the present invention is to improve stability by preventing a temporary slip into a neutral state in the shift process through the inclusion of fail-safe functions in all driving ranges, and to allow the measuring of the amount of transmission oil even in a parking range.

These and other objects are achieved by providing a hydraulic control system for an automatic transmission having a plurality of friction elements, comprising: pressure regulating means for regulating hydraulic pressure produced by an oil pump; a plurality of valves selectively supplying hydraulic pressure to said plurality of friction elements; pressure control means for controlling and selectively supplying said regulated hydraulic pressure to a plurality of pressure control lines and at least one of said plurality of valves, said pressure control lines being operationally connected to said plurality of valves; said plurality of valves including, a first valve operationally controlled by hydraulic pressure in a first one of said pressure control lines to pass said hydraulic pressure output by said pressure control means to at least one of said plurality of friction elements in each operational range except a first speed stage of a drive range, a second valve operationally controlled by hydraulic pressure in a second one and third one of said pressure control lines to selectively pass said hydraulic pressure output from said first valve to a first and second friction element in said drive range, and a control switch valve operationally controlled by a fourth one of said pressure control lines to selectively supply hydraulic pressure from at least one of said first and second pressure control lines and said first valve to said second friction element in second, third and fourth speed stages of said drive range, and to a third friction element in said third and fourth speed stages of said drive range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further objects and other advantages of the present invention will become apparent from the following description in conjunction with the attached drawings, in which:

FIG. 23 is a view illustrating a state in which hydraulic pressure flows in the second speed after down-shifting from the fourth speed stage to the second speed stage in the drive "D" range;

FIGS. 2GA–26G are operational state views and hydraulic pressure graphs of when down-shifting from the fourth speed stage to the second speed stage in a power OFF state;

DESCRIPTION OF THE PREFERRED EMBODIMENTS

Preferred embodiments of the present invention will now be described in detail with reference to the accompanying drawings.

Figure 1:
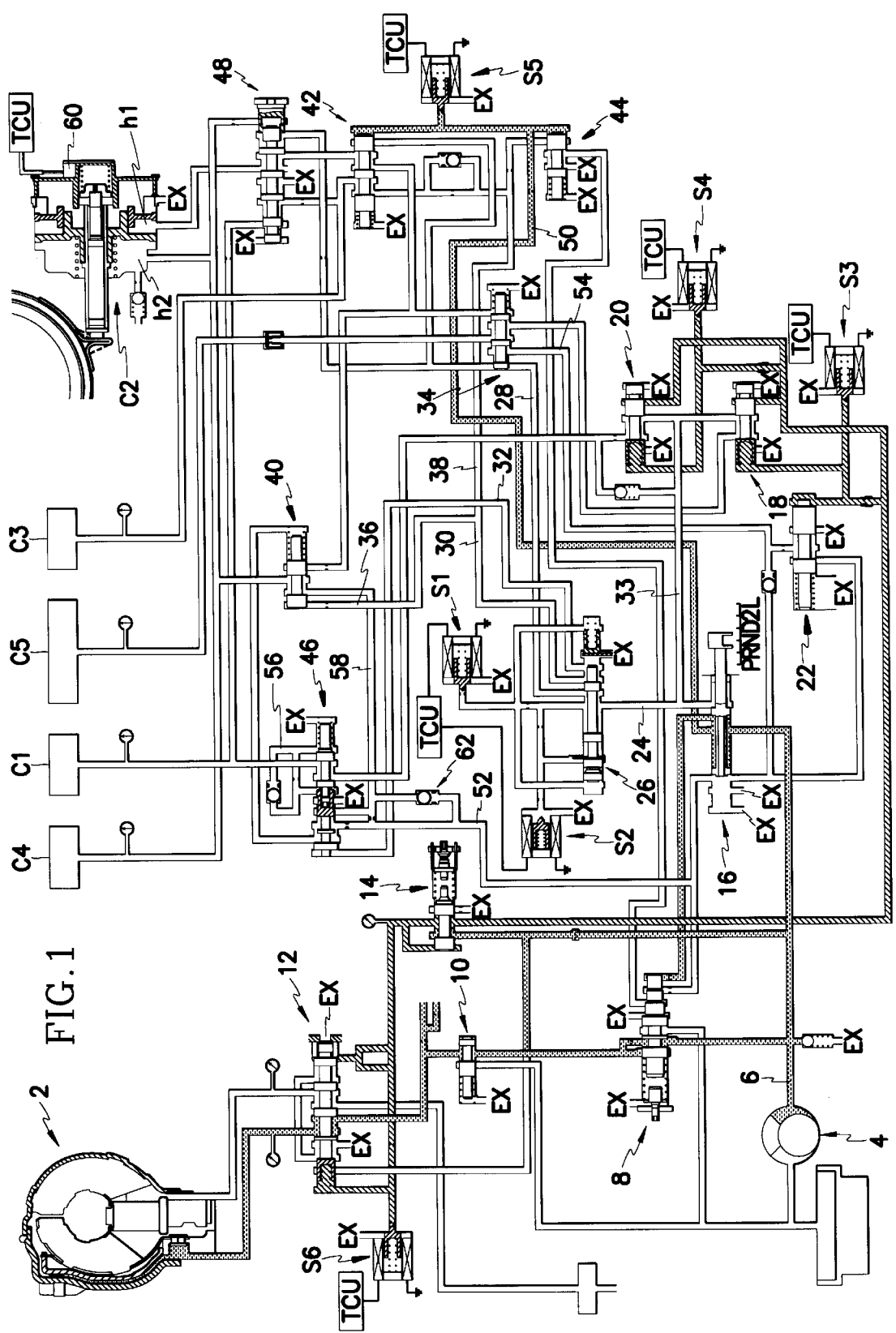
FIG. 1 is a view illustrating a hydraulic pressure flow state in a neutral "N" range of a hydraulic control system of the present invention.

FIG. 1 shows a hydraulic control system according to the present invention when a shift lever is in a neutral "N" range.

The hydraulic control system includes a torque convertor 2, which receives power from an engine and converts and transmits this power, and an oil pump 4, which creates and discharges oil pressure needed for controlling the shift stages of the automatic transmission and needed by the torque convertor 2 for operation and lubrication.

A pressure regulator valve 8, which makes the pressure created in the oil pump 4 constant, a torque convertor control valve 10, which controls the pressure of oil at a fixed level for the torque convertor 2, and a damper clutch control valve 12, for increasing power transmission efficiency of the torque convertor 2, are all connected on a line 6, through which oil pressure created in the oil pump 4 flows; and comprise the pressure regulator and the damper clutch controller.

The line 6 is structured such that part of the oil pressure produced in the oil pump 4 is supplied to a reducing valve 14, which continuously maintains hydraulic pressure at a level lower than the line pressure, and to a manual valve 16, which changes the lines through which hydraulic pressure passes. The manual valve 16 operates according to the position of a shift lever, located in a driver's compartment next to a driver's seat, actuated by a driver.

Also, the pressure, reduced in the reducing valve 14, is supplied to a first pressure control valve 18 and a second pressure control valve 20, and used as control pressure for the shift stages.

In addition, lines are formed connecting the manual valve 16, the first pressure control valve 18, and the second pressure control valve 20 to an N-R control valve 22, which reduces shift shock, when part of the hydraulic pressure supplied to the first and second pressure control valves 18 and 20 changes modes from a neutral "N" range to a reverse "R" range.

The manual valve 16 is connected to a line 24, through which hydraulic pressure flows, and communicates via the line 24 with a shift control valve 26, which changes lines for the hydraulic pressure to pass through by the operation of a first solenoid valve S1 and a second solenoid valve S2.

Further, a first speed line 33 is connected to the above line 24 to allow the supply of line pressure from the first and second pressure control valves 18 and 20. The first and second pressure control valves 18 and 20 are formed to allow line conversion by the third and fourth solenoid valves S3 and S4. The first pressure control valve 18 allows for control pressure to be supplied to friction elements when shifting, and the second pressure control valve 20 enables the supply of drive pressure to a first friction element C1.

A second speed line 28, a third speed line 30 and a fourth speed line 32 are connected to the shift control valve 26 to enable the supply of control pressure to shift valves, forming a hydraulic pressure distributer, for control of each of the shift stages.

The second speed line 28 of the shift control valve 26 supplies hydraulic pressure to a left-side port of a 1-2 shift valve 34 and controls the same.

The third speed line 30 is divided into two separate branch lines 36 and 38. The first branch line 36 is connected to a left-side port of a 2-3/4-3 shift valve 40 and controls the same. The second branch line 38 is further divided such that the one division is connected to the control switch valve 42 and the other to a high-low pressure valve 44.

The fourth speed line 32 communicates with a left side port of a rear clutch release valve 46 and a right side end of the 2-3/4-3 shift valve 40, and controls the two valves 46 and 40.

Also, a fail-safe valve 48 is mounted between part of the valves of the hydraulic pressure distributor and at least two friction elements (e.g., first and fourth friction elements C1 and C4 as shown in FIG. 1). The fail-safe valve 48 performs fail-safe functions with respect to an ideal shift stage when a transmission control unit (TCU) is not operating or when sticking occurs in the valves which form the hydraulic pressure distributor.

In addition, a timing control line 50 is connected to the manual valve 16, and first speed pressure, flowing through this line, is able to be used as control pressure by the control switch valve 42. The flow of the first speed pressure is controlled by a fifth solenoid valve S5 mounted on the timing control line 50.

Further, the present invention is structured such that when the manual valve 16 is in the reverse "R" range, hydraulic pressure supplied to a reverse first control line 52 is supplied to a fourth friction element C4 through the rear clutch release valve 46 and the 2-3/4-3 shift valve 40. At the same time, hydraulic pressure supplied to a reverse second control line 54 is supplied to a fifth friction element CS, operating as a reactive force element in the reverse shift stage, by passing through the 1-2 shift valve 34.

In the above, part of the hydraulic pressure supplied to the fourth friction element C4 is simultaneously supplied to a release side chamber h2 of the second friction element C2.

With regard to the valves forming the hydraulic pressure distributor, the lines are structured such that the 1-2 shift valve 34 is controlled by second speed pressure of the shift control valve 26, and control pressure controlled by the first pressure control valve 18 is supplied to an operational side chamber h1 of the second friction element C2, operating as a reactive force element of a second speed stage. The hydraulic pressure flowing through the reverse second control line 54 is supplied to the fifth friction element C5.

The above 1-2 shift valve 34 is realized through a port, which receives second speed pressure from the shift control valve 26 in forward-moving 2, 3, 4 speed shift stages and supplies this pressure to the control switch valve 42 and the fail-safe valve 48; a port, which receives control hydraulic pressure from the first pressure control valve 18 of the hydraulic pressure control means; a port, receiving reverse pressure from the manual valve 16 in the reverse shift stage; a port, which supplies control pressure, supplied from the first pressure control valve 18, to the 2-3/4-3 shift valve 40 and the control switch valve 42, and which selectively supplies hydraulic pressure to the friction elements C2, C3, and C4 that are connected to the above valves 40 and 42; and a port, which supplies said control pressure and reverse pressure to the fifth friction element C5.

Further, the 2-3/4-3 shift valve 40 is controlled by the third and fourth speed pressure, and selectively supplies the hydraulic pressure supplied from the 1-2 shift valve 34 and the rear clutch release valve 46 in the reverse shift stage to the release side chamber h2 of the second friction element C2 and the fourth friction element C4.

The above 2-3/4-3 shift valve 40 is realized through a port, connected to the third speed line 30; a port, connected to the fourth speed line 32 through the rear clutch release valve 46; a port, which communicates with the 1-2 shift valve 34; a port, communicating with the reverse first control valve 52, which passes through the rear clutch release valve 46; and a port, communicating with the release side chamber h2 of the second friction element C2 and the fourth friction element C4.

The control switch valve 42 is controlled by the fifth solenoid valve S5, receives second and third speed line pressure from the shift control valve 26 and control pressure from the first pressure control valve 18, which flows through the 1-2 shift valve 34, and either supplies or releases these pressures to the operational side chamber h1 of the second friction element C2 and the third friction element C3.

The control switch valve 42 is realized through a right side port, which receives control pressure from the timing control line 50 connected to the manual valve 16; a port, which receives both control pressure of the first pressure control valve 18 passing through the 1-2 shift valve 34, and drive pressure from the second third speed lines 28 and 30 of the shift control valve 26; and a port, which selectively supplies hydraulic pressure received from the above ports to the fail-safe valve 48 and the third friction element C3. The above port receiving hydraulic pressure from the manual valve 16 is structured such that it is controlled by the fifth solenoid valve S5.

The high-low pressure valve 44 is controlled to receive hydraulic pressure, by the "OFF" operation of the fifth solenoid valve S5, from the timing control line 52, and is able to change line pressure by supplying this hydraulic pressure to the pressure regulator valve 8 in the third and fourth speed stages.

To perform the above, the high-low pressure valve 44 is provided with a port, communicating with the timing control line 50; a port, which receives third speed pressure by communicating with the third speed line 30; and a port, supplying third speed pressure, received as in the above, to the pressure regulator valve 8.

The rear clutch release valve 46 is controlled by the fourth speed pressure of the shift control valve 26 and the hydraulic pressure supplied from the second pressure control valve 20 in first, second, and third speed stages, and supplies hydraulic pressure to the first friction element C1. When shifting from the third speed to the fourth speed, the hydraulic pressure supplied to the first friction element C1 is discharged directly, and when shifting from the third speed to the fourth speed and from the third speed to the second speed, the hydraulic pressure supplied to the release side chamber h2 of the second friction element C2 and the fourth friction element C4 passes through the 2-3/4-3 shift valve 40, the reverse first control line 54 and is discharged through the manual valve 16.

To accomplish the above, the above rear clutch release valve 46 is provided with a port, which receives hydraulic pressure from the fourth speed line 32 and supplies this to the 2-3/4-3 shift valve 40; a port, communicating with the second pressure control valve 20; two ports, one of which is connected to the reverse first control line 52 and the other to the 2-3/3-4 shift valve 40; and ports, connected via a circulation line 56 having a check valve therein, for circulating hydraulic pressure to left and right sides of the port that supplies hydraulic pressure to the first friction element C1.

The formation of the above two ports communicating with the reverse first control line 52 is done for the purpose of communicating the 2-3/4-3 shift valve 40 with a branch line 58, separated from the reverse first control line 52, and for communicating a separate line, formed from the branch line 58, to a port of the reverse first control line 52. A check valve 62 is mounted between the branch line 58 and the reverse first control line 52. The check valve 62 is able to control the hydraulic pressure returning in this space.

The fail-safe valve 48, used as a safety means, prevents an interlock state, caused by a delay in operation of the third and first friction elements C3 and C1 when the TCU malfunctions while driving in first, second, and third speeds. The fail-safe valve 48 is able to perform the function of holding the first speed when sticking occurs in the 1-2 shift valve 34.

For this purpose, the fail-safe valve 48 is comprised of two ports supplying part of the hydraulic pressure to the first and fourth friction element C1 and C4, respectively; a port, connected with the second speed line 28 of the shift control valve 48; two ports, respectively receiving the control pressure of the first pressure control valve 18 from the control switch valve 42 and third speed pressure; and a port, which supplies the above control pressure and third speed pressure to the operational side chamber hi of the second friction element C2.

As a result, if a malfunction occurs while driving in first, second, or third speeds, the valve spools are automatically maintained in leftward states, hydraulic pressure is supplied to one of the friction elements operating in the third speed to maintain the vehicle in the third speed, and in this way, driving stability can be attained.

Also, a kick-down switch 60 is fixed to the operational side chamber h1 of the second friction element C2. The kick-down switch 60 is turned off when hydraulic pressure is being supplied to the operational side chamber h1, and turned on when being supplied to the release side chamber h2. The kick-down switch 60 is structured such that this signal is transmitted to the TCU.

A sixth solenoid valve S6, not yet described, controls the damper clutch valve 12 by either operating or terminating the operation of the damper clutch valve 12.

In the hydraulic control system of the present invention structured as in the above and as shown in FIG. 1, the hydraulic pressure discharged from the oil pump 4 in the neutral "N" range (see manual valve 16) is adjusted to a fixed level by the pressure regulator valve 8, and after being reduced by passing through the reducing valve 14, it is supplied to the damper clutch valve 12 and to the first and second pressure control valves 18 and 20.

Here, the third and fourth solenoid valves S3 and S4, duty controlled by the TCU, are controlled to "OFF" states, and their pressure control valve spools are moved to the left (in the drawing).

Further, the hydraulic pressure supplied to the timing control line 50 through the manual valve 16 operates on the control switch valve 42 and the high-low pressure valve 44 by the "OFF" control of the fifth solenoid valve S5, and the valve spools are maintained in leftward states (in the drawing), realizing a neutral "N" state.

Figure 2:
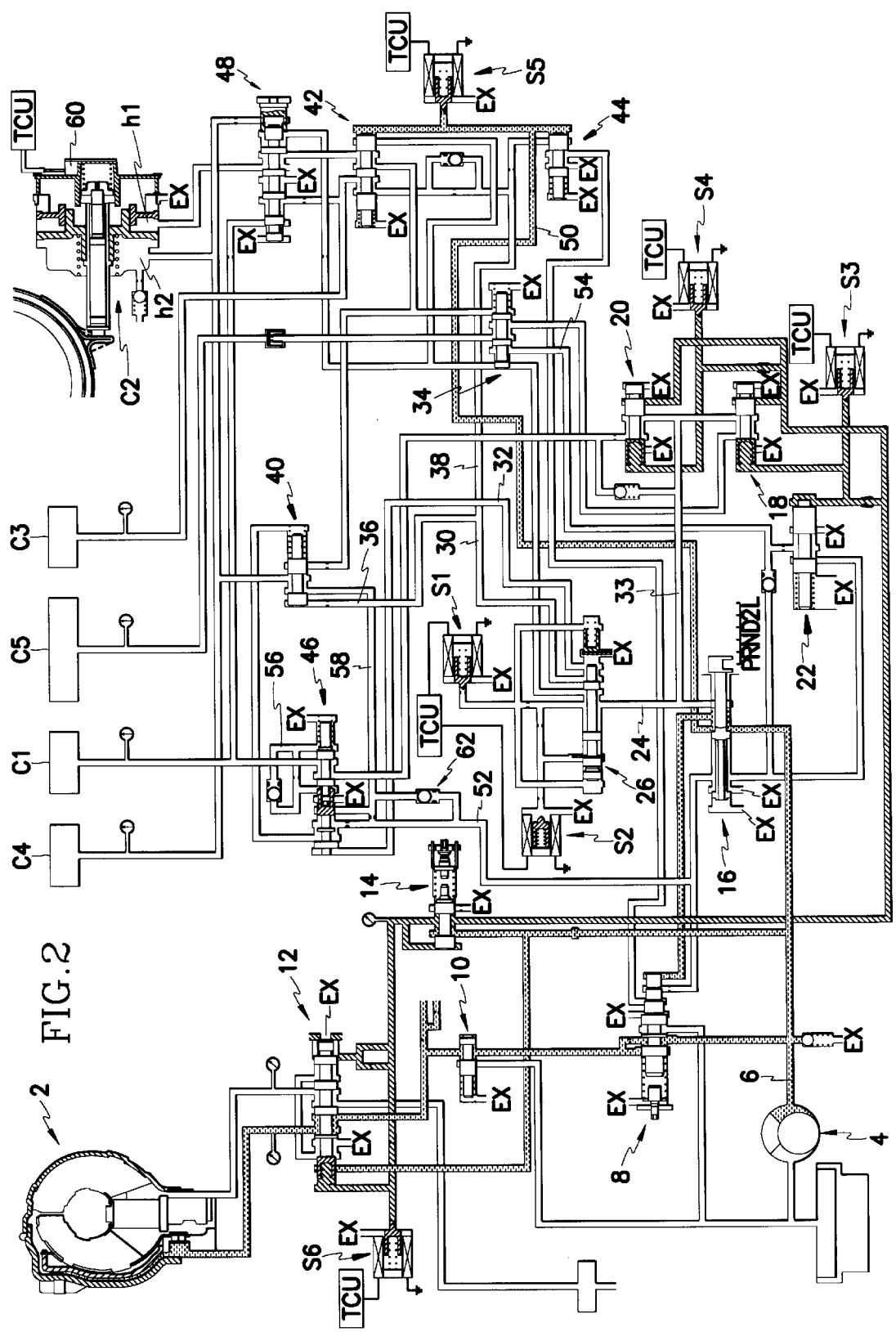
FIG. 2 is a view illustrating a state in which hydraulic pressure flows in a parking "P" range of a hydraulic control system of the present invention.

Also, in the parking "P" range (see manual valve 16) as shown in FIG. 2, the same hydraulic pressure operating in the neutral "N" range is used, and a power train portion is fixed by the operation of a separate parking device to maintain the parking "P" state.

The supply of the same hydraulic pressure for the parking "P" range as is used in the neutral "N" range is done for the purpose of allowing the driver to conveniently check the oil level in the parking "P" range, and for allowing the supply of a sufficient amount of lubrication oil to the torque convertor 2.

Figure 3:
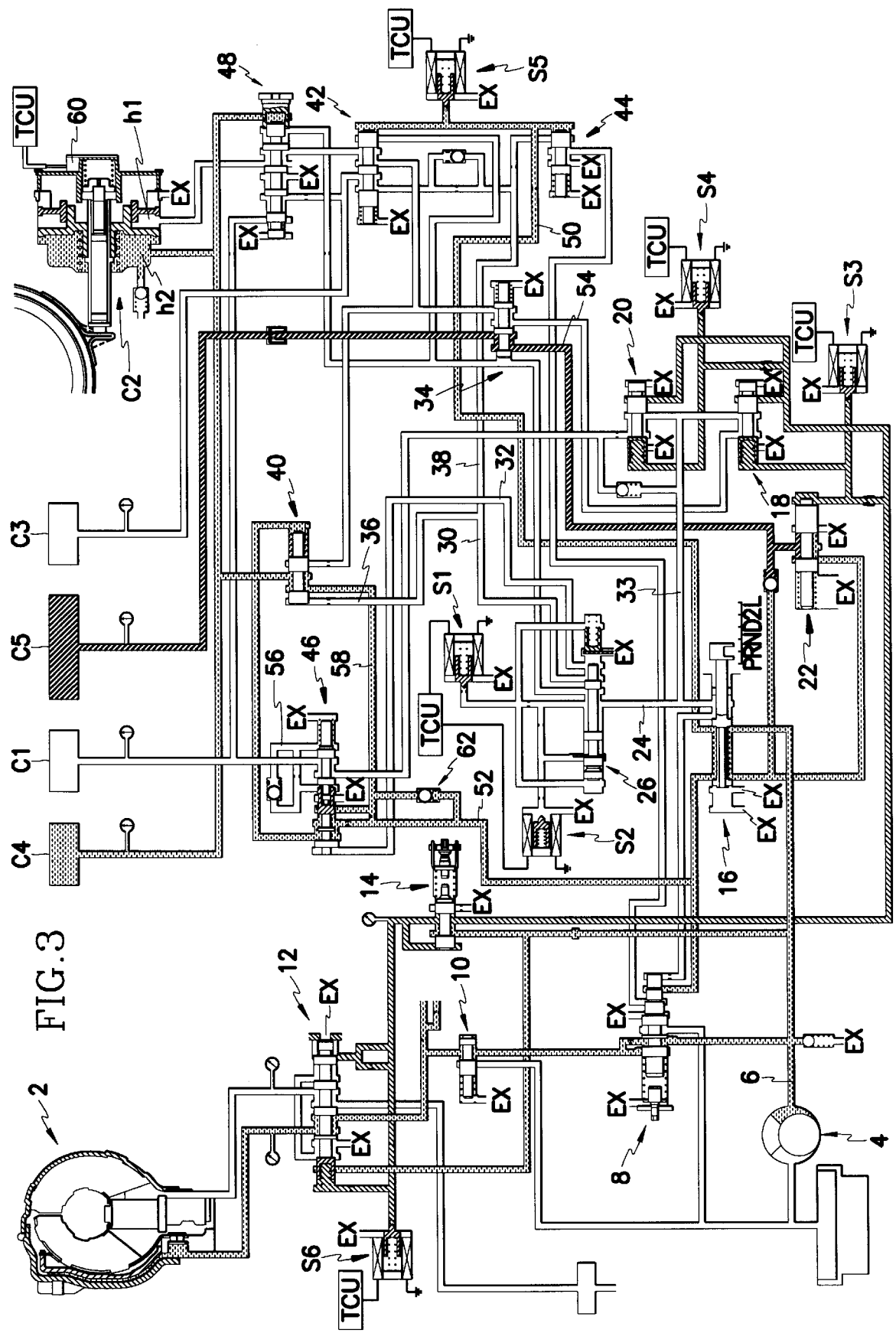
FIG. 3 is a view illustrating a hydraulic pressure flow state when manually shifting from a neutral "N" range to a reverse "R" range of a hydraulic control system of the present invention.

FIG. 3 is a view illustrating a hydraulic pressure flow state when shifting from a neutral "N" range to a reverse "R" range. Here, the hydraulic pressure from the manual valve 16 is directly supplied to the release side chamber h2 of the second friction element C2 and to the fourth friction element C4 by passing through the reverse first control line 52, rear clutch release valve 46, and the 2-3/4-3 shift valve 40.

Also, part of the hydraulic pressure supplied to the manual valve 16 is controlled in the N-R control valve 22 by the duty control of the third solenoid valve S3, and through the reverse second control line 54, it is supplied to the 1-2 shift valve 34, moving a valve spool of the 1-2 shift valve 34 to the right (in the drawing). As a result, the hydraulic pressure is supplied to the fifth friction element C5 which operates as a reactive force element when driving in reverse.

Figure 4:
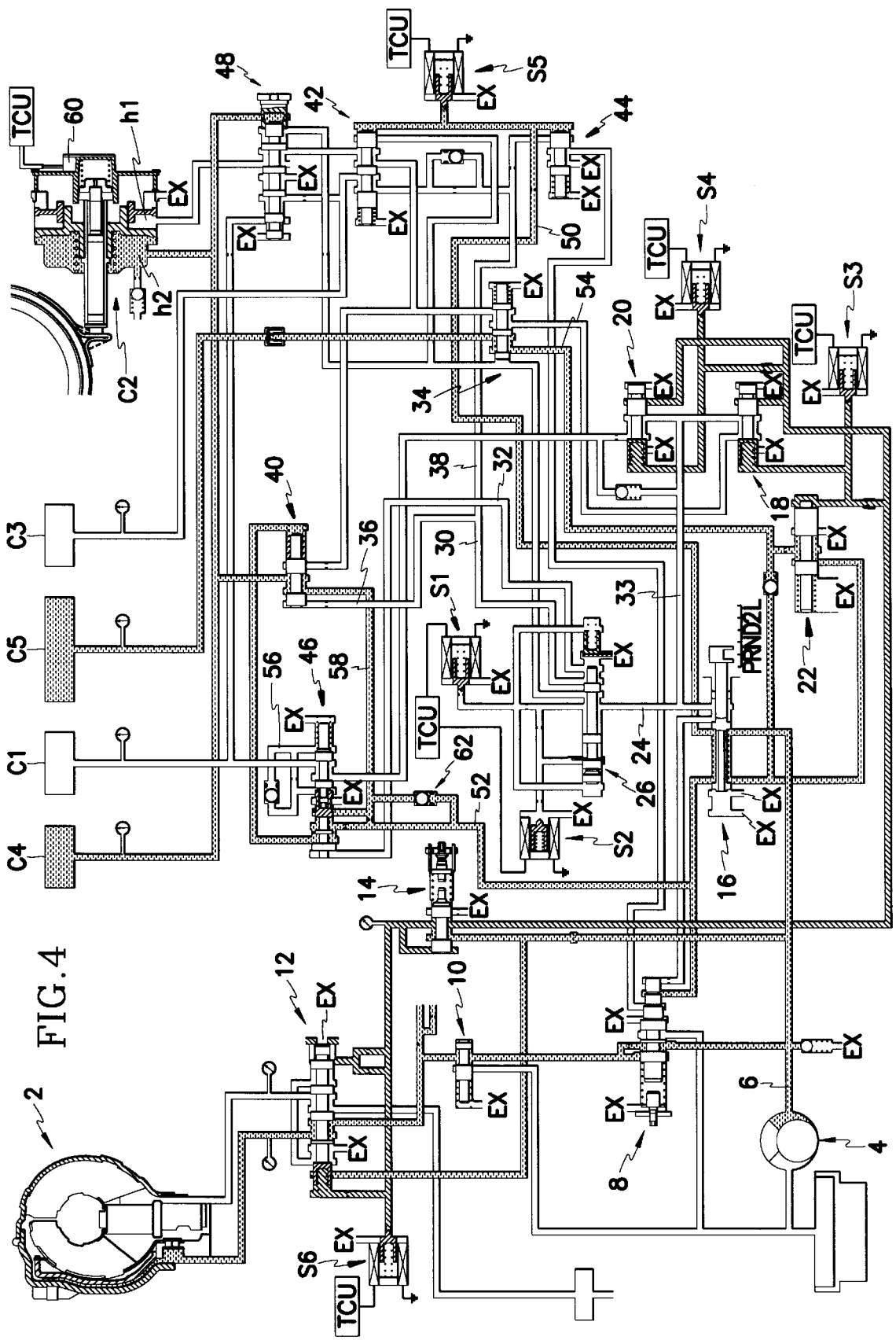
FIG. 4 is a view illustrating a state in which hydraulic pressure flows in a reverse "R" range of a hydraulic control system of the present invention.

After the hydraulic pressure is supplied through the lines as in the above, the third solenoid valve S3 is turned "OFF," and the hydraulic pressure that was supplied to the fifth friction element C5 is changed from control pressure to drive pressure as shown in FIG. 4, and reverse shifting is completed.

As is illustrated in FIGS. 5B, 5C, 5E and 5F, in the process of shifting from the neutral "N" range to the reverse "R" range as in the above, the first solenoid valve S1, the fourth solenoid valve S4, and the fifth solenoid valve S5 are maintained in OFF states while the second solenoid valve S2 is maintained in an ON state.

Figure 5A:
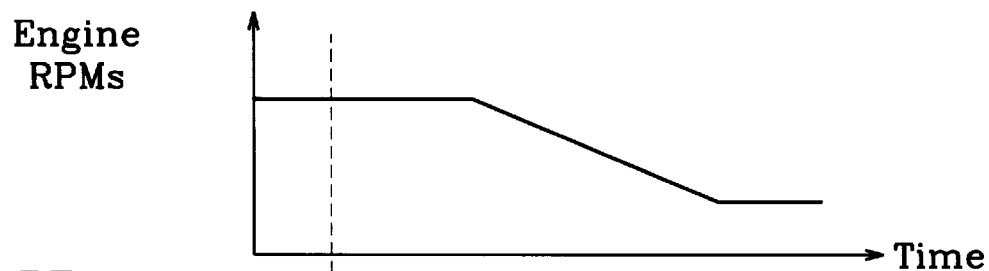
FIGS. 5A–5G are operational state views and hydraulic pressure graphs of when manually shifting from a neutral "N" range to a reverse "R" range of a hydraulic control system of the present invention.
Figure 5B:
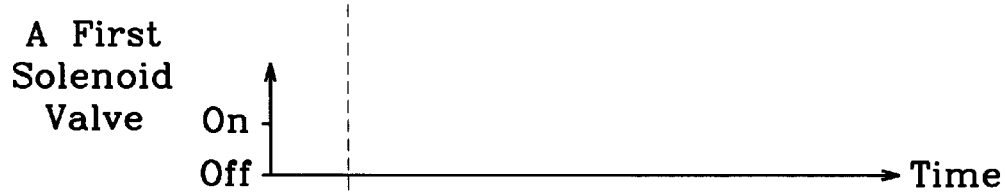
Figure 5C:
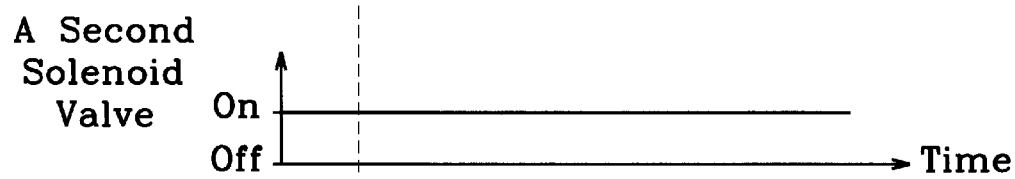
Figure 5D:
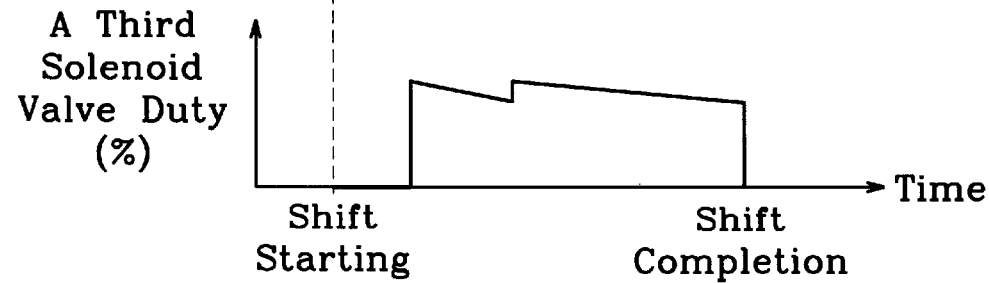
Figure 5E:
Figure 5F:
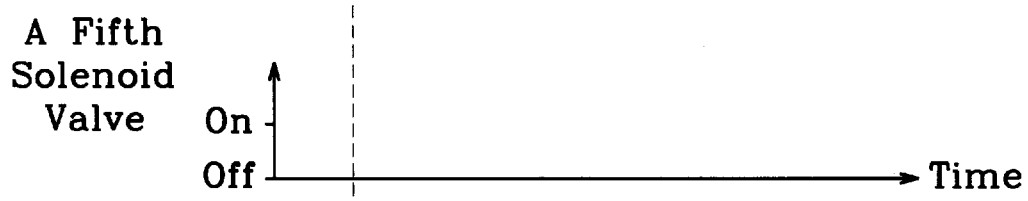

Also, as shown in FIG. 5D, the duty ratio of the third solenoid valve S3 is delayed for a fixed period of time at the beginning of shifting then controlled to a maximum duty ratio (100%). It is slowly reduced for a fixed period, then controlled to increase again, after which the duty ratio is again reduced until the point where shifting is completed and it is discontinued (0%).

Figure 5G:
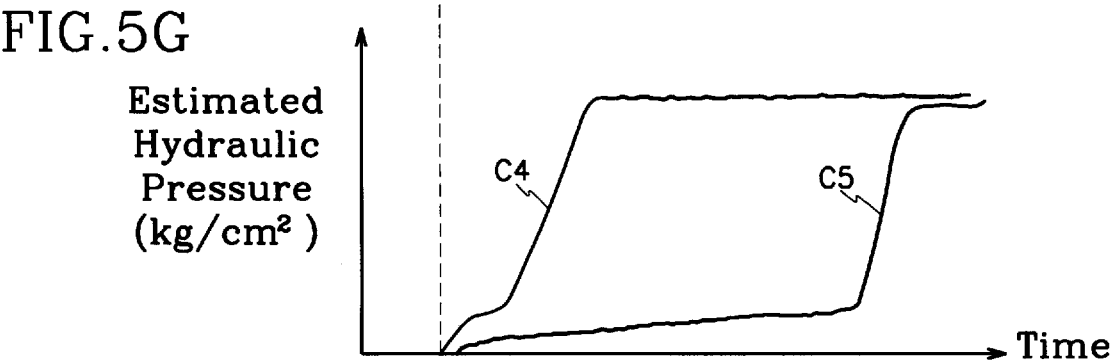

The hydraulic pressure of the friction elements operating in the reverse "R" shift range is shown in FIG. 5G. As shown in the drawing, the hydraulic pressure supplied to the fourth friction element C4 slowly increases at the beginning of shifting, and starting from when duty control begins, it sharply increases, levels off, and then remains at this high level until the end of shifting. The hydraulic pressure supplied to the fifth friction element S5, to which control pressure controlled by the third solenoid valve S3 is supplied, slowly increases until the shift completion point where it sharply increases. FIG. 5A illustrates the change in engine rpm during the shifting operation.

Figure 6:
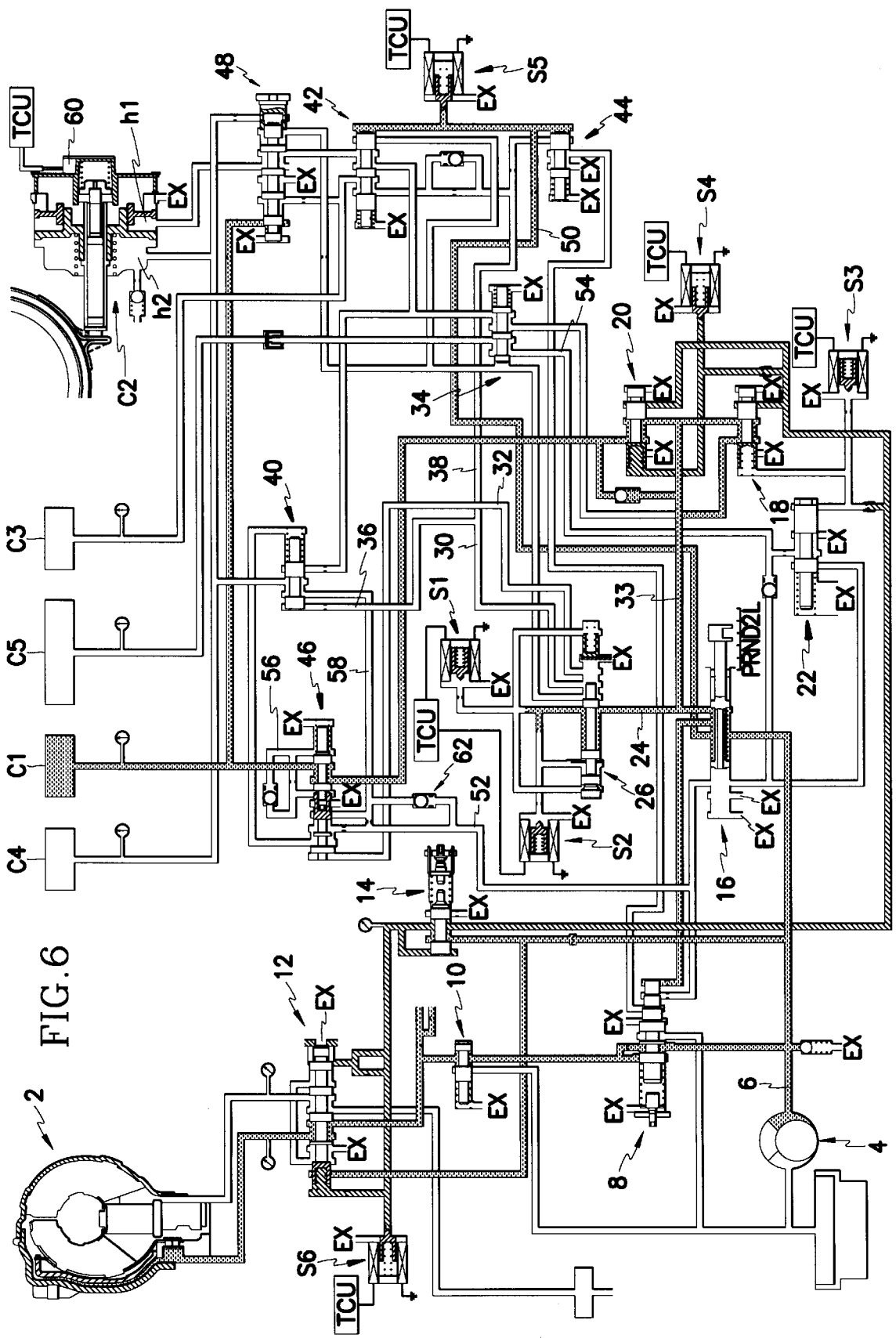
FIG. 6 is a view illustrating a state in which hydraulic pressure flows in a first speed stage of a drive "D" range of a hydraulic control system of the present invention.

When shifting the select lever from a neutral "N" state to a drive "D" state, as is shown in FIG. 6, part of the hydraulic pressure supplied to the manual valve 16 is supplied to the shift control valve 26 and the first and second pressure control valves 18 and 20.

At this time, the first and second solenoid valves S1 and S2 are controlled to "ON" states, and the ports of the shift control valve 26 are maintained in their initial states.

In the above state, the hydraulic pressure supplied from the first speed line 33 is cut off as the third solenoid valve S3 is controlled to an "ON" state, and the hydraulic pressure supplied to the first and second pressure control valves 18 and 20 is supplied to the first friction element C1, operating as an input element in the first speed stage, via the rear clutch release valve 46 after passing through the second pressure control valve 20.

Figure 7:
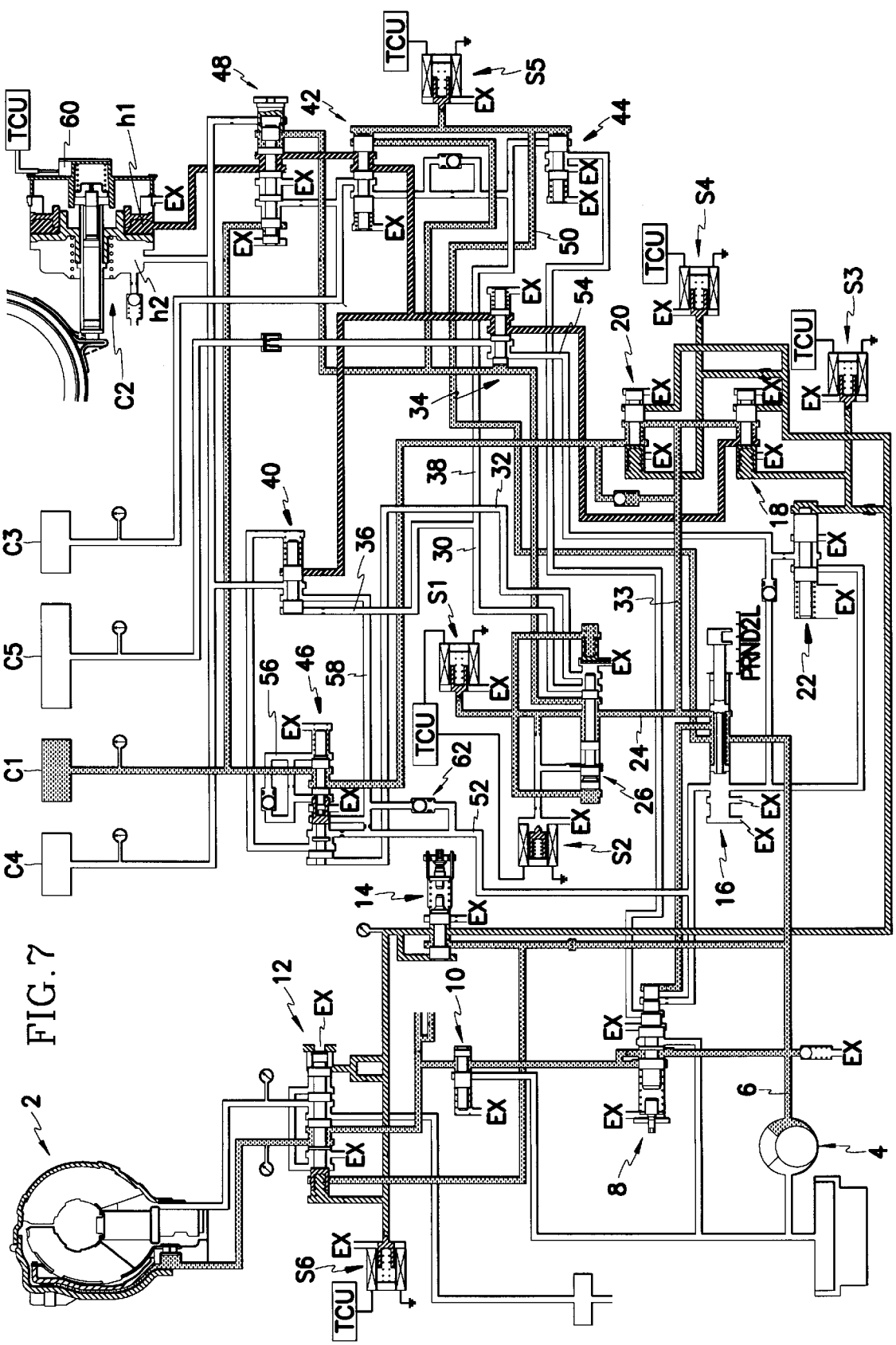
FIG. 7 is a view illustrating a state in which hydraulic pressure flows when up-shifting from the first speed stage to a second speed stage in the drive "D" range of a hydraulic control system of the present invention.

In this first speed stage, if an opening degree of a throttle valve (not shown) is increased (to increase car speed), shifting is performed to the second speed. To accomplish this, as shown in FIG. 7, the TCU controls the first solenoid valve S1 to an "OFF" state from an "ON" state, and the hydraulic pressure supplied to the shift control valve 26 is supplied to the second speed line 28.

When this occurs, this second speed pressure is supplied to the left-side port of the 1-2 shift valve 34, moving its valve spool to the right (in the drawing), and, at the same time, the pressure is supplied to and remains at the control switch valve 42 and the fail-safe valve 48.

In the above state, the third solenoid valve S3 is duty controlled to allow control of the hydraulic pressure supplied from the first speed line 33 in the first pressure control valve 18. This control pressure passes through the 1-2 shift valve 34 and is supplied to the operational side chamber h1 of the second friction element C2 via the control switch valve 42 and the fail-safe valve 48. For ease of illustration, however, FIG. 7 illustrates the third solenoid valve S3 in the "OFF" state.

Here, part of the hydraulic pressure passing through the 1-2 shift valve 34 is supplied to the 2-3/4-3 shift valve 40 and remains at this location.

Figure 8:
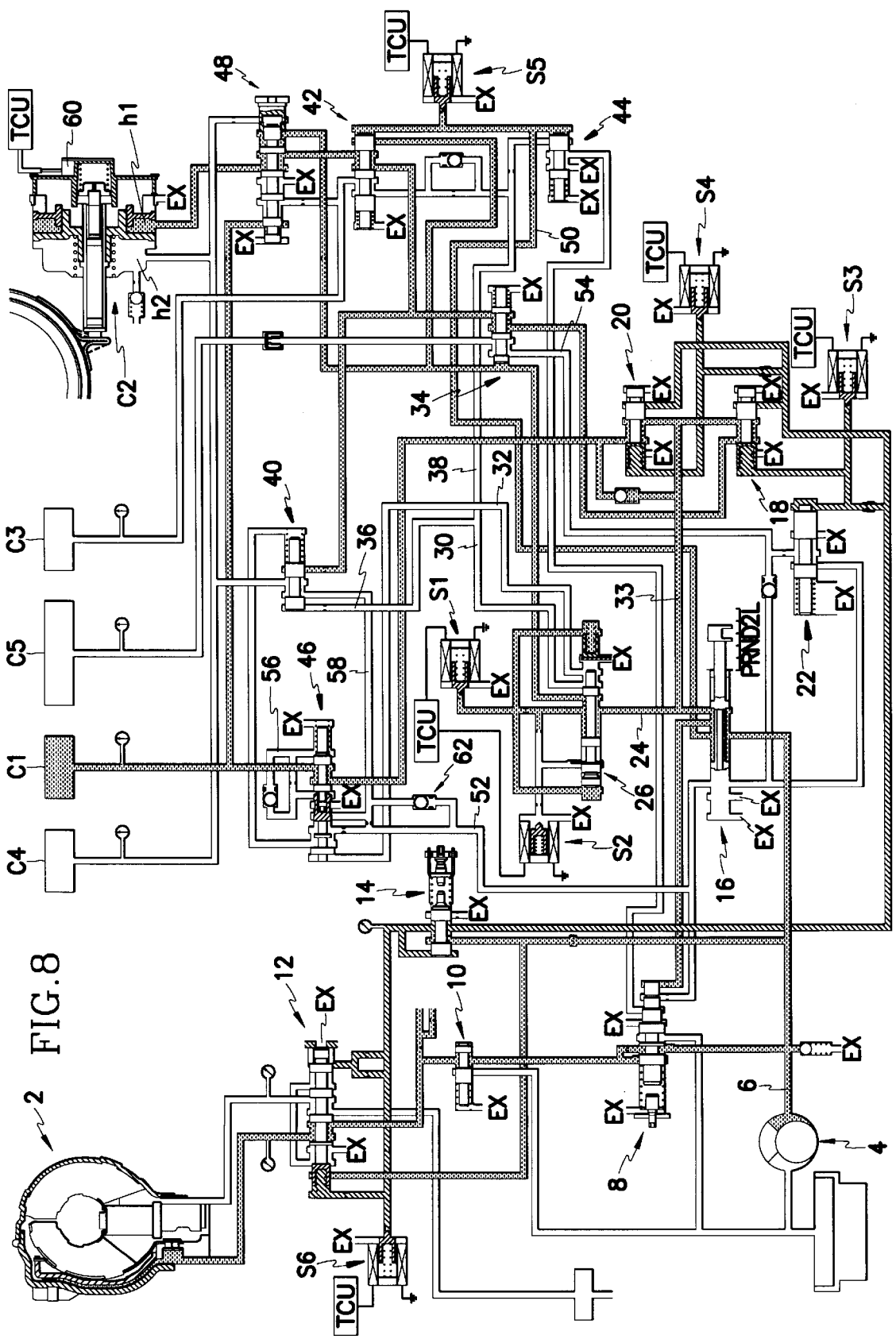
FIG. 8 is a view illustrating a state in which hydraulic pressure flows in the second speed stage of the drive "D" range of a hydraulic control system of the present invention.

In this state, where shifting is completed, as is shown in FIG. 8, if the third solenoid valve S3 is controlled to "OFF," the pressure supplied to the operational side chamber h1 of the second friction element C2 is converted to second speed line pressure from control pressure, and second speed control is completed.

Figure 9A:
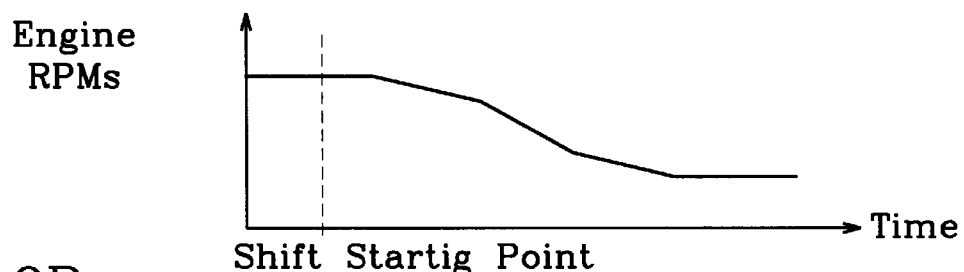
FIGS. 9A–9G are operational state views and hydraulic pressure graphs of when up-shifting from the first speed stage to the second speed stage in a power ON state.
Figure 9B:
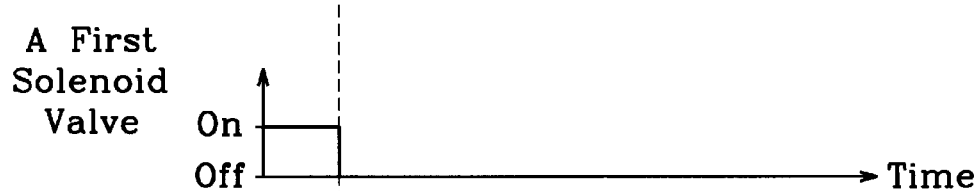
Figure 9C:
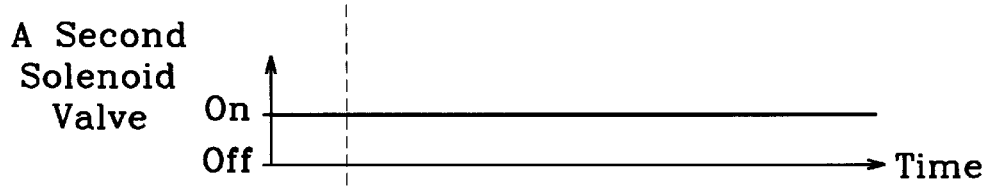

Referring to FIGS. 9A–9G, the operation of each solenoid valve during shifting from the first speed stage to second speed stage in a power "ON" state is illustrated. The first solenoid valve S1, as shown in FIG. 9B, is maintained in an "ON" state and then controlled to an "OFF" state at the point when shifting is started, while the second solenoid valve S2, as shown in FIG. 9C, is continually maintained in an "ON" state.

Figure 9D:
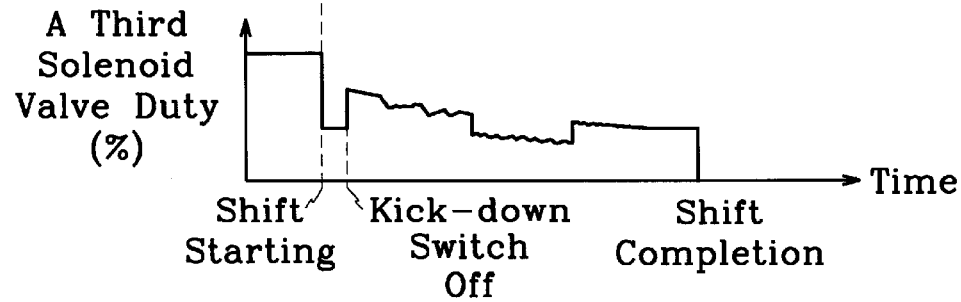

At the same time, as shown in FIG. 9D, the third solenoid valve S3 is maintained having a maximum duty ratio (100%) before and up to the beginning of shifting, and at the point where shifting begins, its duty ratio is immediately reduced and maintained in this low state for a brief period. It is then slightly increased and then slowly decreased from this increased state. At the middle point of shifting, the duty ratio is reduced, maintained, increased again, maintained, and finally discontinued (0%) at the end point of shifting.

Figure 9E:
Figure 9F:
Figure 9G:
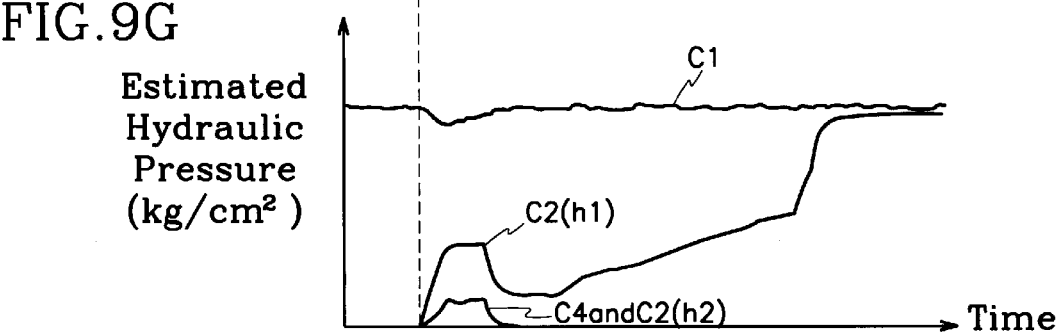
Figure 10A:
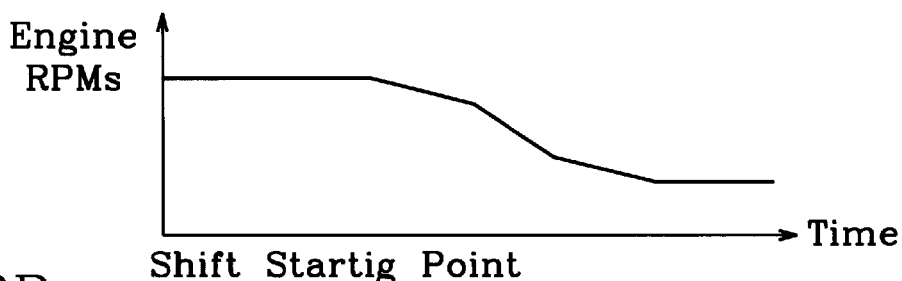
FIGS. 10A to 10G are operational state views and hydraulic pressure graphs of each solenoid valve when up-shifting from the first speed stage to the second speed stage in a power OFF state.
Figure 10B:
Figure 10C:
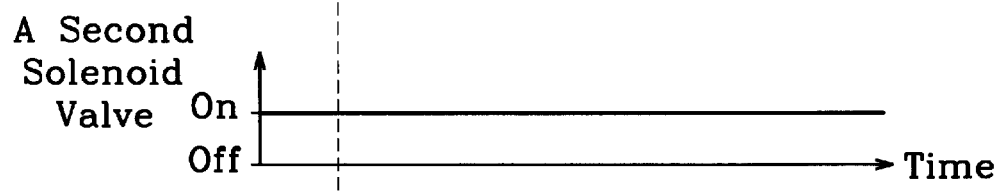
Figure 10D:
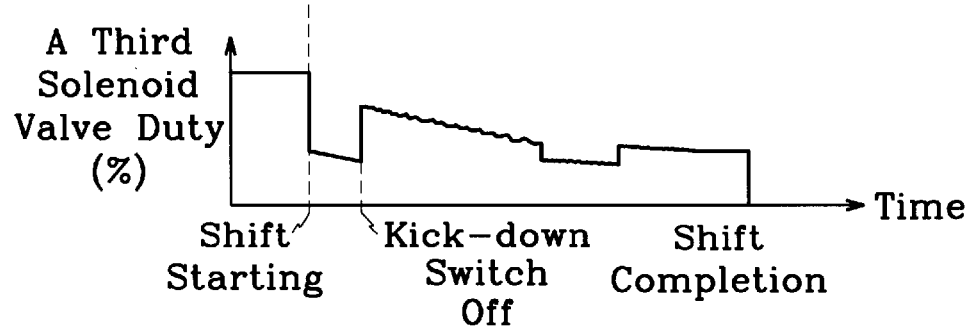
Figure 10E:
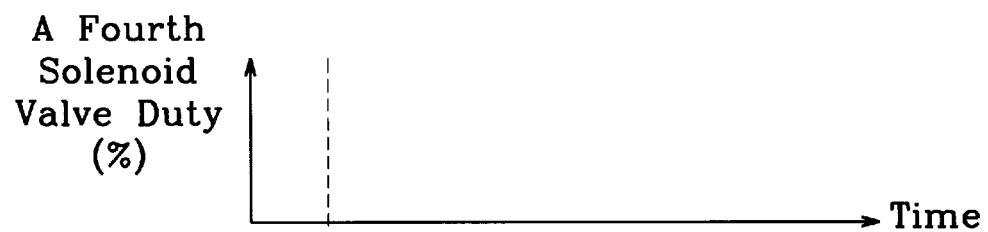
Figure 10F:
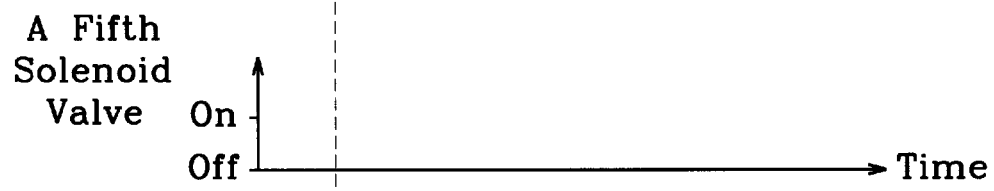
Figure 10G:
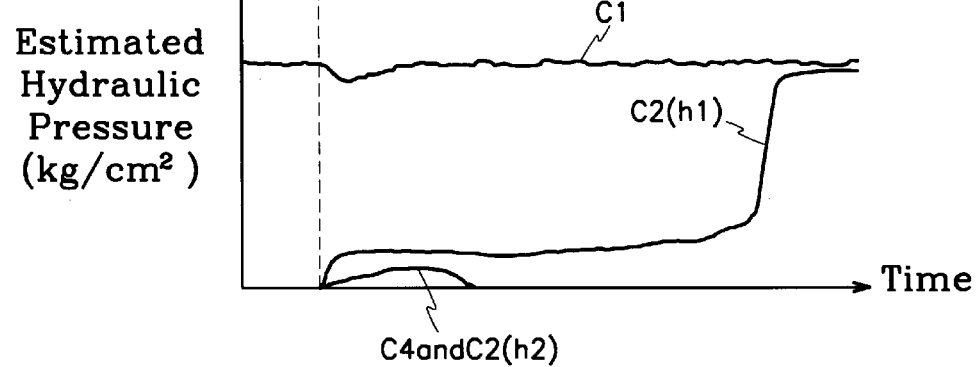

As can be seen in FIG. 9G, the hydraulic pressure of the operational side chamber h1 of the second friction element C2, dependent on the duty control of the third solenoid valve S3, is abruptly increased at the beginning of shifting, reduced after a predetermined time, and then slowly increased until the end of shifting.

Also, at the end period of shifting, if the third solenoid valve S3 is controlled to "OFF," second speed pressure is supplied and sharply increased, completing shifting into the second speed stage.

At this point, the hydraulic pressure supplied to the first friction element C1 is maintained at a fixed level as in the first speed stage, and the hydraulic pressure of the release side chamber h2 of the second friction element C2 and the fourth friction element C4 rises slightly in the beginning of shifting then is immediately cut off.

A graph of the turbine rpms of the torque convertor 2 is shown in FIG. 9A. As can be seen in the drawing, the turbine rpms of the torque convertor 2 are reduced in multiple steps according to the duty control of the third solenoid valve S3.

FIGS. 9E and 9F show that the fourth and fifth solenoid valves are maintained in the "OFF" state.

FIGS. 10A–10D, corresponding to FIGS. 9A–9D, illustrate the operation of the first-third solenoid valves S1–S3 during shifting from the first speed stage to the second speed stage in a power "OFF" state. Except for the following, control is done in the same manner as in the power "ON" state. First, so that the hydraulic pressure acting on the operational side chamber h1 of the second friction element C2 is slowly increased, the duty control of the third solenoid valve S3 is delayed slightly more than in the power "ON" state, and in the state where the duty ratio has been abruptly decreased, it is not maintained in this state but, rather, is slowly decreased for a fixed amount of time and increased again. Therefore, shifting is realized more slowly in the power "OFF" state than in the power "ON" state.

Figure 11:
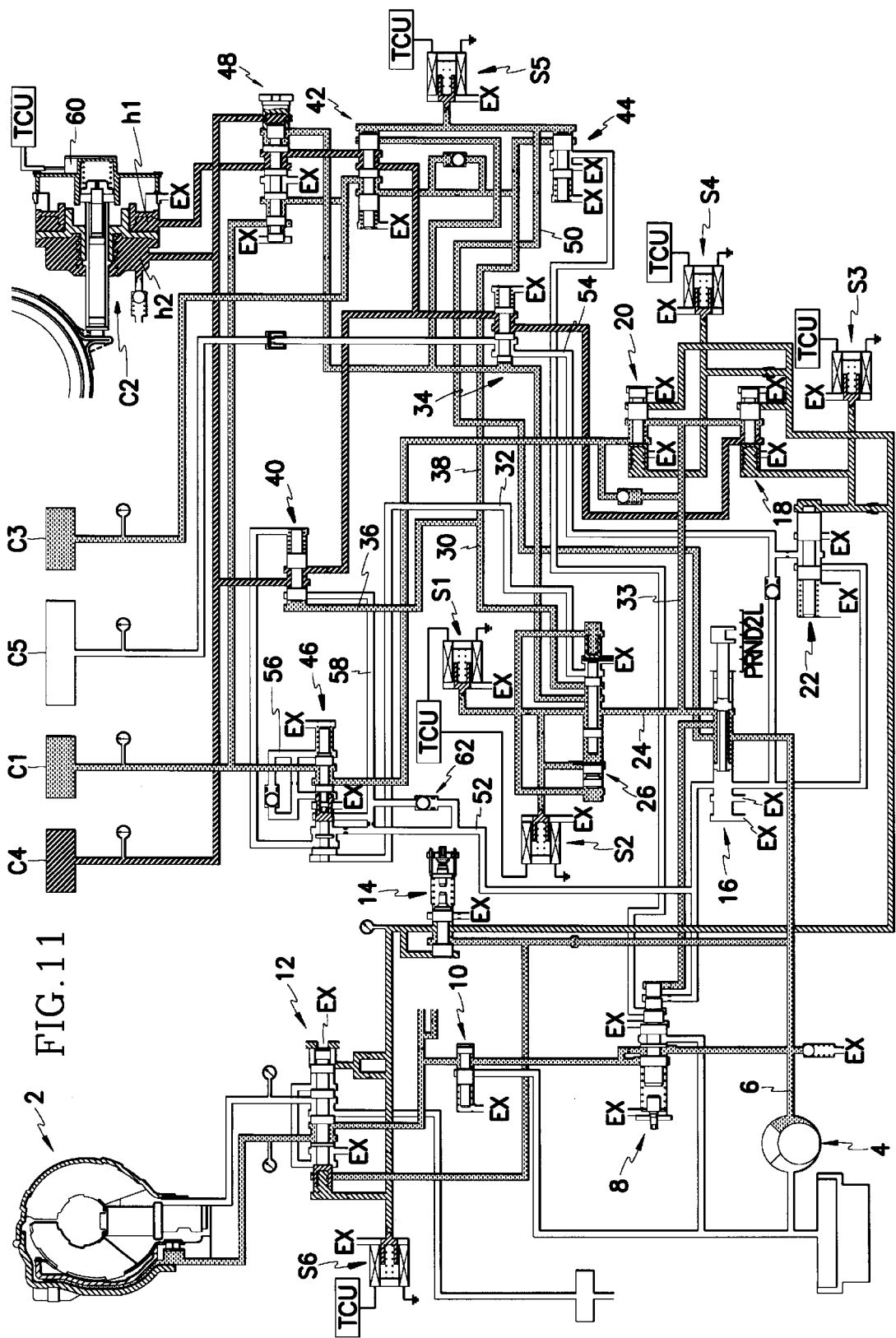
FIG. 11 is a view illustrating a state in which hydraulic pressure flows when up-shifting from the second speed stage to a third speed stage in the drive "D" range of a hydraulic control system of the present invention.

As shown in FIG. 11, in the second speed stage as discussed above, if the throttle valve is further opened, the first and second solenoid valves S1 and S2 are turned "OFF."

Through the above control, hydraulic pressure comes to flow through the second speed line 28 and the third speed line 30. When this occurs, the hydraulic pressure of the third speed line 30 flows into the left side port of the 2-3/4-3 shift valve 40 and its spool moves to the right (in the drawing). As a result, the pressure is supplied to the control switch valve 42.

Through the above, when controlling second speed, the hydraulic pressure standing by in the 2-3/4-3 shift valve 40 is supplied to the release side chamber h2 of the second friction element C2, stopping the operation of the second friction element C2 and, simultaneously, supplying control pressure to the fourth friction element C4.

Also, as a valve spool of the control switch valve 42 is maintained in a leftward position (in the drawing) by the "OFF" control of the fifth solenoid valve S5, the hydraulic pressure supplied to the operational side chamber h1 of the second friction element C2 is converted into control pressure, and, at the same time, third speed pressure is supplied to the third friction element C3.

In the above shift process, the hydraulic pressure supplied to the fourth friction element C4 and the operational side chamber h2 of the second friction element C2 by the duty control of the third solenoid valve S3 is also back-pressure controlled.

Figure 12:
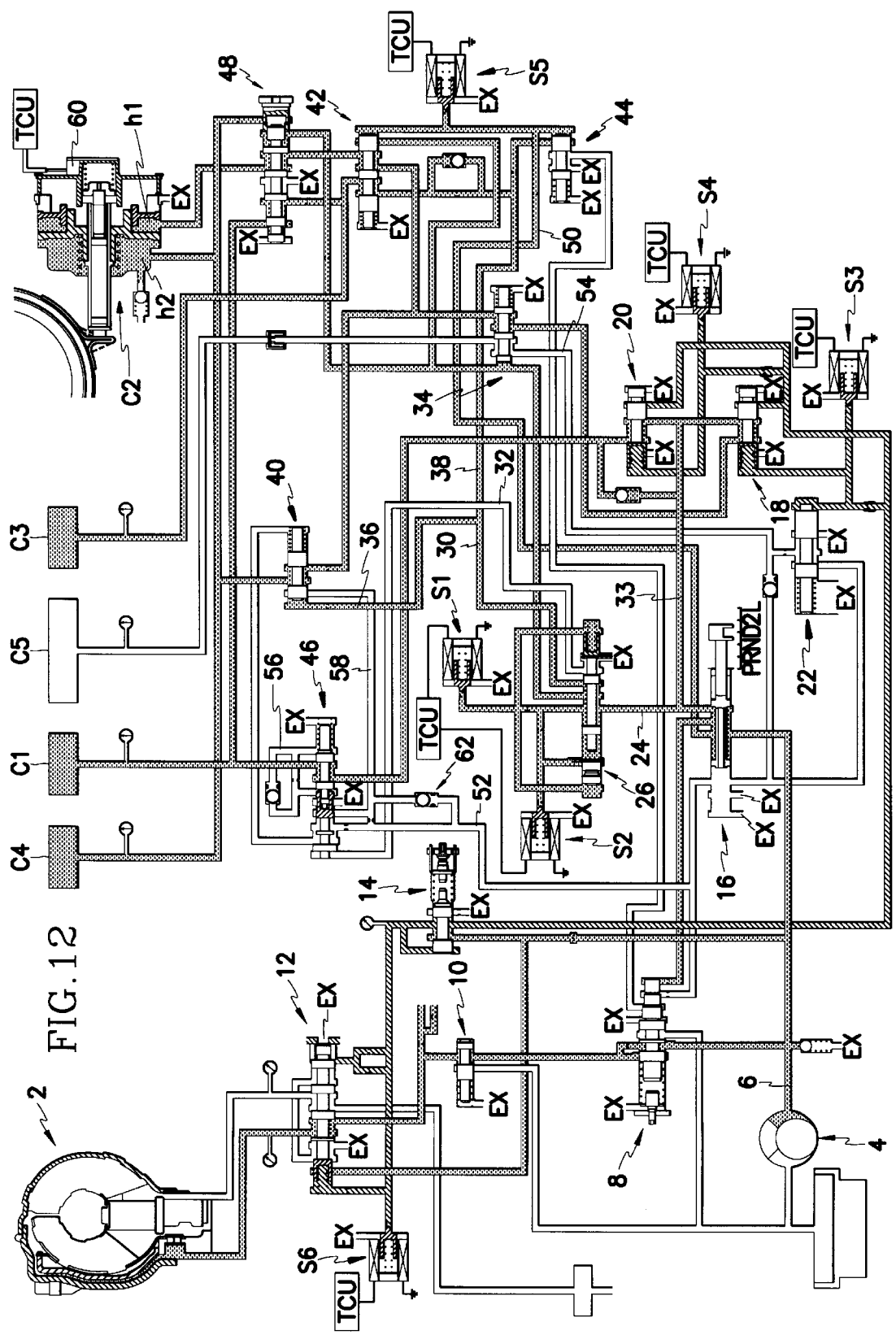
FIG. 12 is a view illustrating a hydraulic pressure flow state in the third speed stage of the drive "D" range of a hydraulic control system of the present invention.

In this state, as shown in FIG. 12, if the fifth solenoid valve S5, which has been controlled to an "OFF" state, is controlled to an "ON" state at an end period of shifting, valve spools of the control switch valve 42 and the high-low pressure valve 44 are moved rightward (in the drawing), and the pressure supplied to the operational side chamber h1 of the second friction element C2 is converted into second speed pressure. At the same time, part of the third speed line 30 pressure is supplied to the pressure regulator valve 8 through the high-low pressure valve 44 and line pressure is regulated.

Namely, the change of line pressure in the third speed is not realized during shifting from the second speed to the third speed but, instead, it begins its change when the valve spool of the high-low pressure valve 44 moves to the right (in the drawing) by the "ON" control of the fifth solenoid valve S5.

Also, the regulation of line pressure is done for the purpose of reducing possible drive damage to the oil pump 4 and to improve fuel efficiency when travelling at high speeds.

Figure 13A:
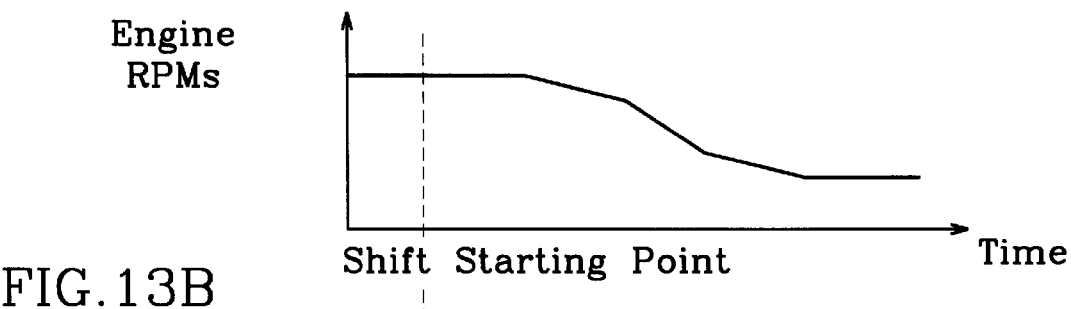
FIGS. 13A–13G are operational state views and hydraulic pressure graphs of when up-shifting from the second speed stage to the third speed stage in a power ON state.
Figure 13B:
Figure 13C:
Figure 13D:
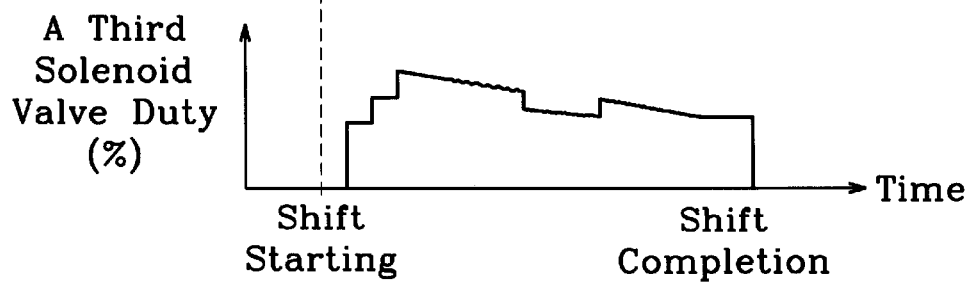
Figure 13E:
Figure 13F:
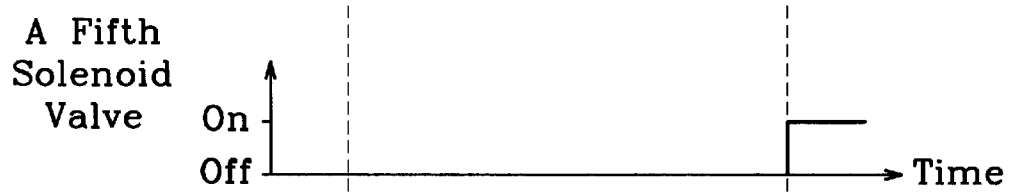

Referring now to FIGS. 13B and 13F which illustrate the operation of each solenoid valve in a power "ON" state, in the process of shifting from a second speed to a third speed, the first solenoid valve S1 is maintained in an "OFF" state as shown in FIG. 13B, the second solenoid valve S2 is maintained in an "ON" state until shifting starts where it is then controlled to an "OFF" state as shown in FIG. 13C, and the third solenoid valve S3 is duty controlled as shown in FIG. 13D.

As shown in FIG. 13D, the duty control of the third solenoid valve S3 is first delayed for a predetermined time at the beginning of shifting, and it is then increased in three increments until it reaches a maximum duty ratio (100%), after which the duty ratio is slowly decreased. In addition, during the shift process, the duty ratio is dropped, slowly decreased, increased, and then resumes its slow decrease until the end of the shift process where it is cut off completely.

As can be seen in FIG. 13E, the fourth solenoid valve S4 is maintained in an "OFF" state, while the fifth solenoid valve S5 is controlled to an "ON" state at the end of shifting, as shown in FIG. 13F, to change the line pressure.

Figure 13G:
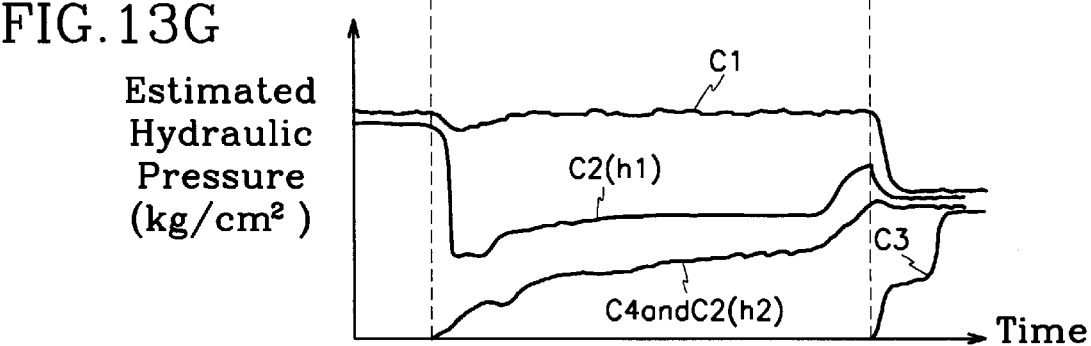

Referring now to FIG. 13G, which illustrates hydraulic pressure change of the friction elements operating in the shift process from the second speed stage to the third speed stage, the first friction element C1 maintains second speed hydraulic pressure until the end of shifting where it is slightly reduced; and the hydraulic pressure of the release side chamber h2 of the second friction element C2 is rapidly decreased at the beginning of shifting by the duty control of the third solenoid valve S3, slowly increased throughout the remainder of the shifting process until the end of shifting, where, it is increased more quickly and then again decreased slightly after completion of shifting. The hydraulic pressure of the fourth solenoid valve C4 and the release side chamber h2 of the second friction element C2, back-pressure controlled by the hydraulic pressure of the operational side chamber h1 of the second friction element C2, increases together with the above hydraulic pressure (see C4 and C2 in FIG. 13G). Finally, the hydraulic pressure of the third friction element C3 is supplied at the end of shifting, completing shifting from the second speed to the third speed. FIG. 13A illustrates the change in engine rpms during the shifting from the second speed stage to the third speed stage.

The drop in hydraulic pressure at the end of shifting as discussed above is done as a result of line pressure in the third speed stage changing to low pressure.

Figure 14A:
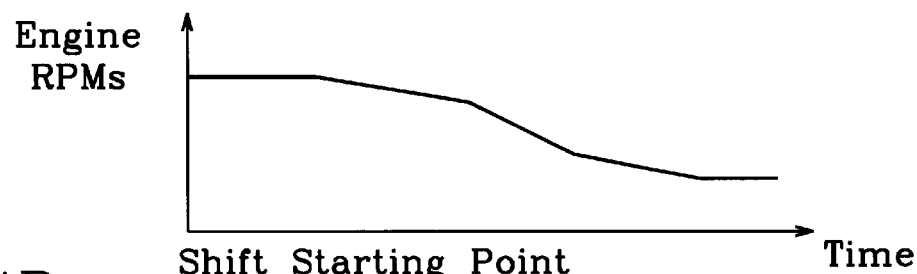
FIGS. 14A–14G are operational state views and hydraulic pressure graphs of when up-shifting from the second speed stage to the third speed stage in a power OFF state.
Figure 14B:
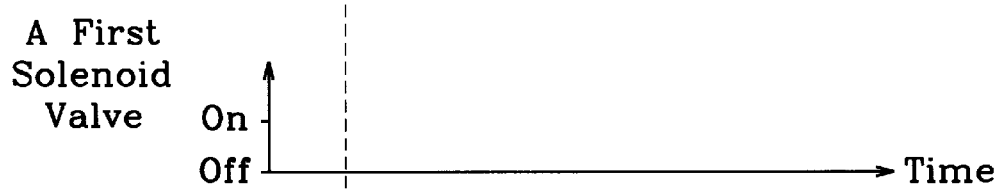
Figure 14C:
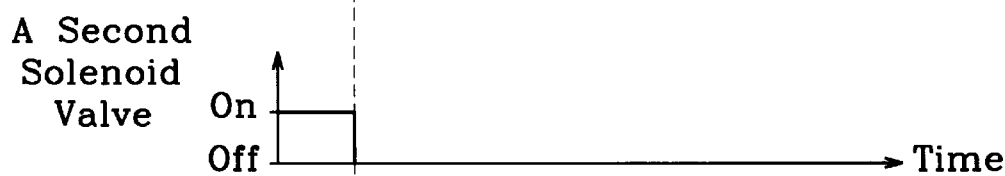
Figure 14D:
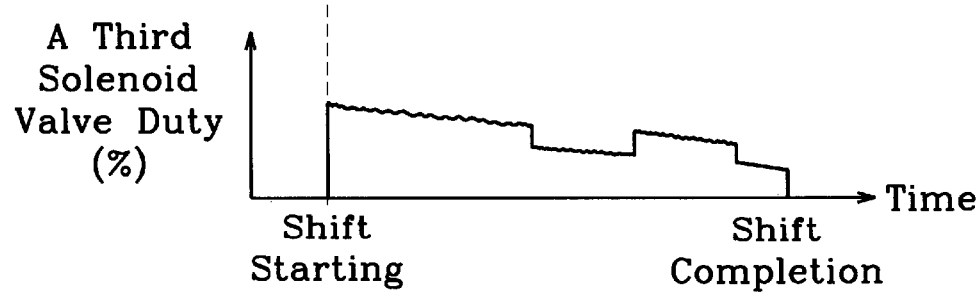
Figure 14E:
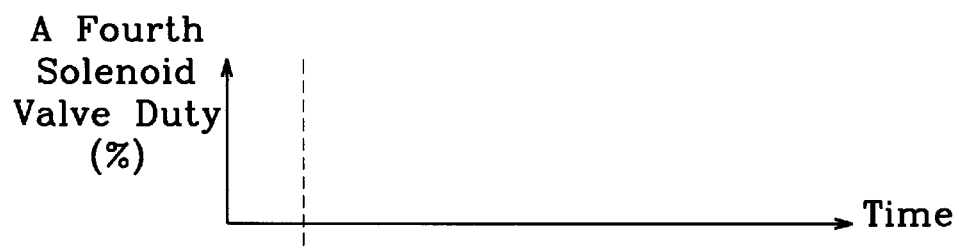
Figure 14F:

FIGS. 14B–14F illustrate the operation of each solenoid valve while shifting from the second speed stage to the third speed stage in a power "OFF" state. As shown in FIG. 14D, the third solenoid valve S3 is duty controlled such that when shifting is started, the duty ratio is controlled to a maximum duty ratio, and from this state, it is slowly reduced. At the end of shifting, the duty ratio of the third solenoid valve S3 is reduced twice.

Figure 14G:
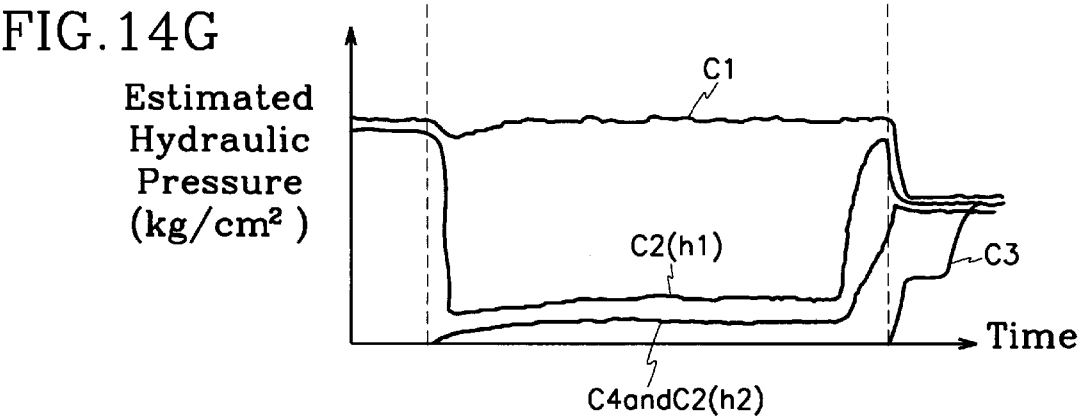

Referring to FIG. 14G, as a result of the above, the hydraulic pressure of the operational side chamber h1 of the second friction element C2 is abruptly reduced at the start of shifting, slowly increased, and after abruptly increasing at the end of shifting it is again decreased, releasing the operation of the second friction element C2. The hydraulic pressure of the release side chamber h2 of the second friction element C2 is controlled similarly with the above hydraulic pressure (albeit at a lower level) after its initial decrease. Shifting is realized in the power "OFF" state more slowly than in the power "ON" state.

FIG. 14A illustrates the change in engine rpms during the shift from the second speed stage to the first speed stage in the power "OFF" state.

Figure 15:
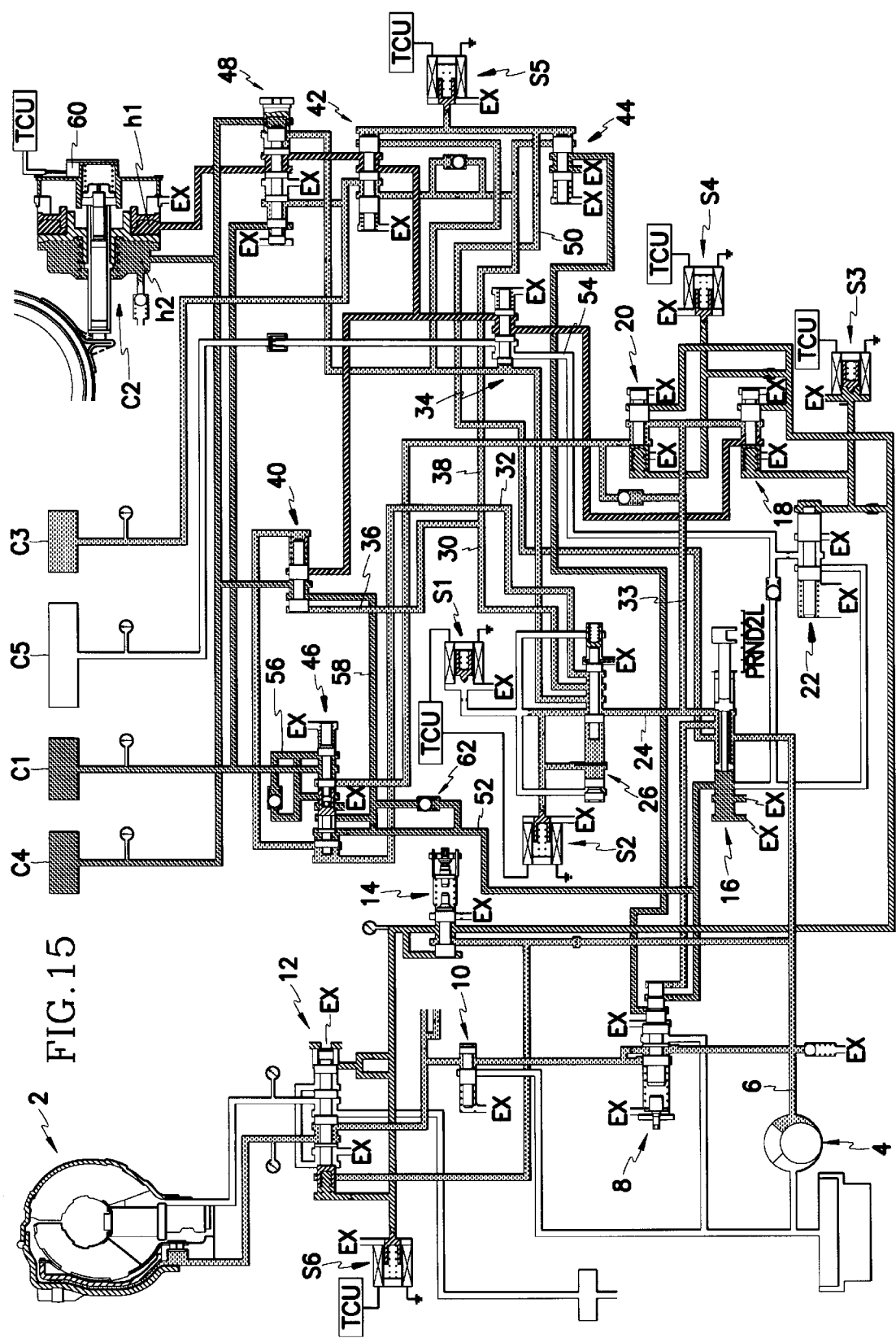
FIG. 15 is a view illustrating a state in which hydraulic pressure flows when up-shifting from the third speed stage to a fourth speed stage in the drive "D" range of a hydraulic control system of the present invention.

In the third speed stage as discussed above, if the throttle valve is further opened, the TCU, as shown in FIG. 15, controls the first solenoid valve S1 to an "ON" state and the second solenoid valve S2 to an "OFF" state. This allows hydraulic pressure to flow into the second, third, and fourth speed lines 28, 30, and 32.

Simultaneously with the above, release pressure of the fourth friction element C4 and the release side chamber h2 of the second friction element C2 is controlled by the duty control of the third solenoid valve S3, and the fifth solenoid valve is controlled to "OFF."

When this happens, the hydraulic pressure supplied to the operational side chamber h1 of the second friction element C2 is changed to control pressure by the operation of the control switch valve 42 and the high-low pressure valve 34 and, at the same time, the hydraulic pressure supplied to the pressure regulator valve 8 is released and line pressure control is discontinued.

Also, fourth speed line 32 pressure controls the rear clutch release valve 46 and the 2-3/4-3 shift valve 40. By doing so, the valve spools of the rear clutch release valve 46 and the 2-3/4-3 shift valve 40 are moved respectively to the right and left (in the drawing).

When this happens, the hydraulic pressure supplied to the first friction element C1 is quickly exhausted through the rear clutch release valve 46, and the hydraulic pressure supplied to the fourth friction element C4 and the release side chamber h2 of the second friction element C2 is exhausted through the manual valve 16 via the 2-3/4-3 shift valve 40, the rear clutch release valve 44, and the reverse first control line 52.

Figure 16:
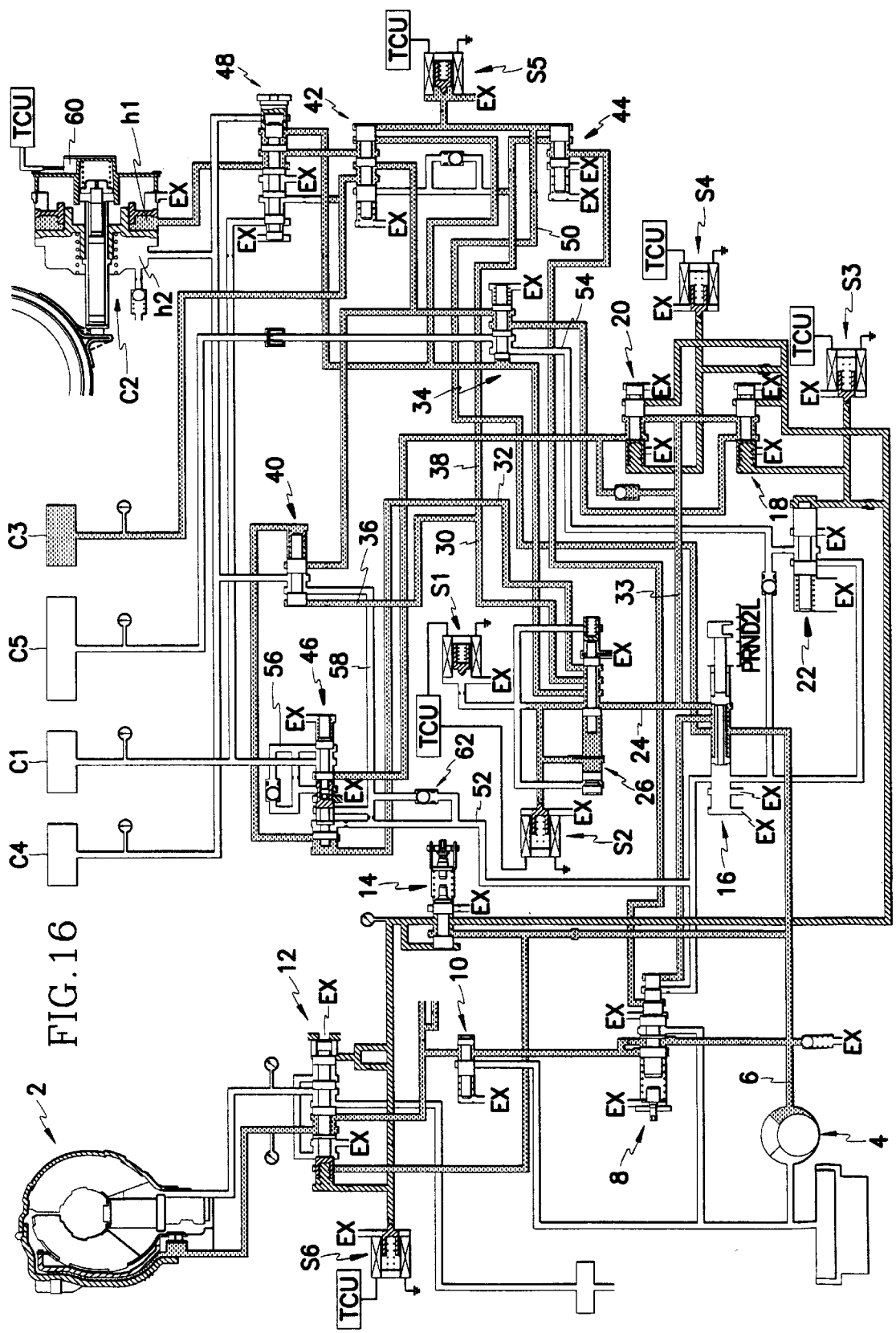
FIG. 16 is a view illustrating a state in which hydraulic pressure flows in the fourth speed stage of the drive "D" range of a hydraulic control system of the present invention.

After control has been realized in the above, as is shown in FIG. 16, the fifth solenoid valve S5 is controlled to an "ON" state, which moves the valve spool of the control switch 44 to the right (in the drawing). This allows second speed pressure to be supplied to the operational side chamber h1 of the second friction element C2, and by controlling the fifth solenoid valve S5 to "ON," line pressure change is realized, completing fourth speed control.

Figure 17A:
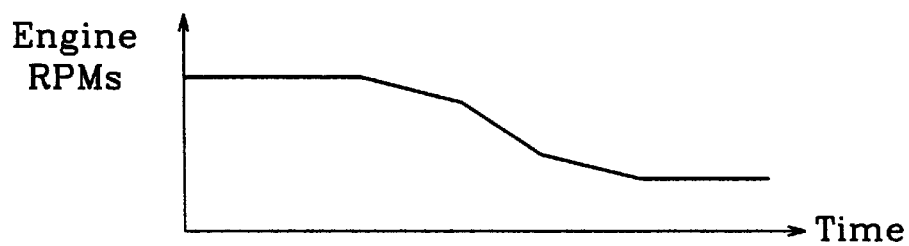
FIGS. 17A–17G are operational state views and hydraulic pressure graphs of when up-shifting from the third speed stage to the fourth speed stage in a power ON state.
Figure 17B:
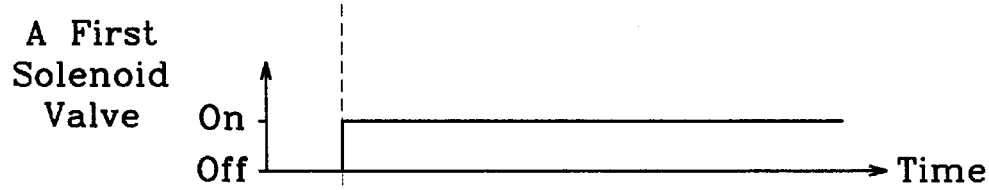
Figure 17C:
Figure 17D:
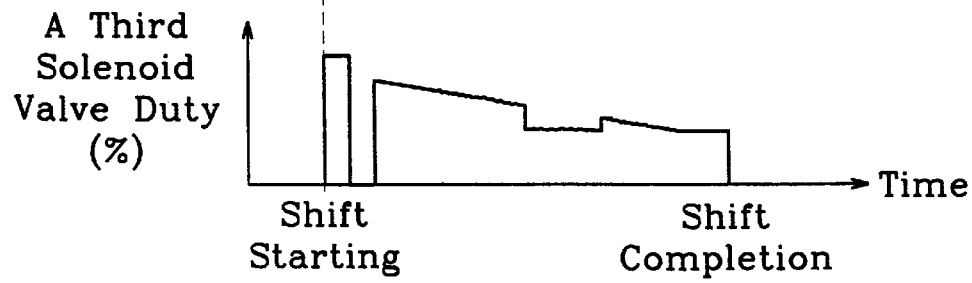

Referring to FIGS. 17B–17F, which illustrate the operation of each solenoid valve in the process of shifting from the third speed stage to the fourth speed stage, the first solenoid valve S1 is controlled to an "ON" state as shown in FIG. 17B, the second solenoid valve S2 is controlled to "OFF" as shown in FIG. 17C, and the third solenoid valve S3 is duty controlled as shown in FIG. 17D.

The duty control of the third solenoid valve S3 will now be explained in more detail. When shifting starts, duty is controlled to maximum duty ratio (100%), and after being maintained in this state for a short and fixed amount of time, it is discontinued. Next, the duty is raised to a less-than-maximum degree, and then it is slowly reduced. At the end of shifting, duty is abruptly discontinued (0%).

Figure 17E:
Figure 17F:
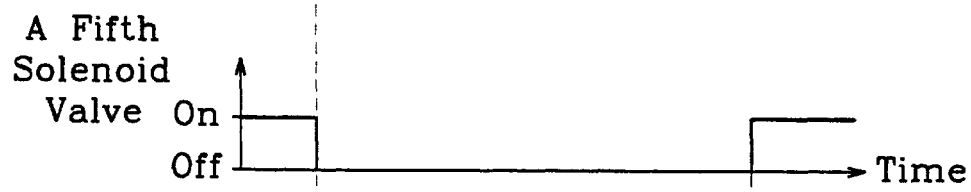

The fourth solenoid valve S4 is maintained in an "OFF" state as shown in FIG. 17E, and, as shown in FIG. 17F, the fifth solenoid valve S5 is controlled to "ON" immediately prior to shifting and controlled to "OFF" when shifting begins. At the end of shifting, the fifth solenoid valve S5 is again controlled to "ON" to change line pressure.

Figure 17G:
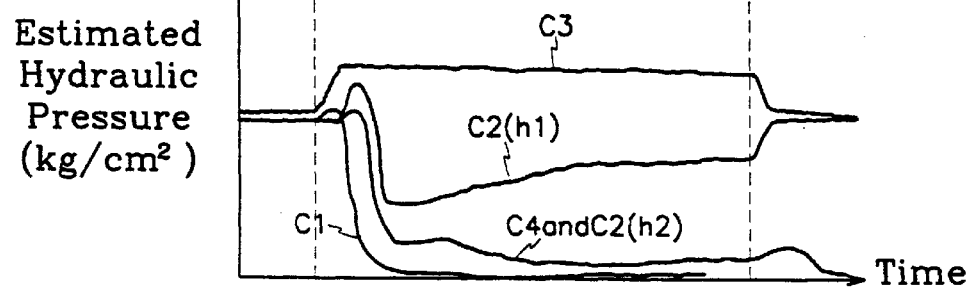

With regard to the change in hydraulic pressure of the friction elements operating in the process of shifting from a third speed stage to a fourth speed stage, the hydraulic pressure of the third friction element C3, as shown in FIG. 17G, rises at the start of shifting as a result of the increase in hydraulic pressure caused by a stop in line pressure change. This hydraulic pressure is maintained up until the end of shifting where it is quickly discontinued as a result of the discharge of the operational hydraulic pressure of the first friction element C1 through the rear clutch release valve 44.

Also, by the duty control of the third solenoid valve S3, the hydraulic pressure of the operational side chamber h1 of the second friction element C2 is momentarily increased, then lowered at the beginning of shifting, and after which it is slowly increased until the end of shifting where it is more sharply increased.

In addition, the pressure of the fourth friction element C4 and the release side chamber h2 of the second friction element C2, which is back pressure controlled by the operational side chamber h1 of the second friction element C2, is reduced to a state lower than that of the above hydraulic pressure. The reduction in pressure here at the end of shifting is due to the change of line pressure to a low level in the fourth speed stage.

FIG. 17A illustrates the change in engine rpms during the shift from the third speed stage to the fourth speed stage.

Figure 18A:
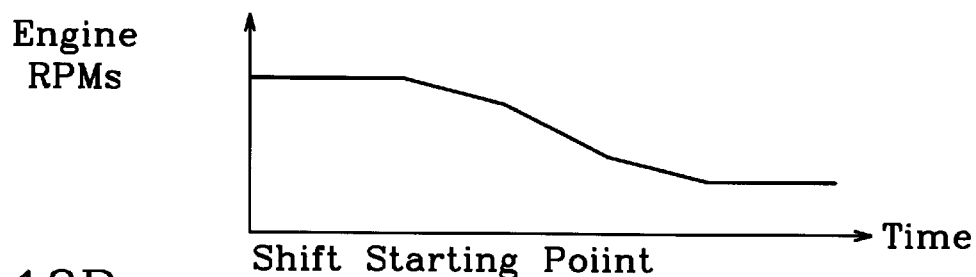
FIGS. 18A–18G are operational state views and hydraulic pressure graphs of when up-shifting from the third speed stage to the fourth speed stage in a power OFF state.
Figure 18B:
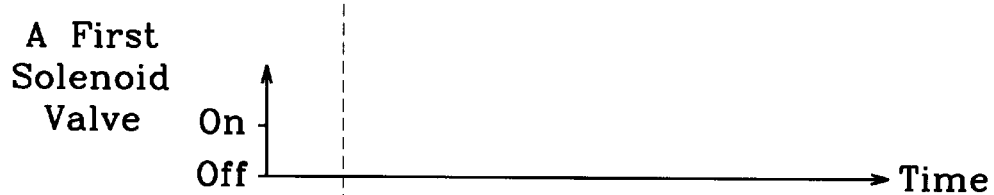
Figure 18C:
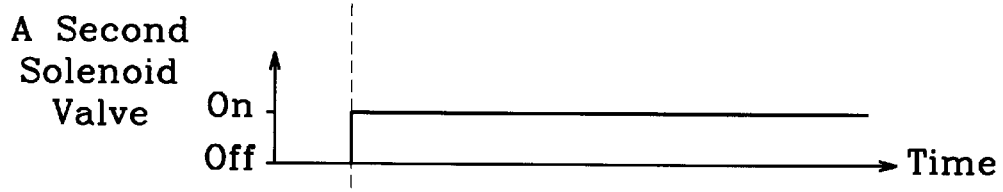
Figure 18D:
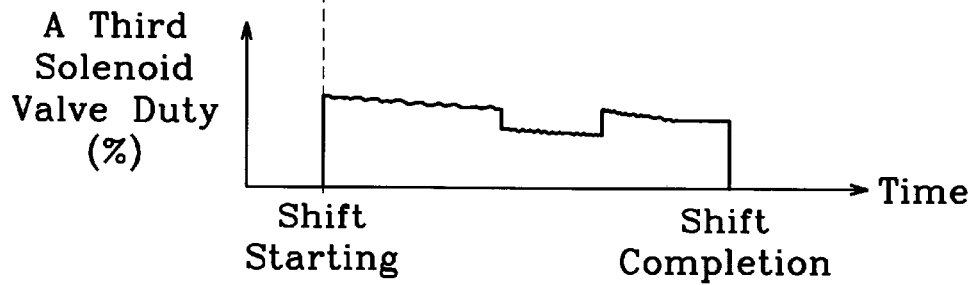
Figure 18E:
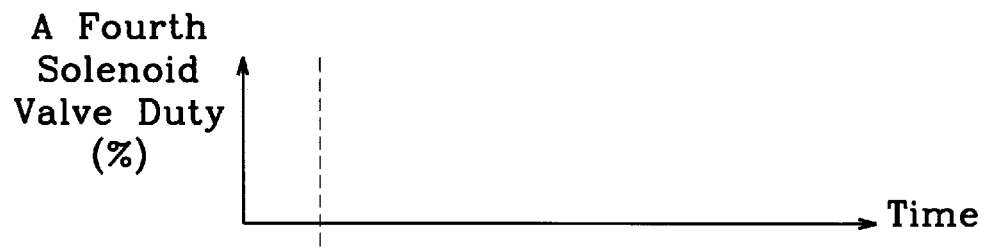
Figure 18F:

FIGS. 18B–18F illustrate the operation of each solenoid valve when shifting from the third speed stage to the fourth speed stage in a power "OFF" state. As shown in FIG. 18D, the third solenoid valve S3 is duty controlled such that at the beginning of shifting to a maximum value, and then slowly reduced. At the end of shifting, duty control is discontinued.

Figure 18G:
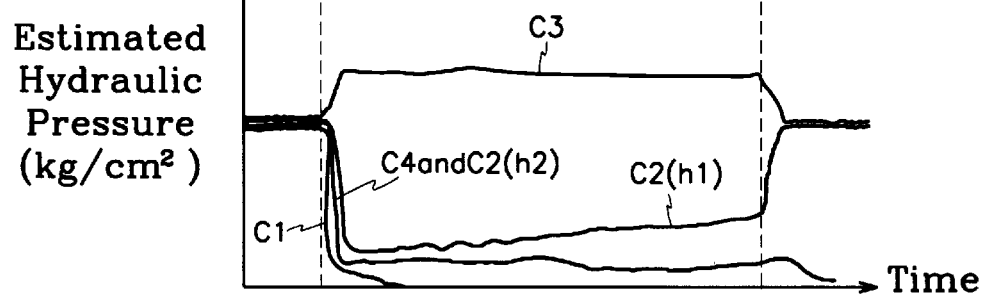

FIG. 18A illustrates the change in engine rpms during the shift from the third speed stage to the fourth speed stage in the power "OFF" state. FIG. 18G illustrates the change in hydraulic pressure of the friction elements in the process of shifting from the third speed stage to the fourth speed stage in the power "OFF" state.

As a result of the above, the hydraulic pressure of the operational side chamber h1 of the second friction element C2 is quickly reduced at the beginning of shifting, and then slowly increased. At the end of shifting, it is quickly increased to operate the second friction element C2. The hydraulic pressure of the release side chamber h2 of the second friction element C2 is at a lower level than the above friction element, and shifting is realized more slowly than in the power "ON" state.

Figure 19:
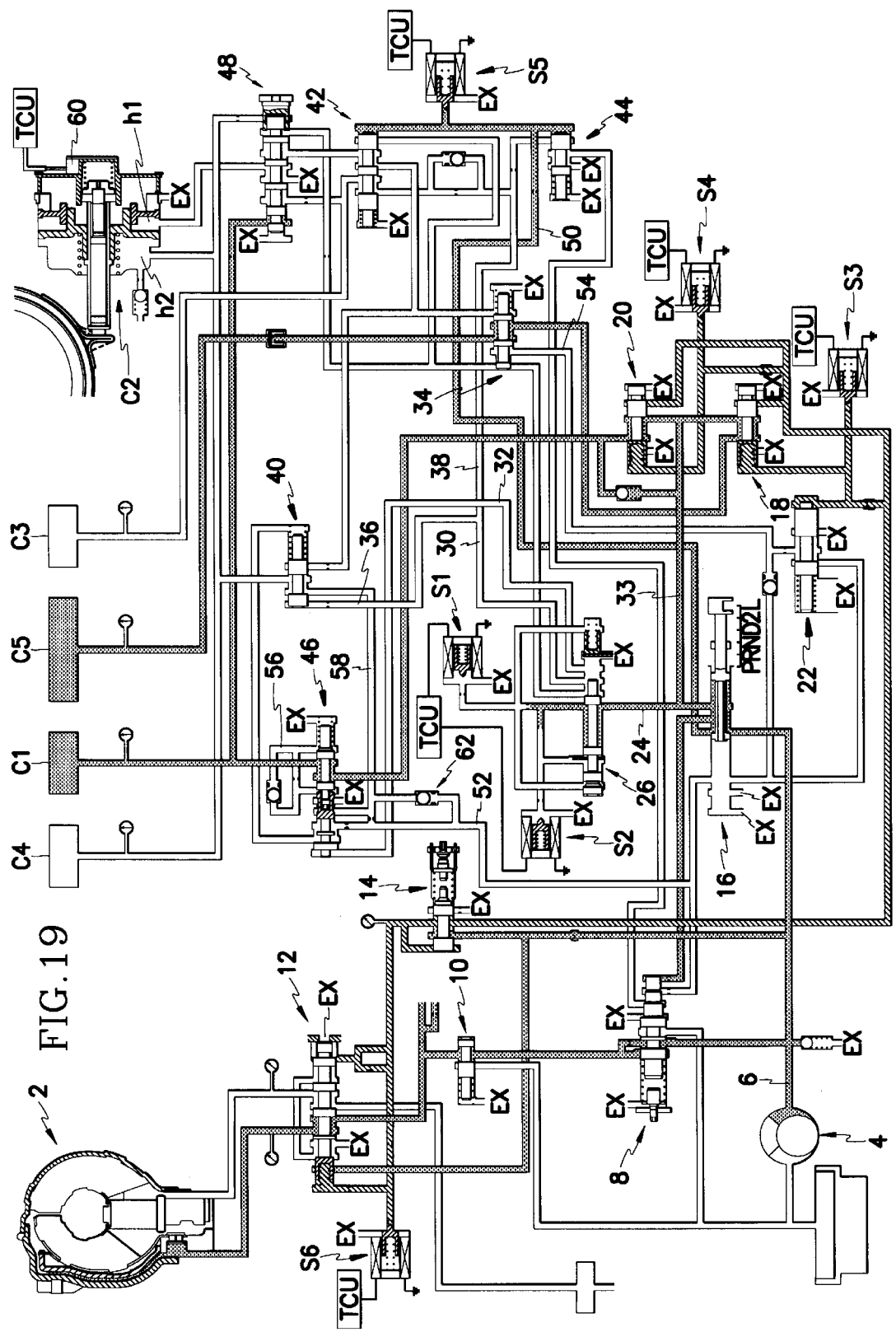
FIG. 19 is a view illustrating a hydraulic pressure flow state in a low "L" range of a hydraulic control system of the present invention.

FIG. 19 illustrates the control of fifth friction element C5 for operation of an engine brake in the low "L" range of the manual valve 16. This is realized by controlling the third solenoid valve S3 to "OFF" in a state where the first and second solenoid valves S1 and S2 have been controlled to "ON."

Namely, in the first speed, the third solenoid valve S3 is controlled to "ON," but in the "L" range, because it is controlled to "OFF," hydraulic pressure is supplied to the fifth friction element C5 by passing through the 1-2 shift valve 34.

Figure 20:
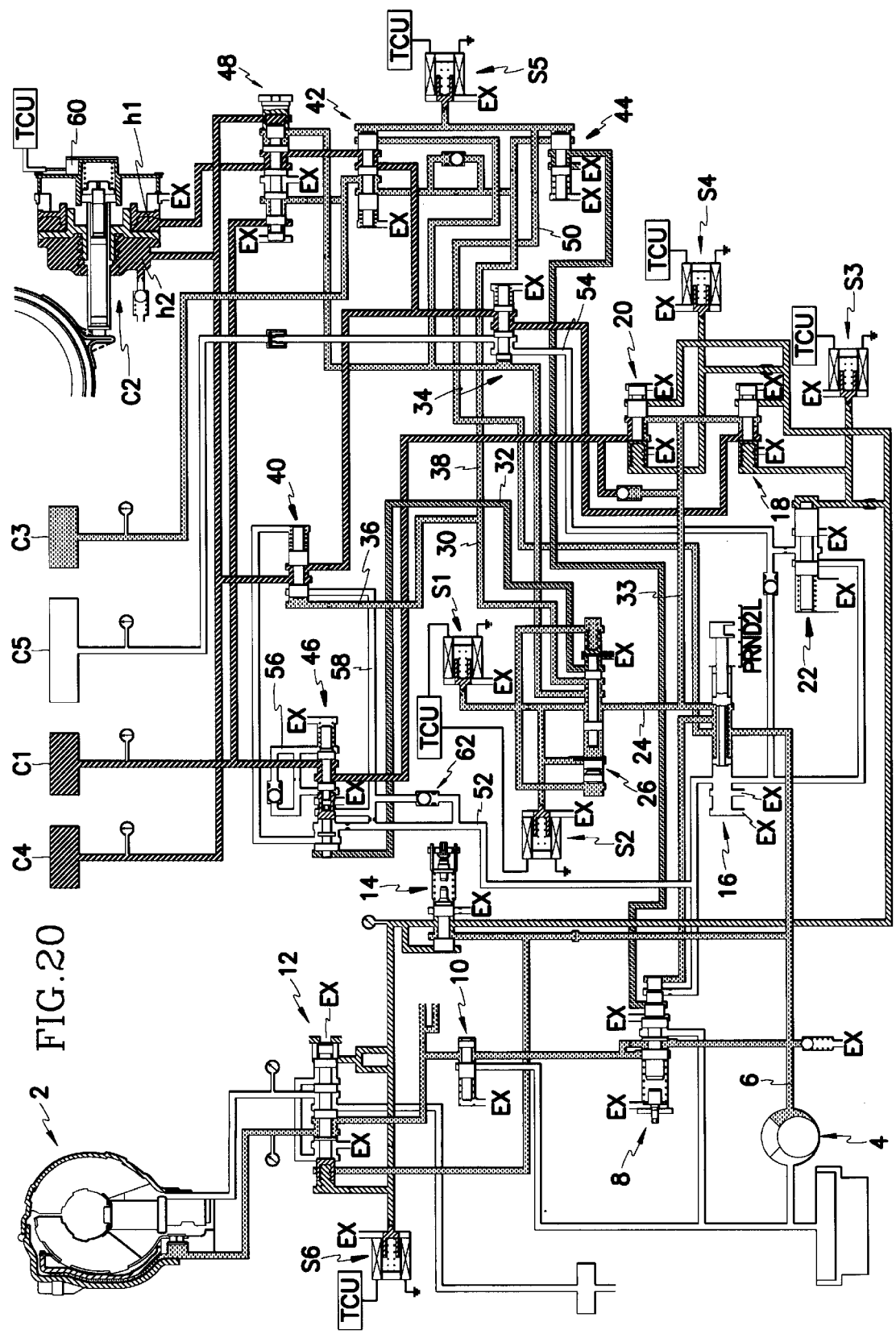
FIG. 20 is a view illustrating a hydraulic pressure flow state when down-shifting from the fourth speed stage to the third speed stage in the drive "D" range of a hydraulic control system of the present invention.

Referring to FIG. 20, when down-shifting from the fourth speed to the third speed, the first solenoid valve S1, controlled to "ON" in the fourth speed, is controlled to an "OFF" state, and the hydraulic pressure supplied to the fourth speed line 32 is discharged through the shift control valve 26. This results in the valve spool of the 3-4 shift valve 42 being moved to the left.

Also, by the duty control of the third and fourth solenoid valves S3 and S4, part of the hydraulic pressure, controlled in the first pressure control valve 18 and supplied to the control switch valve 42 via the 1-2 shift valve 34, is supplied to the operational side chamber h1 of the second friction element C2 by the "OFF" control of the fifth solenoid valve S5. The remaining hydraulic pressure is supplied to the fourth friction element C4 and the release side chamber h2 of the second friction element C2 via the 2-3/4-3 shift valve 40.

Simultaneously with the above, the hydraulic pressure controlled by the second pressure control valve 20 is supplied as control pressure to the first friction element C1 through the rear clutch release valve 46. As a result, when shifting from the fourth speed stage to the third speed stage as in the above, because the operational pressure of the first friction element C1 is supplied by the duty control of the fourth solenoid valve S4, severe shift shock does not develop, and in the shifting process, the problem of temporarily moving into a neutral state is prevented.

Figure 21A:
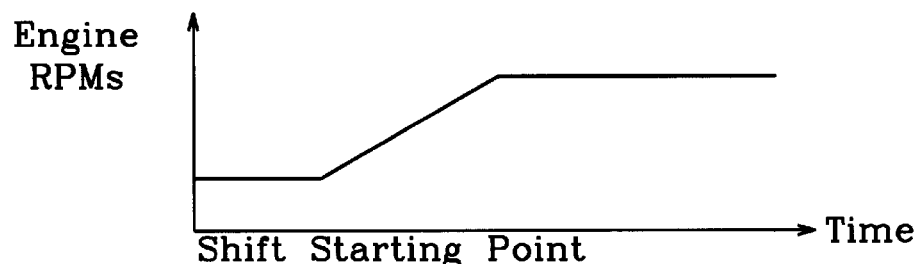
FIGS. 21A–21G are operational state views and hydraulic pressure graphs of when down-shifting from the fourth speed stage to the third speed stage in a power "ON" state.
Figure 21B:
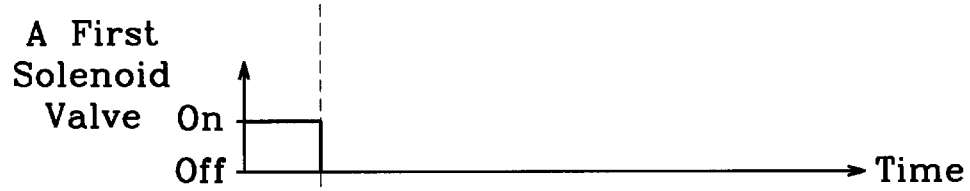
Figure 21C:
Figure 21D:
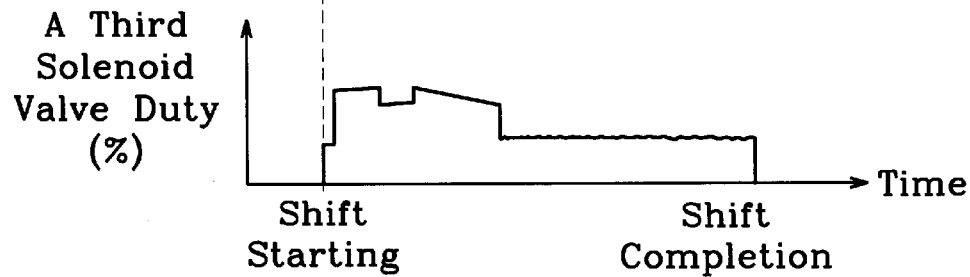
Figure 21E:
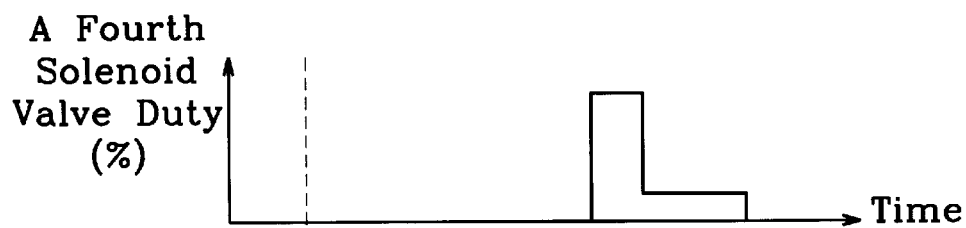

Referring to FIGS. 21B–21F, there is graphically shown the operation of each solenoid valve while down-shifting from the fourth speed stage to the third speed stage in a power "ON" state. As shown in FIG. 21B, the first solenoid valve S1 is controlled to "ON" until shifting begins where it is controlled to "OFF," the second solenoid valve S2, as shown in FIG. 21C, is maintained in an "OFF" state, and as shown in FIGS. 21D and 21E, the third and fourth solenoid valves S3 and S4 are duty controlled.

Referring to FIG. 21D, the duty ratio of the third solenoid valve S3 is increased in two steps at the beginning of shifting, and after a short period of time it is slightly reduced. Duty is briefly maintained in this reduced state and again increased from where it undergoes a slow decrease. Next, at the middle of shifting, duty again decreases, and is kept at this level until the end of shifting where duty is stopped.

The fourth solenoid valve S4, as shown in FIG. 21E, is duty controlled such that it is maintained in an "OFF" state until the end part of the middle of shifting where it increased to a maximum value, and after a short period of time, it is reduced and maintained in this state until the end of shifting, where duty is discontinued.

Figure 21F:
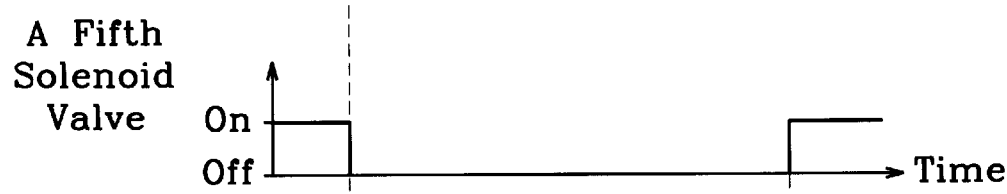

As shown in FIG. 21F, the fifth solenoid valve S5 is maintained in an "OFF" state until the end of shifting where it is controlled to an "ON" state to change line pressure.

Figure 21G:
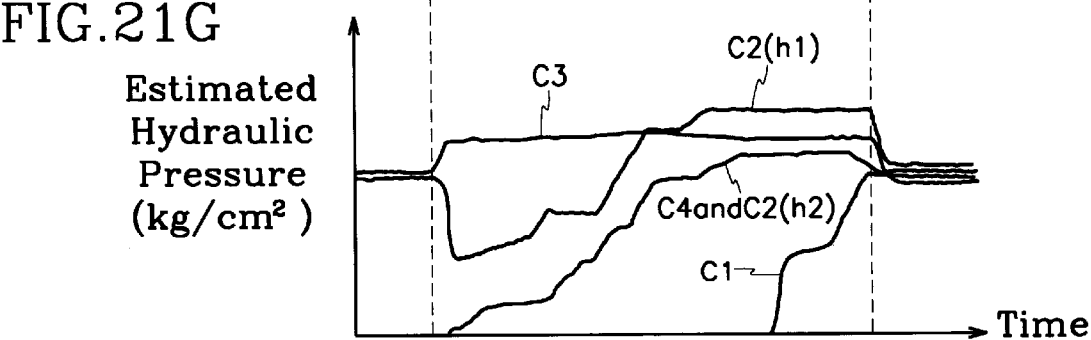

Referring to FIG. 21G, the change in hydraulic pressure when down-shifting from the fourth speed stage to the third speed stage will now be examined. As can be seen in the graph, the hydraulic pressure of the third friction element C3 changes according to adjustments made in line pressure, and the hydraulic pressure of the operational side chamber h1 of the second friction element C2 momentarily decreases at the beginning of shifting. The hydraulic pressure of the operational side chamber h1 of the second friction element C2 sharply rises to where, at the end part of the middle of shifting, the hydraulic pressure is maintained at a level higher than the operational pressure of the third friction element C3. At the end of shifting, the hydraulic pressure of the operational side chamber h1 of the second friction element C2 slightly reduces as a result of a change in line pressure.

Also, the hydraulic pressure of the fourth friction element C4 and the release side chamber h2 of the second friction element C2, which receive part of the hydraulic pressure supplied toward the operational side chamber h1 of the second friction element C2, have an identical pattern with the hydraulic pressure of the operational side chamber h1 of the second friction element C2, but at a lower pressure. And finally, the hydraulic pressure of the first friction element C1 is supplied by the control of the fourth solenoid valve S4 at the end of shifting.

Figure 22:
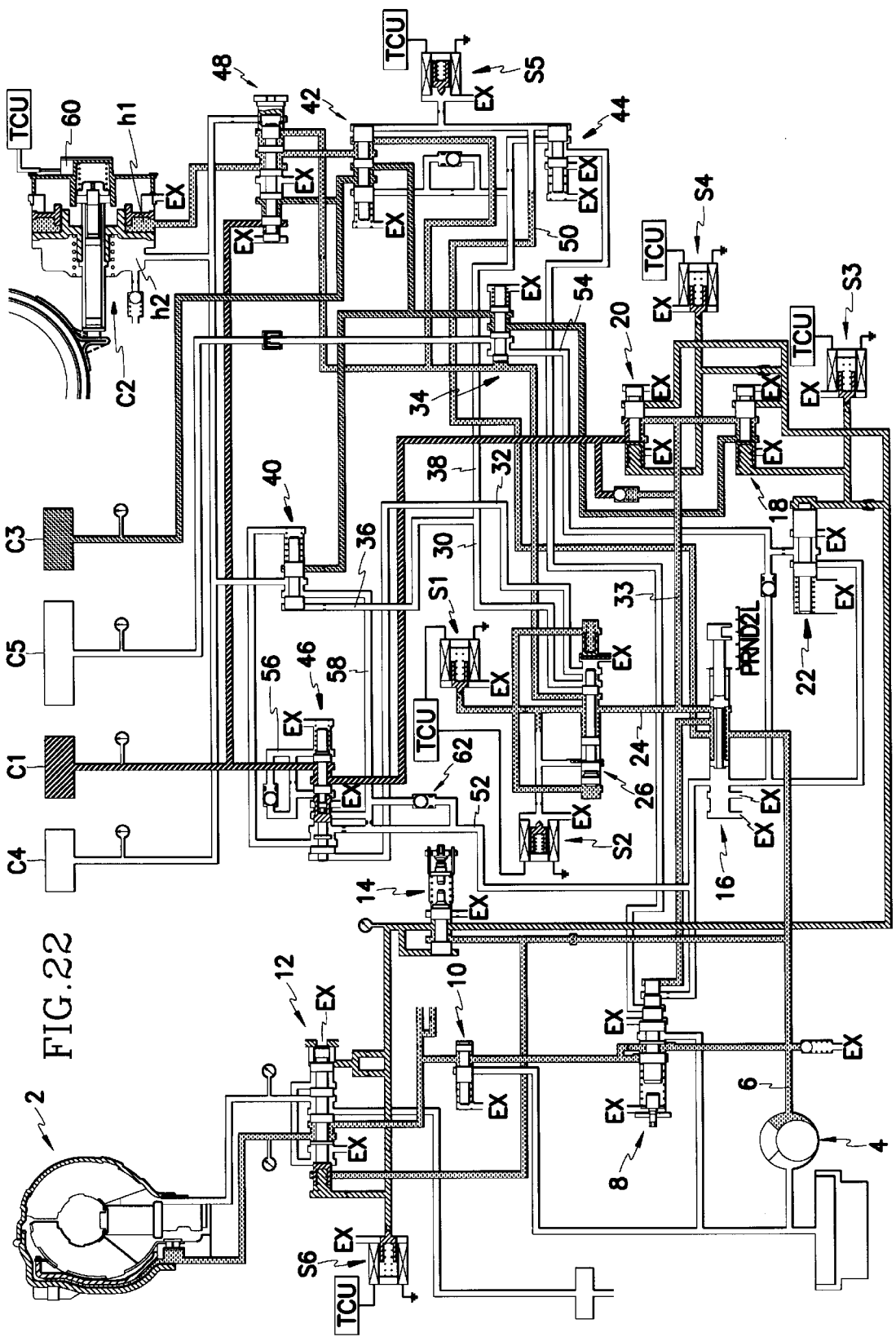
FIG. 22 is a view illustrating a state in which hydraulic pressure flows when down-shifting from fourth speed stage to the second speed stage in the drive "D" range of a hydraulic control system of the present invention.

Referring to FIG. 22, the second solenoid valve S2, controlled to "OFF" in the fourth speed stage, is controlled to "ON," and the hydraulic pressure supplied to the third and fourth speed lines is exhausted through a discharge port of the shift control valve 26, and the valve spools of the rear clutch release valve 44 and the 2-3/4-3 shift valve 40 are moved to the left (in the drawing).

Also, the third and fourth solenoid valves S3 and S4 are duty controlled, and the hydraulic pressure supplied through the third friction element C3 is discharged through a discharge port of the first pressure control valve 18. The control pressure, controlled by the second pressure control valve 20, is supplied to the first friction element C1 through the rear clutch release valve 46.

Next, at the end of shifting, as shown in FIG. 23, the third solenoid valve S3 is controlled to "ON," the fourth solenoid valve S4 is controlled to "OFF," and the hydraulic pressure supplied to the first friction element C1 is converted to first speed line pressure to realize skip shifting to the second speed stage.

The difference between a normal second speed stage (see FIG. 8) and the second speed stage when skip shifting is that in the normal second speed stage, the hydraulic pressure supplied to the operational side chamber h1 of the second friction element C2 is control pressure and first speed line pressure supplied by the first pressure control valve 18, but when skip shifting, second speed line pressure is supplied.

Also, in the skip shifting process as in the above, as the first friction element C1 and third friction element C3 are independently controlled, control is realized easily.

Figure 24A:
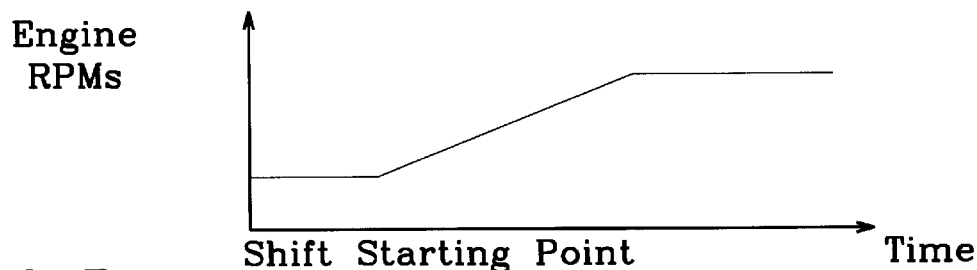
FIGS. 24A–24G are operational state views and hydraulic pressure graphs of when down-shifting from the fourth speed stage to the second speed stage in a low speed power ON state.
Figure 24B:
Figure 24C:
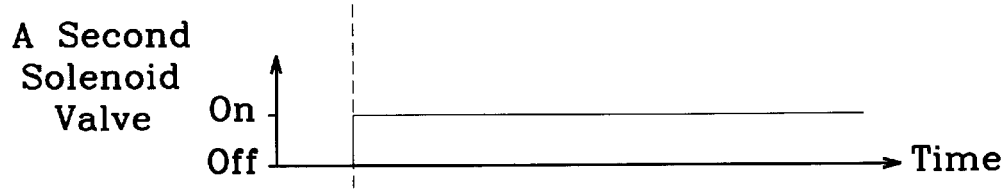
Figure 24D:
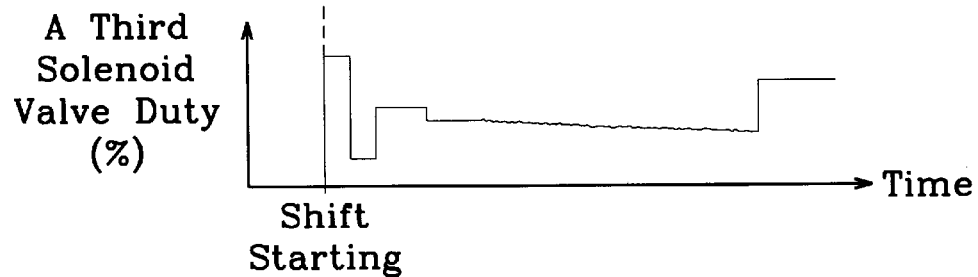
Figure 24E:
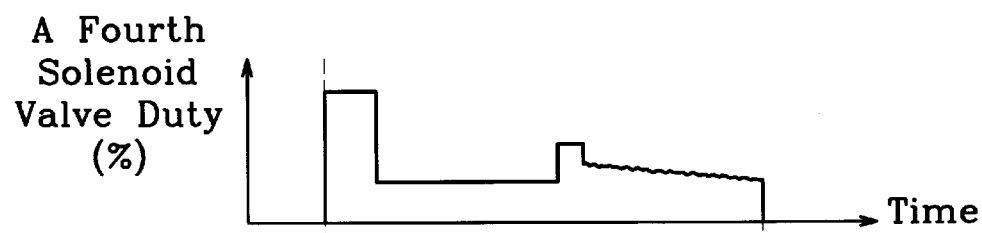

Referring now to FIGS. 24B–24F, there is graphically shown the operation of each solenoid valve when down-shifting from the fourth speed stage to the second speed stage in a power "ON" state. As shown in FIG. 24B, the first solenoid valve S1 is controlled to "ON" until shifting starts, where it is abruptly controlled to "OFF." The second solenoid valve S2, as is shown in FIG. 24C, is maintained in an "OFF" state until shifting starts, where it is controlled to "ON," and the third and fourth solenoid valves S3 and S4, as shown in FIGS. 24D and 24E, are duty controlled.

The duty control of the third solenoid valve S3 is done such that it is controlled in the order of high, low, then medium at the beginning of shifting, then the duty is slightly reduced, and finally, it is slowly reduced until the end part of shifting where duty is again increased.

The fourth solenoid valve S4, as shown in FIG. 24E, is controlled to a maximum duty ratio at the beginning of shifting, and then drastically reduced. Duty is maintained in this reduced state until the end of the middle part of shifting where it is slightly increased, reduced, and then follows a slow reduction until the end of shifting where it is discontinued.

Figure 24F:
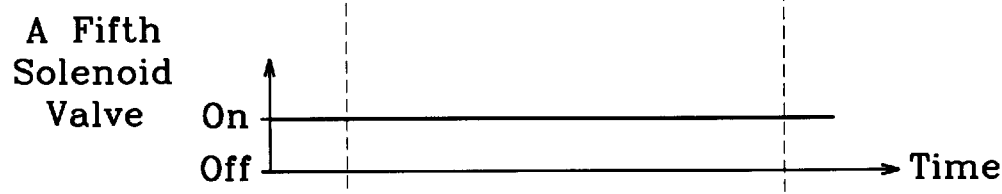

As shown in FIG. 24F, the fifth solenoid valve S5 is maintained in an "ON" state. FIG. 24A illustrates the change in engine rpms when down-shifting from the fourth speed stage to the second speed stage in the power "ON" state.

Figure 24G:
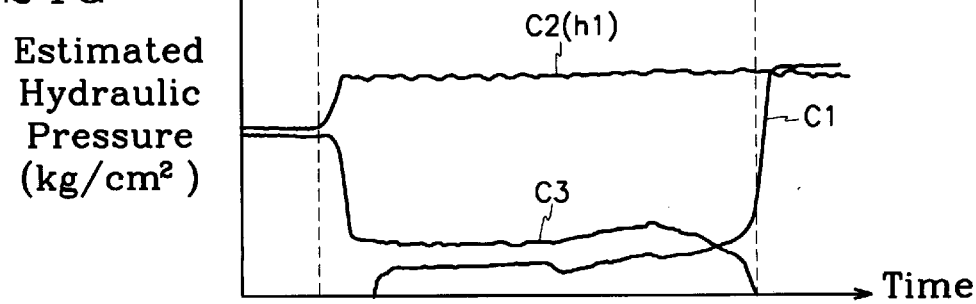

The change in hydraulic pressure of each friction element will now be examined with reference to FIG. 24G. The hydraulic pressure of the operational side chamber h1 of the second friction element C2 is increased at the beginning of shifting, and then maintained at this level. The hydraulic pressure of the third friction element C3 is sharply reduced at the beginning of shifting, and then slowly increased until the end of shifting where it is discontinued. The hydraulic pressure of the first friction element C1 is supplied starting from where the duty of the fourth solenoid valve S4 is reduced, and from this point, the hydraulic pressure is slowly increased until the end of shifting where it is sharply increased.

FIGS. 25B–25F illustrate the operation of each solenoid valve when down-shifting from the fourth speed stage to the second speed stage when driving at high speeds. Here, the duty ratios of the third and fourth solenoid valves S3 and S4 are different from those illustrated in FIGS. 24A and 24B.

Figure 25A:
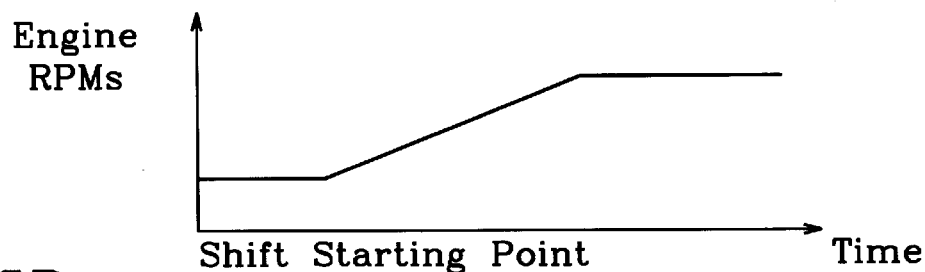
FIGS. 25A–25G are operational state views and hydraulic pressure graphs of when down-shifting from the fourth speed stage to the second speed stage in a high speed power ON state.
Figure 25B:
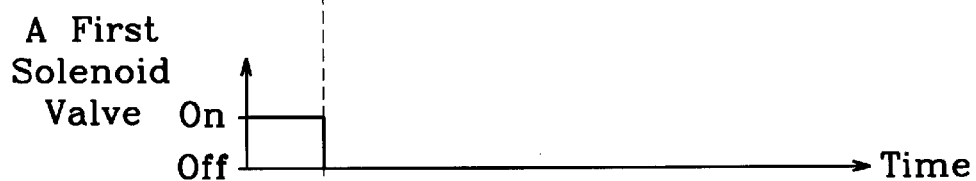
Figure 25C:
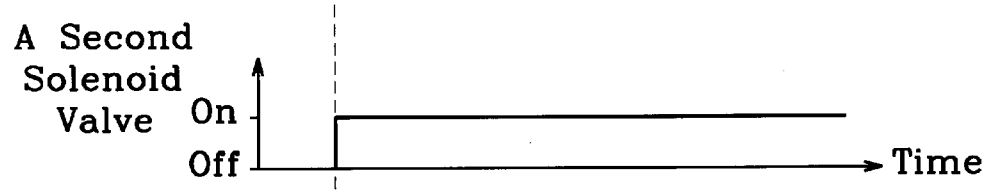
Figure 25D:
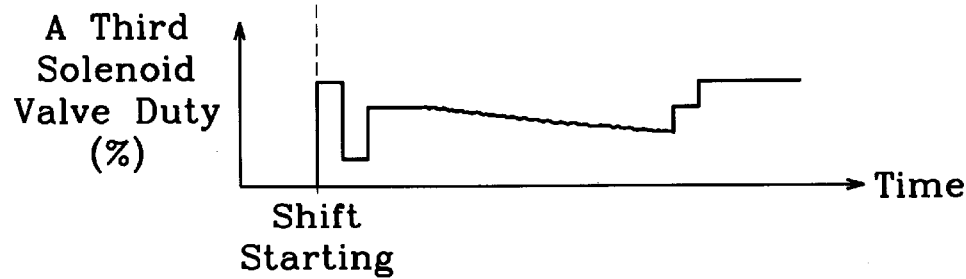

As shown in FIG. 25D, the duty ratio of the third solenoid valve S3 is controlled to high, low, and medium levels at the beginning of shifting. The duty is maintained in this medium level for a short period of time, and then slowly reduced until the end of shifting where it is increased in two increments.

Figure 25E:
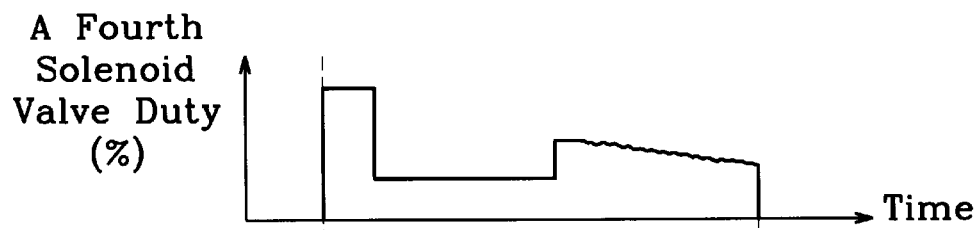
Figure 25F:
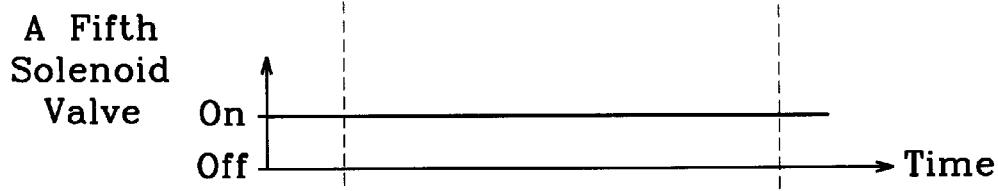

The fourth solenoid valve S4, as shown in FIG. 25E, is controlled to a maximum duty ratio, then sharply decreased and maintained at this level. At the end of the middle part of shifting, duty is increased, decreased, then slowly decreased from this level until the end of shifting where it is discontinued. The sharp increase then decrease of the duty ratio of the fourth solenoid valve S4 corresponds to the operation of the rear clutch release valve 46. FIG. 25A illustrates the changes in engine rpms during the above-described shifting operation.

Figure 25G:
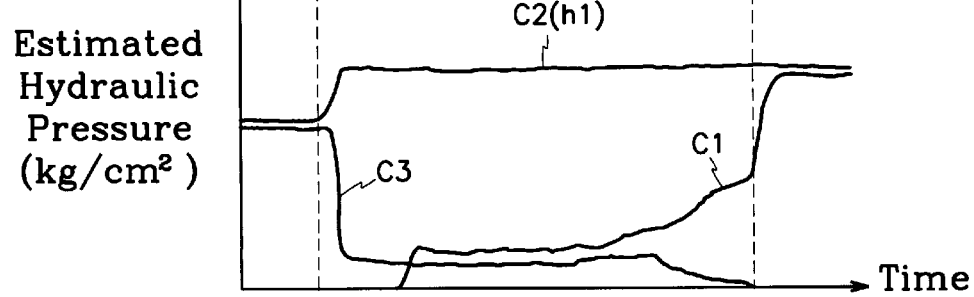

As a result of the above control, as shown in FIG. 25G, the hydraulic pressure of the first friction element C1 increases at the middle of shifting, and at a more rapid pace at the end of shifting. Therefore, the operation of the first friction element C1 is faster at high speeds than at low speeds, allowing for smooth shifting.

Figure 26A:
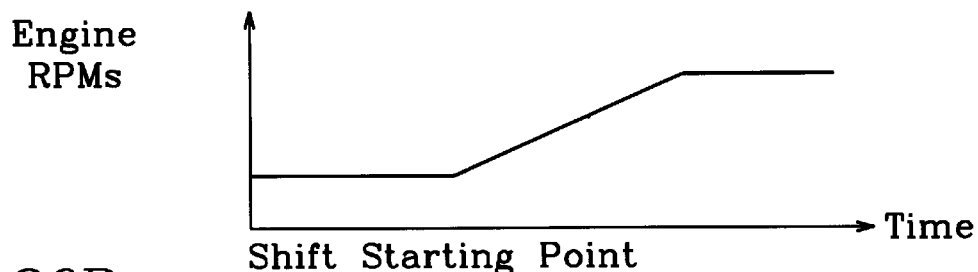
Figure 26B:
Figure 26C:
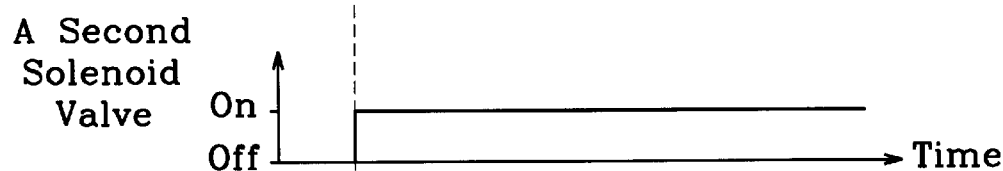
Figure 26D:
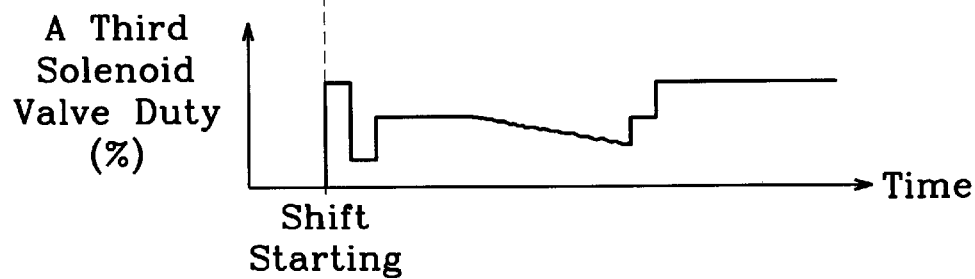

FIGS. 26B–26F illustrate the operation of each solenoid valve when shifting from the fourth speed stage to the second speed stage in a power "OFF" state. As shown in FIG. 26D, the duty ratio of the third solenoid valve S3 is controlled to a high, low, then medium level at the beginning of shifting, and after being maintained at this medium level for a fixed period of time, it is slowly decreased. At the end portion of shifting, the duty ratio is increased in two increments, and then maintained at this level. The difference in the duty ratio of the third solenoid valve S3 in a power "OFF" state, when compared to high-speed shifting, is that the medium level of duty is maintained longer at the beginning of shifting in the power "OFF" state than during high-speed shifting (see FIG. 25D). Also, the decrease in the duty ratio from this medium level is done more quickly in the power "OFF" state.

Figure 26E:
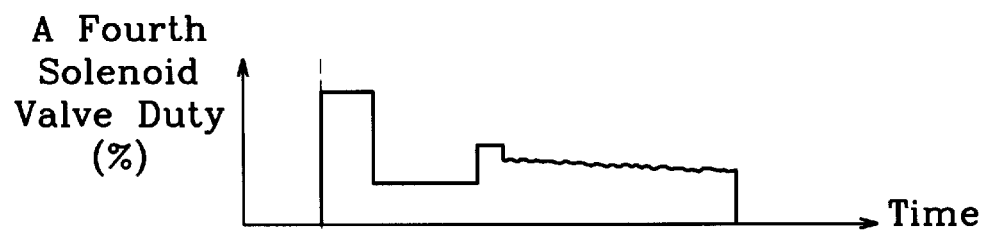
Figure 26F:
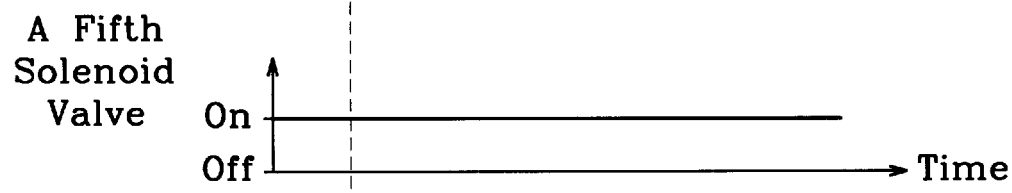

As shown in FIG. 26E, the duty ratio of the fourth solenoid valve S4 is controlled to a maximum duty ratio at the beginning of shifting, and is then sharply decreased. The duty ratio is maintained in this state for a longer period of time than in the power "ON" high-speed state. Also, at the middle of shifting, the duty ratio is slightly increased, decreased, and then slowly decreased until the end of shifting where it is discontinued.

Figure 26G:
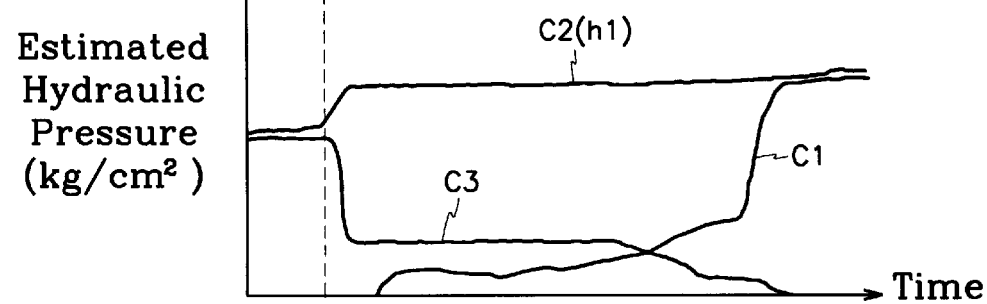

As a result of the above, as shown in FIG. 26G, the hydraulic pressure of the third friction element C3 is not decreased as much as in the high-speed state at the beginning of shifting. The hydraulic pressure is decreased starting from the end part of the middle of shifting, and is discontinued at the end of shifting. Also, the hydraulic pressure of the first friction element C1 is increased more slowly than in the high-speed state, and at the end of shifting, the hydraulic pressure is sharply increased. FIG. 26A illustrates the engine rpms during the shifting operation described above.

Figure 27:
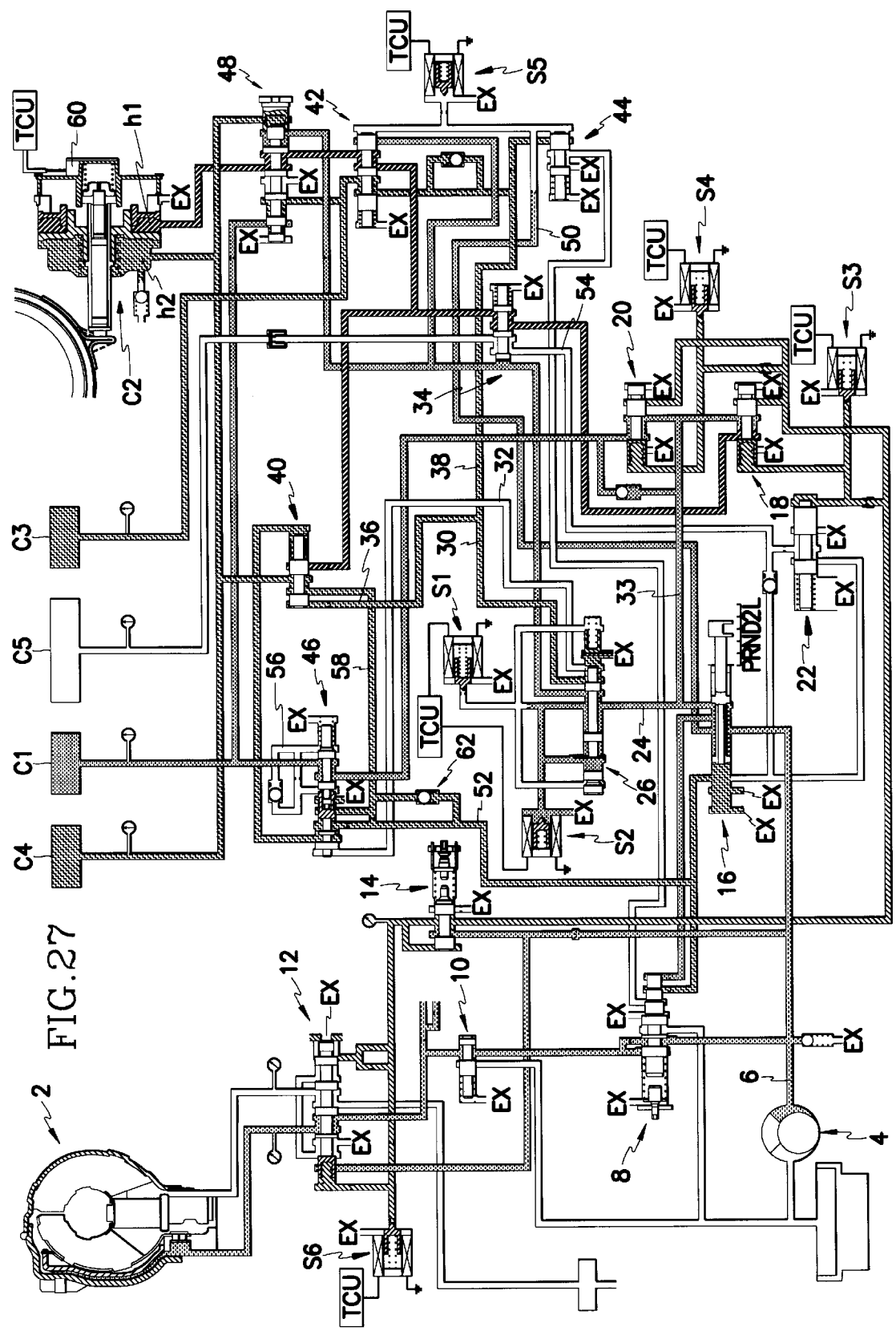
FIG. 27 is a view illustrating a state in which hydraulic pressure flows when down-shifting from the third speed stage to the second speed stage in the drive "D" range of a hydraulic control system of the present invention.

Referring now to FIG. 27, when down-shifting from the third speed stage to the second speed stage, the second solenoid valve S2, which is controlled to "OFF" in the third speed stage, is controlled to an "ON" state. The hydraulic pressure supplied to the third friction element C3 is thus quickly discharged through the third speed line 30 and the shift control valve 26.

Resulting from the above, the valve spool of the 2-3/4-3 shift control valve 40 moves leftward (in the drawing), and the hydraulic pressure supplied to the release side chamber h2 of the second friction element C2 and the fourth friction element C4 passes through the 2-3/4-3 shift valve 40, the rear clutch release valve 44, and the reverse first control line 52 to be discharged via the manual valve 16.

Further, after the hydraulic pressure supplied to the operational side chamber h1 of the second friction element C2 by the duty control of the third solenoid valve S3 is changed to control pressure by the operation of the control switch valve 42 to complete shifting, it is then changed to and supplied as drive pressure by the "OFF" control of the third solenoid valve S3; completing the shift operation.

Figure 28A:
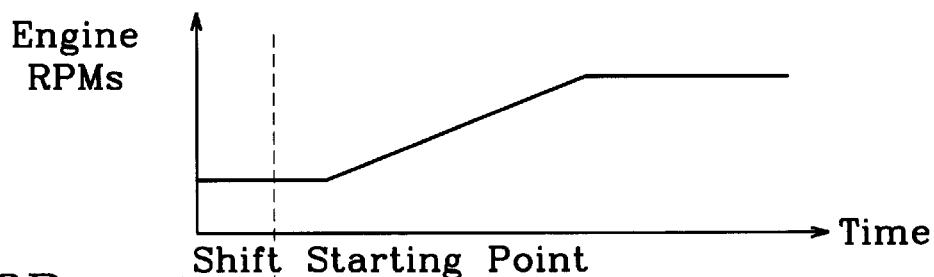
FIGS. 28A–28G are operational state views and hydraulic pressure graphs of when down-shifting from the third speed stage to the second speed stage in power ON, OFF states
Figure 28B:
Figure 28C:
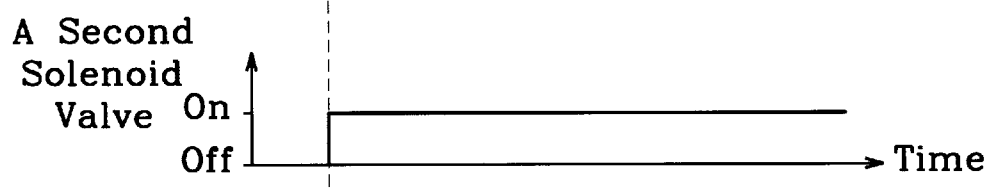
Figure 28D:
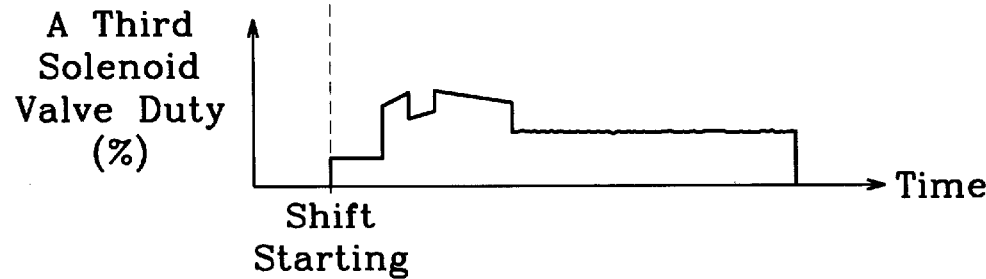
Figure 28E:
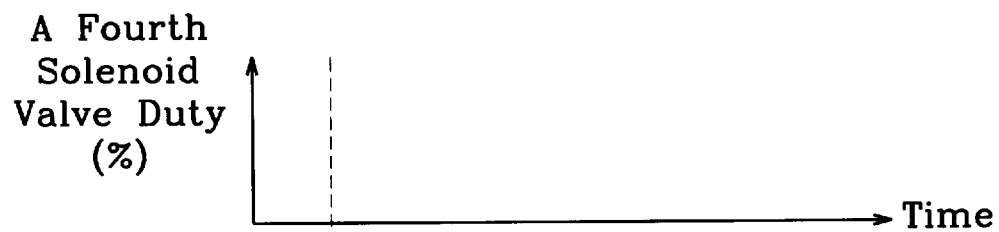

FIGS. 28B–28F illustrate the operation of each solenoid valve when down-shifting from the third speed stage to the second speed stage. As shown in FIG. 28B, the first solenoid valve S1 is maintained in an "OFF" state, the second solenoid valve S2 is controlled to "ON" starting from the beginning of shifting as shown in FIG. 28C, the third solenoid valve S3 is duty controlled as shown in FIG. 28D, and the fourth solenoid valve S4 is maintained in an "OFF" state as shown in FIG. 28E.

Referring to FIG. 28D, the duty ratio of the third solenoid valve S3 is increased in two increments at the beginning of shifting, and after slowly increasing for a short period of time, it is decreased slightly. From here, the duty ratio is maintained at this level for a short period. It is again increased, and maintained at this level for a fixed duration.

Figure 28F:

The fifth solenoid valve S5, as shown in FIG. 28F, is maintained in an "ON" state until shifting begins where it is controlled to "OFF."

Figure 28G:
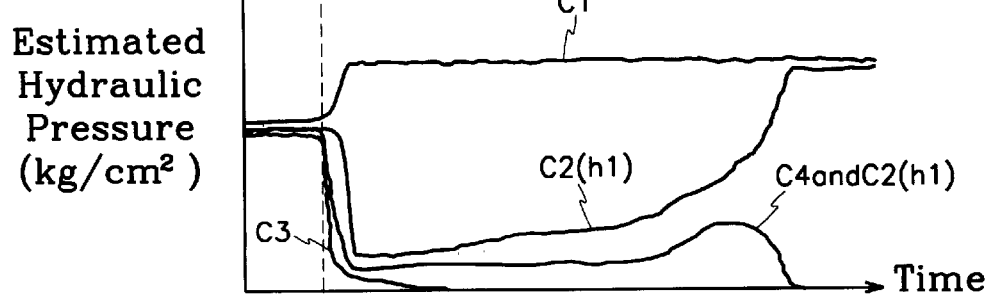

Referring to FIG. 28G, the hydraulic pressure of the third friction element C3 is quickly decreased and discontinued, and the hydraulic pressure of the operational side chamber h1 of the second friction element C2 is sharply decreased at the beginning of shifting and then slowly increased until the end portion of shifting, where it is more quickly increased to realize shifting. FIG. 28A illustrates the change in engine rpm during the shifting operation discussed above.

Figure 29:
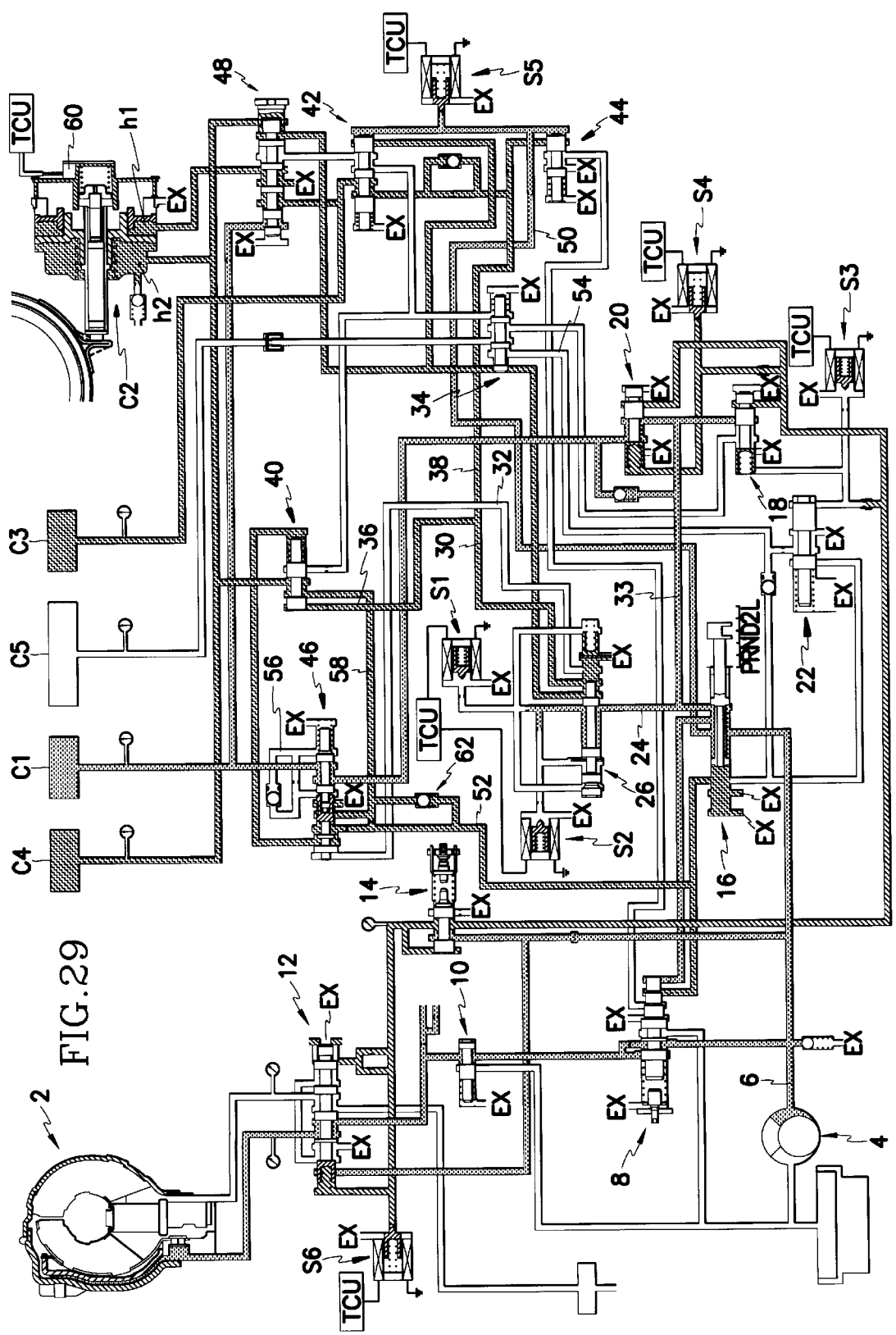
FIG. 29 is a view illustrating a state in which hydraulic pressure flows when down-shifting from the third speed stage to the first speed stage in the drive "D" range.

Referring now to FIG. 29, when down-shifting from the third speed stage to the first speed stage, the hydraulic pressure supplied to the third and fourth speed lines 28 and 30 by the "ON" control of the second solenoid valve S2 is quickly discharged through the shift control valve 26, and all the hydraulic pressure, except that of the first friction element C1, is exhausted.

At this time, after the release of pressure of the operational side chamber h1 of the second friction element C2, the fourth friction element C4, and the release side chamber h2 of the second friction element C2, the pressure of the operational side chamber h1 of the second friction element C2 is controlled immediately prior to the end of shifting, allowing the realization of a complete discharge of hydraulic pressure. As a result of the above, shock, given to a one-way clutch, is minimized.

Figure 30A:
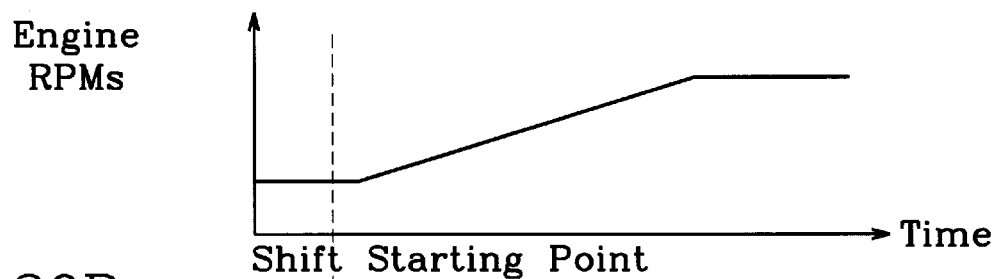
FIGS. 30A–30G are operational state views and hydraulic pressure graphs of when down-shifting from the third speed stage to the first speed stage in power ON, OFF states.
Figure 30B:
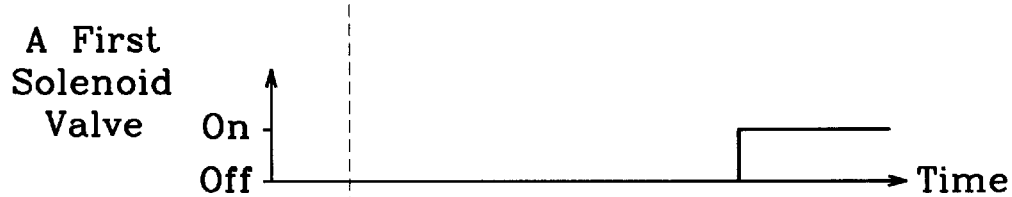
Figure 30C:
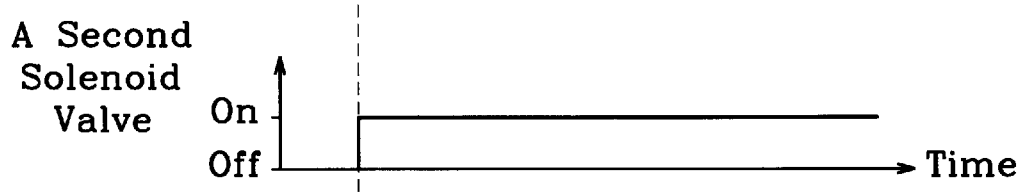
Figure 30D:
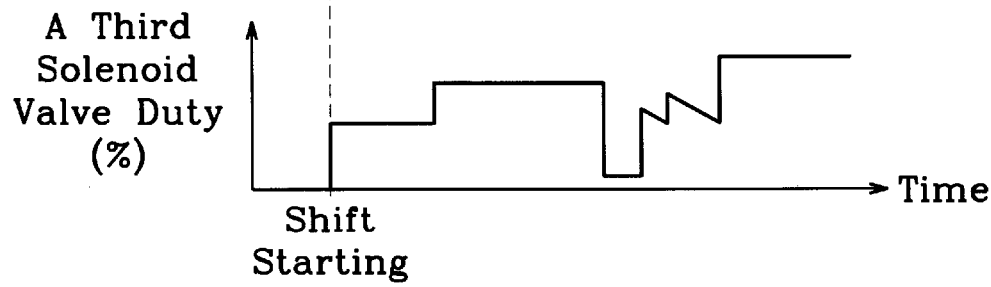
Figure 30E:
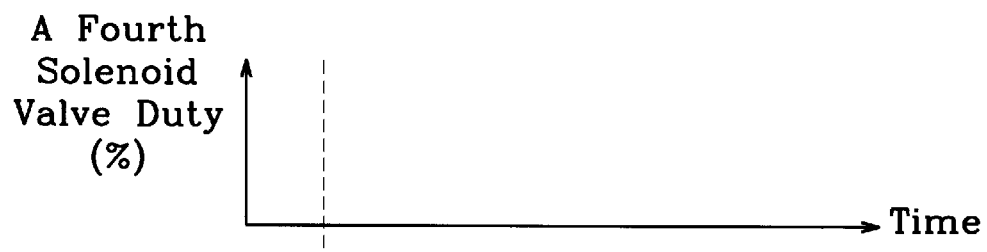

FIGS. 30B–30F illustrate the operation of each solenoid valve when down-shifting from the third speed stage to the first speed stage. The first solenoid valve S1 is controlled to "ON" in the end part of shifting as shown in FIG. 30B, the second solenoid valve S2 is controlled to "ON" starting from the beginning of shifting as shown in FIG. 30C, the third solenoid valve S3 is duty controlled as shown in FIG. 30D, and the fourth solenoid valve S4 is maintained in an "OFF" state as shown in FIG. 30E.

As shown in FIG. 30D, the third solenoid valve S3 is duty controlled such that at the beginning portion of shifting, the duty ratio is increased two times and maintained at this second incremental level until the middle of shifting. At this point, the duty ratio is sharply decreased, and after a short interval, is increased in two stages during which the duty ratio follows a slight decrease immediately after the increases. At the end of shifting, the duty ratio is sharply increased and maintained at this level until the end of shifting.

Figure 30F:

The fifth solenoid valve S5, as shown in FIG. 30F, is maintained in an "OFF" state.

Figure 30G:
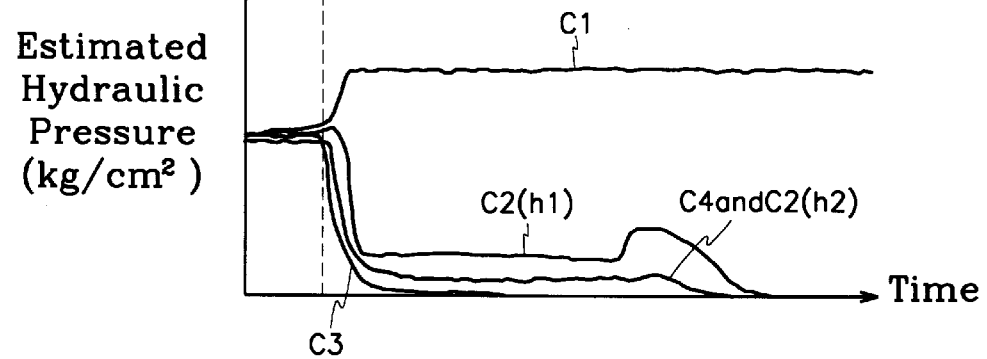

As shown in FIG. 30G, the hydraulic pressure of the first friction element C1 is maintained at an increased state, and the hydraulic pressure of the third friction element C3 is quickly discontinued. The hydraulic pressure of the fourth friction element C4, the release side chamber h2 of the second friction element C2, and the operational side chamber h1 of the second friction element C2 are quickly decreased at the beginning of shifting, maintained for a fixed period of time, and at the end part of shifting, completely discontinued. The hydraulic pressure of the operational side chamber h1 of the second friction element C2 is released after it slightly passes the end point of shifting. FIG. 30A illustrates the change in engine rpms during the shifting operation discussed above.

Figure 31:
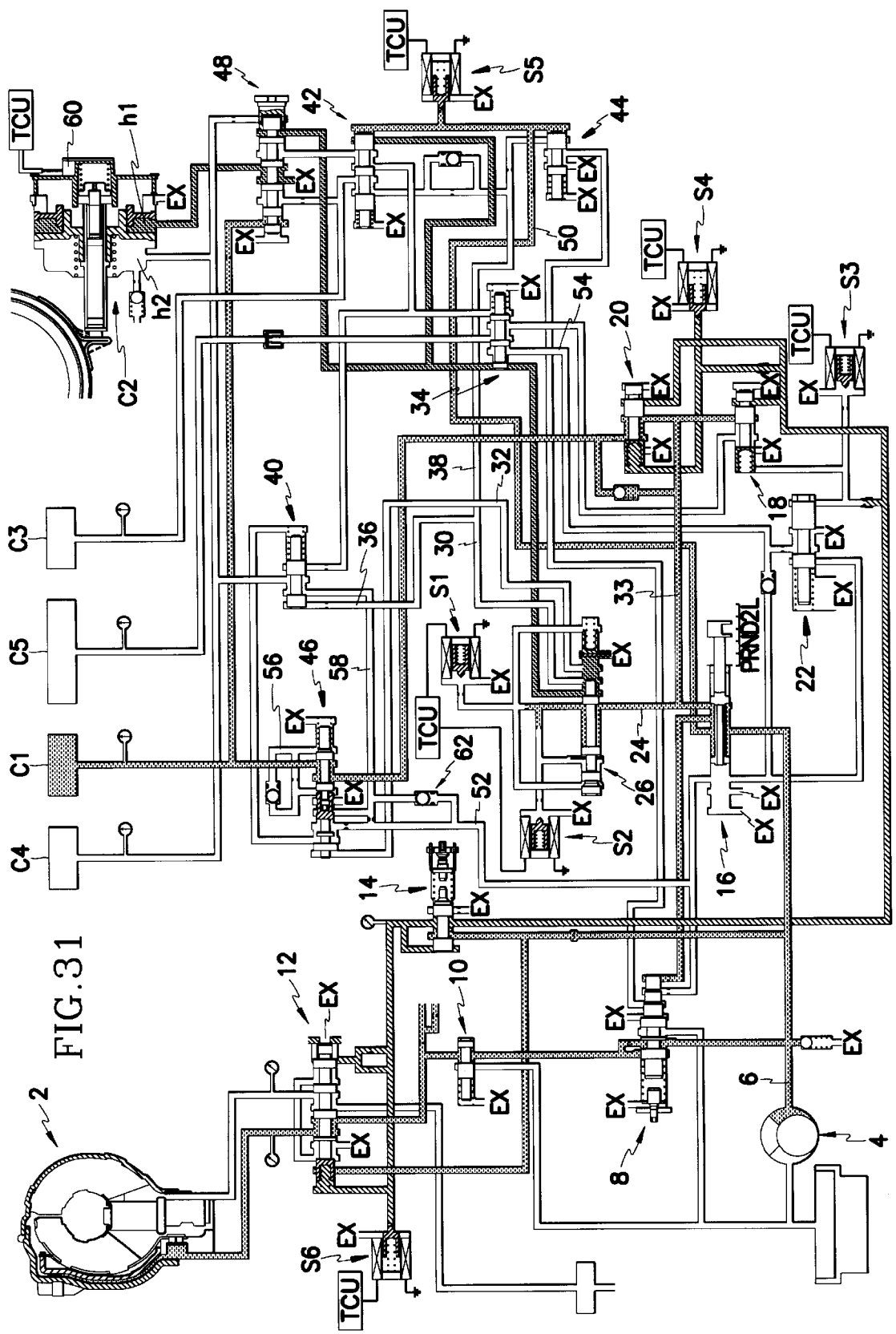
FIG. 31 is a view illustrating a state in which hydraulic pressure flows when down-shifting from the second speed stage to the first speed stage in the drive "D" range of a hydraulic control system of the present invention.

In FIG. 31, when down-shifting from the second speed stage to the first speed stage, the first solenoid valve S1 is maintained in an "OFF" state until the end period of shifting where it is controlled to an "ON" state. Also, the second solenoid valve S2 is controlled to an "ON" state, and the fifth solenoid valve S5 is maintained in an "OFF" state.

As a result of the above, the hydraulic pressure supplied to the second speed line 28 is quickly discharged through a discharge port EX of the shift control valve 26, and the hydraulic pressure supplied to the operational side chamber h1 of the second friction element C2 is exhausted through the fail-safe valve 48 to realize the second speed stage to first speed stage shift operation.

Figure 32A:
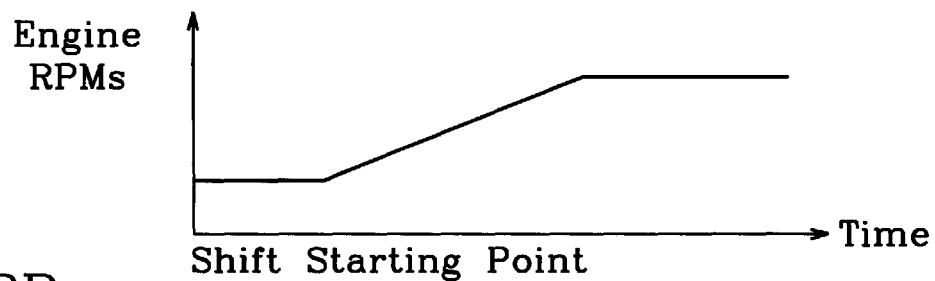
FIGS. 32A–32G are operational state views and hydraulic pressure graphs of when down-shifting from the second speed stage to the first speed stage.
Figure 32B:
Figure 32C:
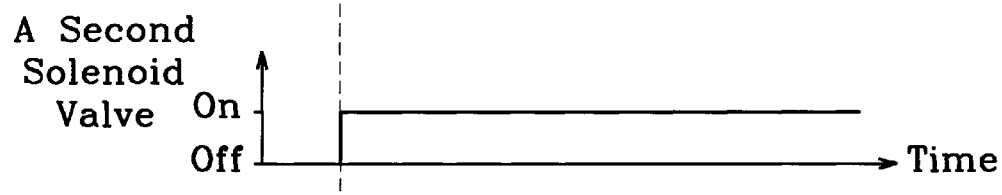
Figure 32D:
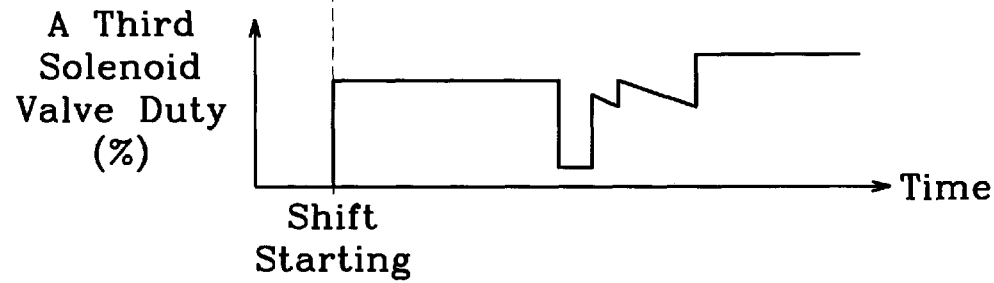
Figure 32E:
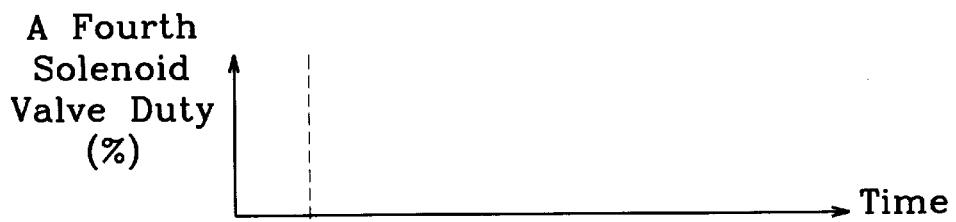

FIGS. 32B–32F illustrate the operation of each solenoid valve when down-shifting from the second speed stage to the first speed stage. The first solenoid valve S1 is controlled to "ON" in the end part of shifting as shown in FIG. 32B, the second solenoid valve S2 is controlled to an "ON" state starting from the beginning of shifting as shown in FIG. 32C, the third solenoid valve S3 is duty controlled as shown in FIG. 32D, and the fourth solenoid valve S4 is maintained in an "OFF" state as shown in FIG. 32E.

Referring to FIG. 32D, the duty ratio of the third solenoid valve S3 is controlled to a high level at the beginning of shifting and maintained at this level until the middle part of shifting where it is then sharply reduced. After a short period of time in this reduced state, the duty ratio is increased in two increments, slowly decreased, sharply increased again at the end part of shifting, and then maintained at this level until the end of shifting.

Figure 32F:

The fifth solenoid valve S5, as shown in FIG. 32F, is maintained in an "OFF" state.

Figure 32G:
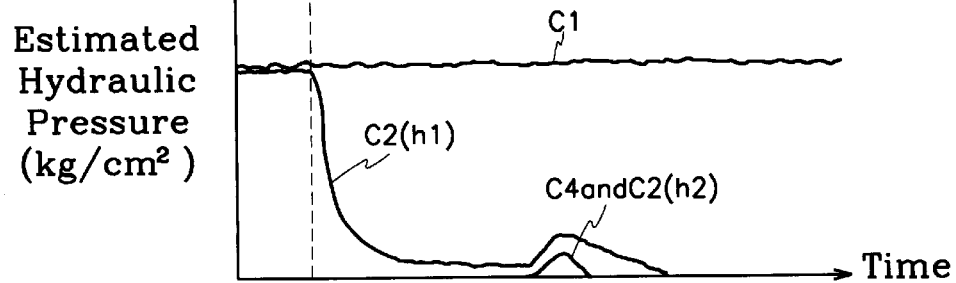

As shown in FIG. 32G, the hydraulic pressure of the first friction element C1 is maintained at a high level throughout shifting, and the hydraulic pressure of the operational side chamber h1 of the second friction element C2 is drastically decreased at the beginning of shifting. After being maintained in this low level, the hydraulic pressure of the operational side chamber h1 of the second friction element C2 is slightly increased toward the end of shifting, slowly decreased again, and completely discontinued at the end of shifting. The hydraulic pressure of the fourth friction element C4 and the release side chamber h2 of the second friction element C2 are slightly supplied at the point the above the hydraulic pressure of the operational side chamber h1 of the second friction element C2 is increased, and are then discontinued.

Figure 33:
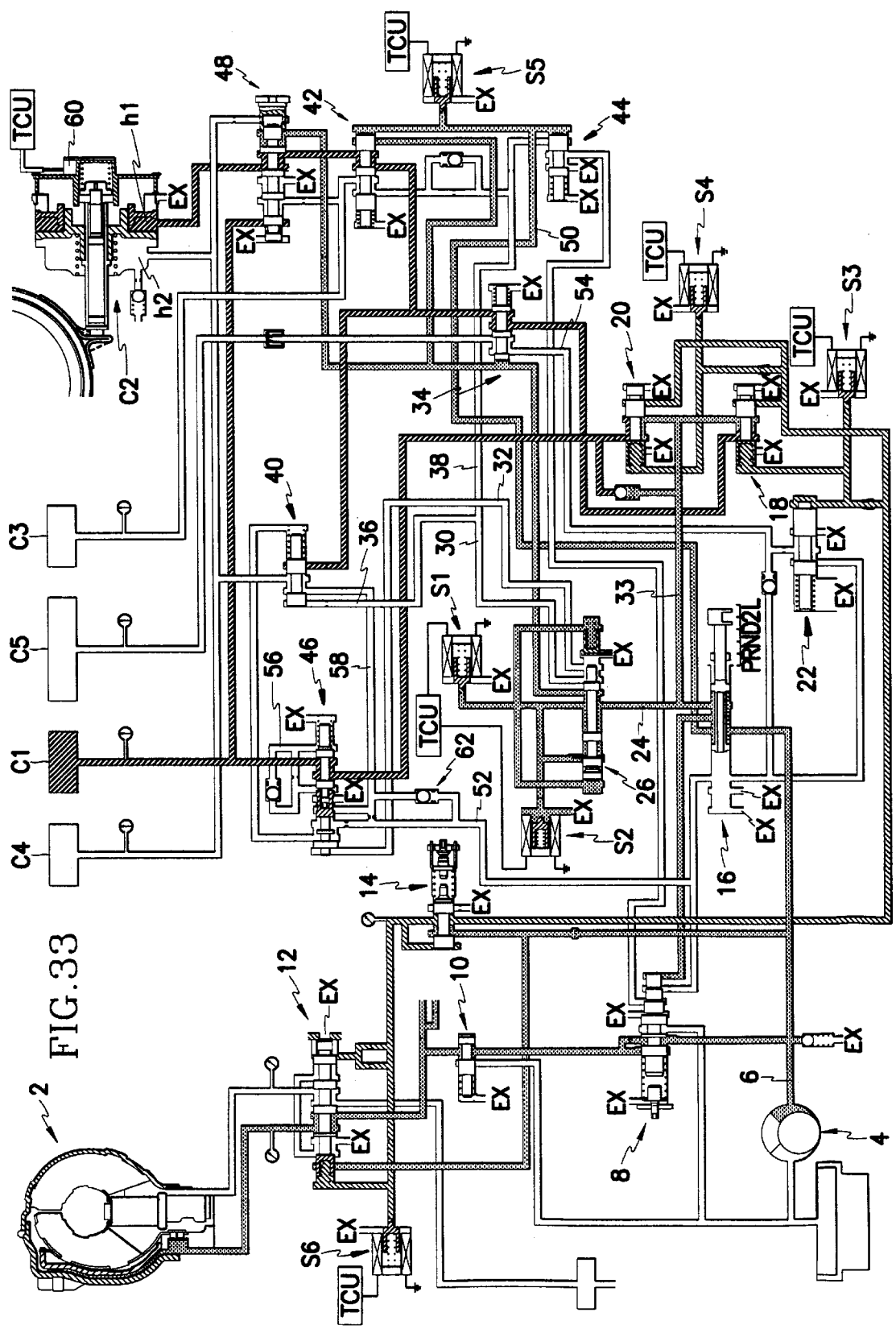
FIG. 33 is a view illustrating a state in which hydraulic pressure flows when manually shifting from the neutral "N" range to the second speed stage of the drive "D" range.

Referring to FIG. 33, when manually shifting from the neutral "N" range to the second drive "2" range, the first solenoid valve S1 is controlled to "OFF" and the second solenoid valve S2 is controlled to "ON."

As a result, hydraulic pressure is supplied to the second speed line 28, controlling the 1-2 shift valve 34, and, simultaneously, is standing by at the fail-safe valve 48.

Also, the third and fourth solenoid valves S3 and S4 are duty controlled, and the hydraulic pressure supplied to the first speed line 33 is controlled to be supplied as control pressure to the operational side chamber h2 of the second friction element C2 and the first friction element C1 to realize shifting. After shifting is completed as in the above, the third and fourth solenoid valves S3 and S4 are controlled to "OFF," and the above control pressure is converted to second speed pressure to complete shifting.

Figure 34A:
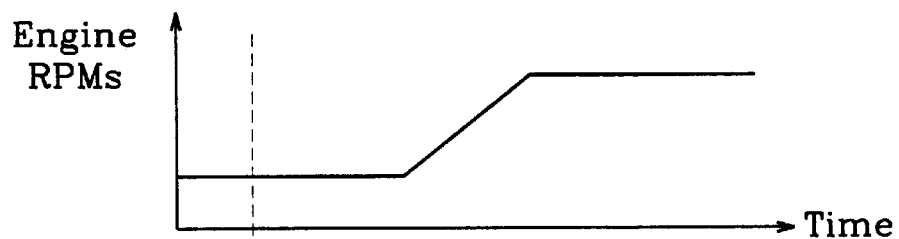
FIGS. 34A–34G are operational state views and hydraulic pressure graphs of when manually shifting from the neutral "N" range to the second speed stage.
Figure 34B:
Figure 34C:
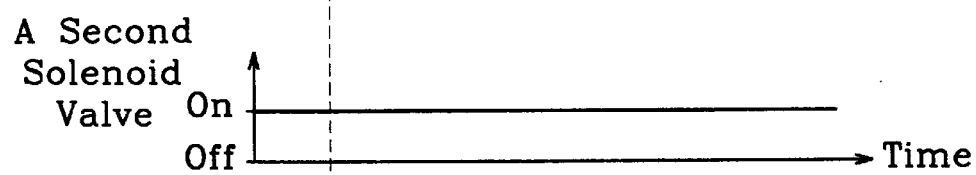
Figure 34D:
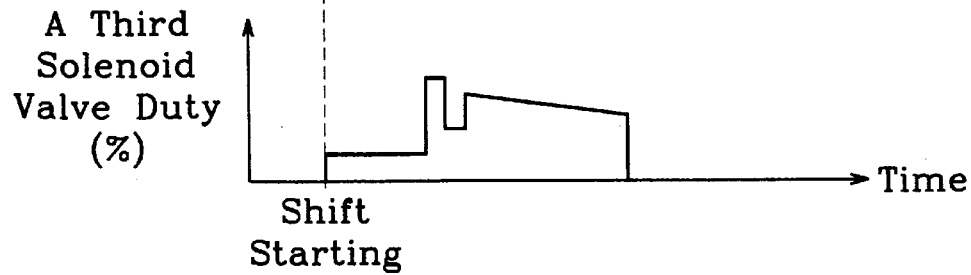
Figure 34E:
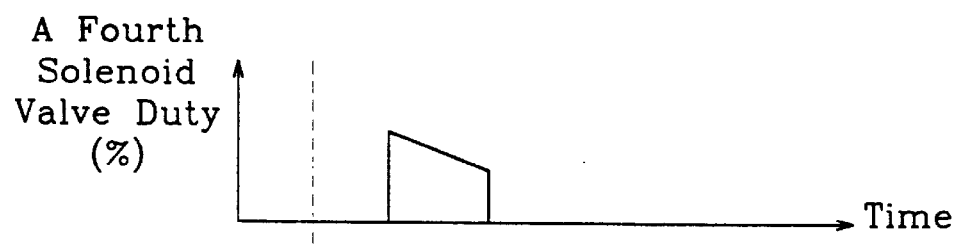

Referring to FIGS. 34B–34F, there is graphically shown the operation of each solenoid valve when shifting from the neutral "N" range to the second drive "2" range. The first solenoid valve S1 is maintained in an "OFF" state as shown in FIG. 34B, the second solenoid valve S2 is maintained in an "ON" state as shown in FIG. 34C, and the third and fourth solenoid valves S3 and S4 are duty controlled as shown in FIGS. 34D and 34E.

As shown in FIG. 34D, the duty ratio of the third solenoid valve S3 is increased slightly at the beginning of shifting, and is maintained at this level for a fixed period of time. It is then sharply raised, lowered, raised again, and after which it is slowly reduced until the end of shifting where duty control is discontinued.

Figure 34F:

The duty ratio of the fourth solenoid valve S4, as shown in FIG. 34E, is increased at the end portion of the beginning of shifting. The fifth solenoid valve S5 is controlled to "OFF" as shown in FIG. 34F.

Figure 34G:
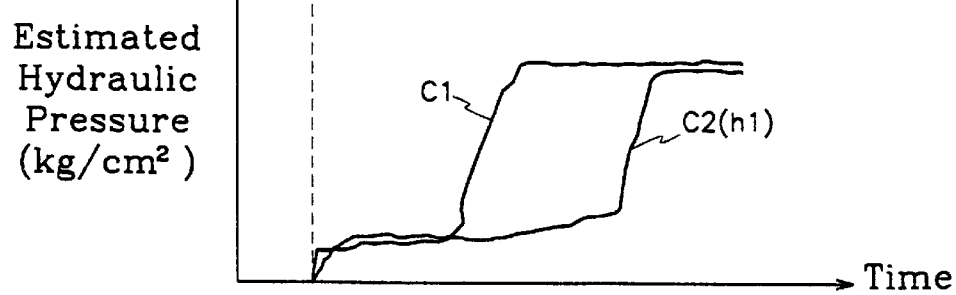

As a result of the above and as shown in FIG. 34G, the hydraulic pressure of the first friction element C1 and the operational side chamber h1 of the second friction element C2 are slowly supplied at the beginning of shifting, and the pressure of the first friction element C1 is sharply increased after a short period of time at the beginning portion of shifting. Then, the hydraulic pressure at the operational side chamber h1 of the second friction element C2 is sharply increased toward the end portion of shifting. FIG. 34A illustrates the change in engine rpm during the shifting operation discussed above.

Figure 35:
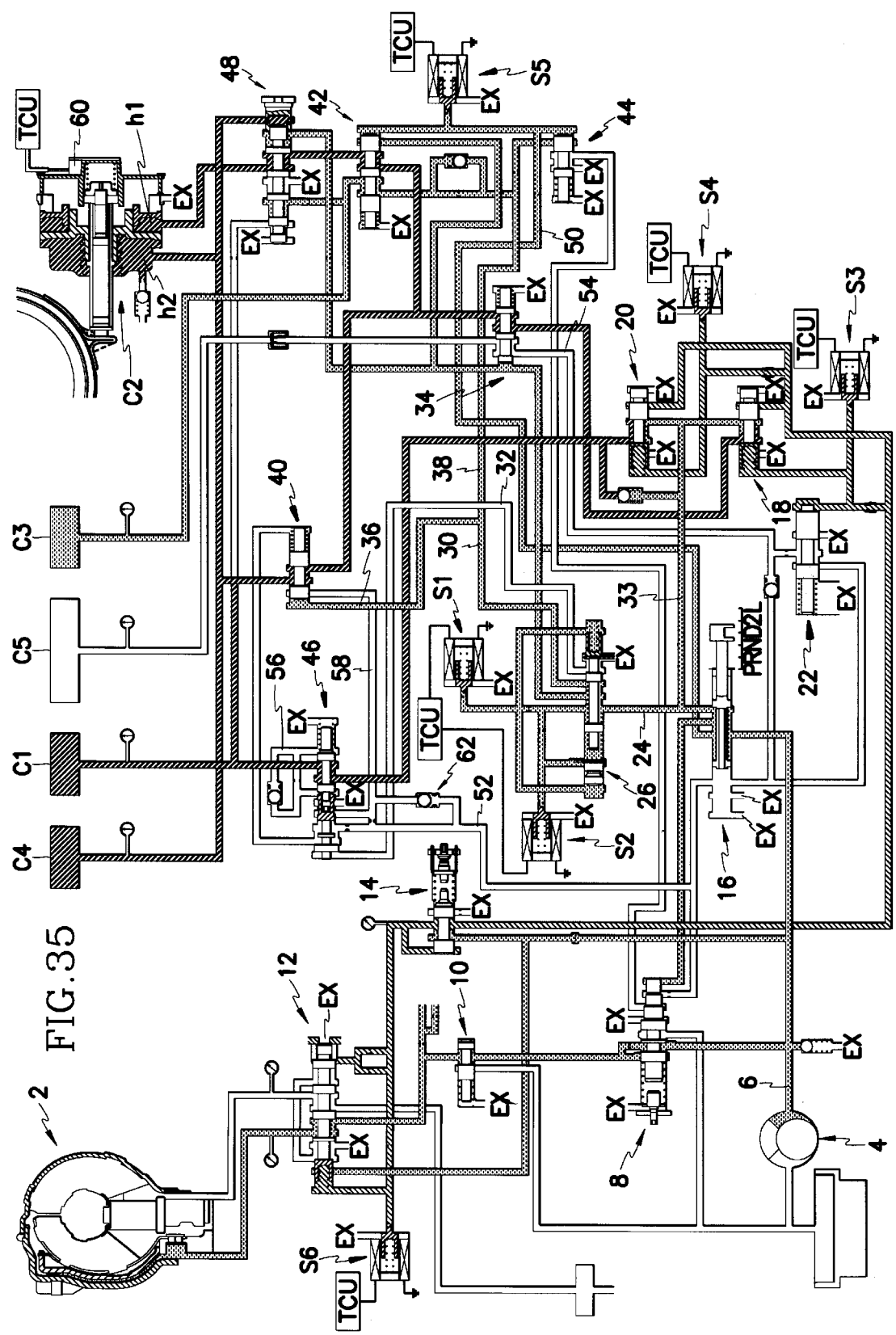
FIG. 35 is a view illustrating a state in which hydraulic pressure flows when manually shifting from the neutral "N" range to the second speed stage of the drive "D" range.

Referring to FIG. 35, when manually shifting from the neutral "N" range to the third drive "3" range, the first and second solenoid valve S1 and S2 are maintained in "OFF" states.

As a result, hydraulic pressure is supplied to the second and third speed lines 28 and 30 to control the 1-2 shift valve 34 and the 2-3/4-3 shift valve 40, and, at the same time, third speed pressure is supplied to the third friction element C3.

Also, the third and fourth solenoid valves S3 and S4 are duty controlled to control the hydraulic pressure being supplied to the first speed line 33, to supply control pressure to the operational side chamber h2 of the second friction element C2, and to supply control pressure to the release side chamber h2 of the second friction element C2 and the first friction element C1; thereby realizing shifting.

After shifting is completed as in the above, the third and fourth solenoid valves S3 and S4 are controlled to "OFF," and the above control pressure is converted to second speed pressure to complete shifting.

Figure 36A:
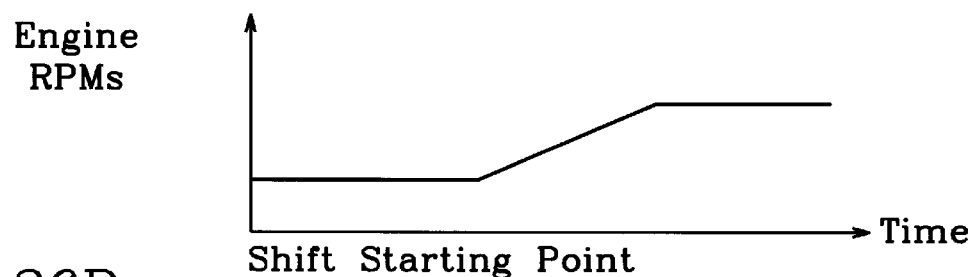
FIGS. 36A–36G are operational state views and hydraulic pressure graphs of when manually shifting from the neutral "N" range to the third speed stage.
Figure 36B:
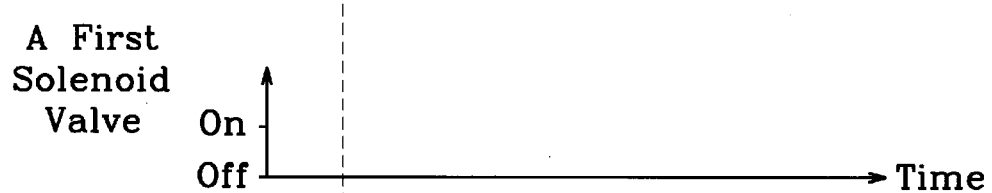
Figure 36C:
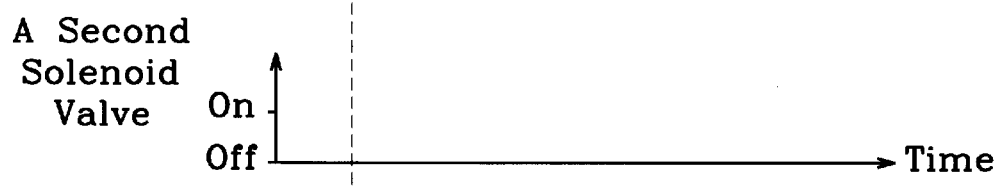
Figure 36D:
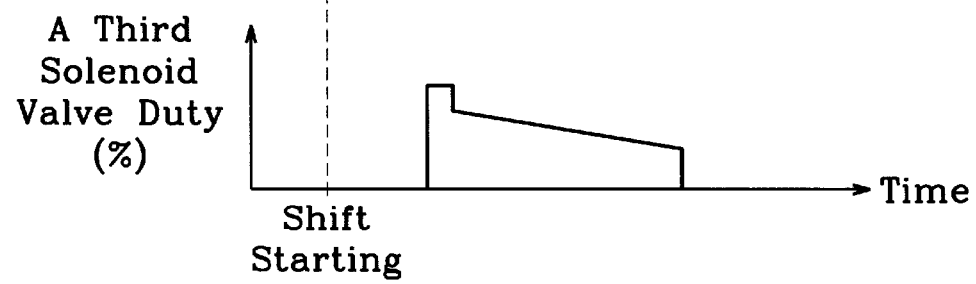
Figure 36E:
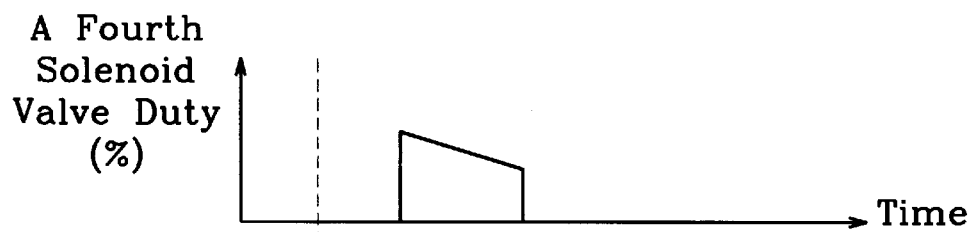

Referring to FIGS. 36B–36F, the operation of each solenoid valve is shown when shifting from the neutral "N" range to the third drive "3" range. The first solenoid valve S1 is maintained in an "OFF" state as shown in FIG. 36B, the second solenoid valve S2 is maintained in an "ON" state as shown in FIG. 36C, and the third and fourth solenoid valves S3 and S4 are duty controlled as shown in FIGS. 36D and 36E.

As shown in FIG. 36D, the duty ratio of the third solenoid valve S3 is sharply raised at the end part of the beginning of shifting, and after a short period of time, it is slightly decreased. From this state, the duty ratio is slowly decreased until the end of shifting where it is discontinued.

Figure 36F:

Referring to FIG. 36E, the duty ratio of the fourth solenoid valve S4 is increased at the end part of the beginning of shifting, and for a fixed amount of time, it is slowly decreased. Then the duty ratio is discontinued. The fifth solenoid valve S5, as shown in FIG. 36F is maintained in an "OFF" state until the end point of shifting, where it is controlled to "ON" to change line pressure.

Figure 36G:
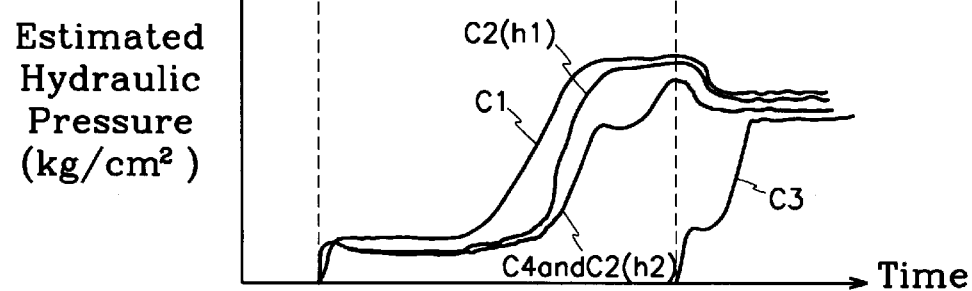

As a result of the above, and as shown in FIG. 36G, the hydraulic pressures of the first friction element C1, the operational side chamber h1 of the second friction element C2, the fourth friction element C4 and the release side chamber h2 of the second friction element C2 are slowly supplied starting from the beginning of shifting, raised sharply at the middle portion of shifting, and slightly decreased at the end of shifting as a result of the change in line pressure. The operational pressure of the third friction element C3 is supplied by the "ON" control of the fifth solenoid valve S5.

Figure 37A:
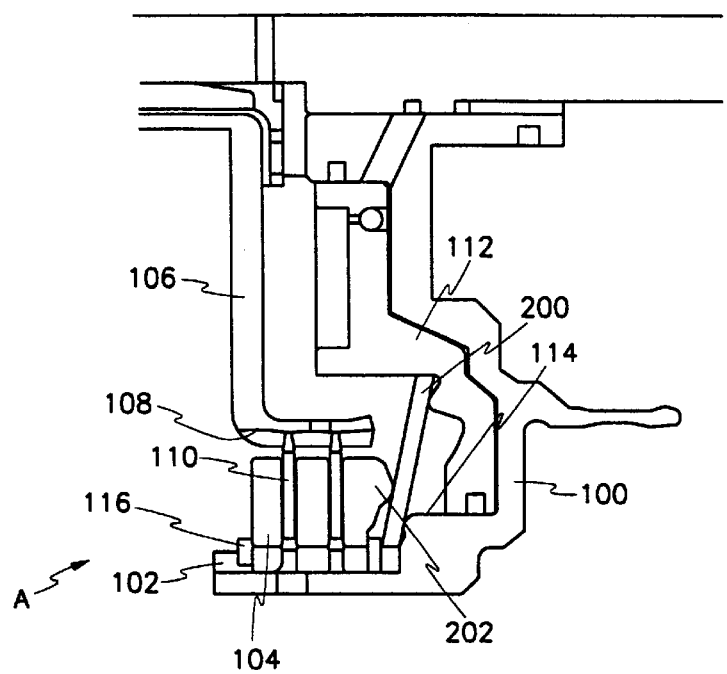
FIGS. 37A–37B are sectional views of a friction element according to the present invention.
Figure 37B:
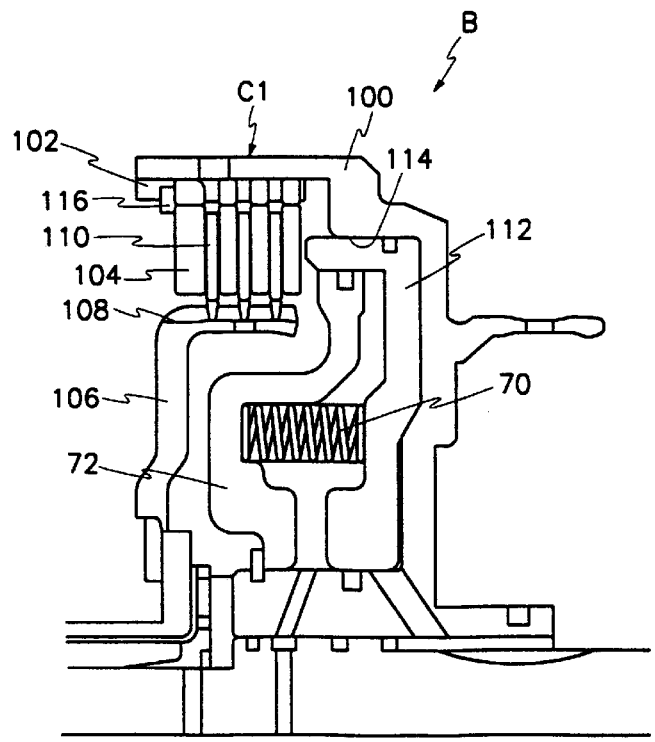

Referring now to FIGS. 37A and 37B, FIG. 37A illustrates the prior art friction element and FIG. 37B illustrates the structure of the friction element according to the present invention. Like reference numbers will be used for the same parts in both the friction elements.

Namely, a rear clutch, which is the first friction element C1, includes a plurality of clutch plates 104 mounted on an inner wheel irregular portion 108 of a clutch retainer 100, and clutch discs 110 mounted between the clutch plates 104 and on an outer wheel irregular portion 102 of a hub 106.

Also, a piston 112 is mounted on an inner side of the clutch retainer 100. The piston 112 is operated when hydraulic pressure is supplied inside a cylinder 114. The operation of the cylinder 114 pushes the clutch plates 104 which, in turn, compresses the clutch discs 110 to realize the transmission of motive power.

The clutch plate 104 located on the far outside is prevented from becoming detached by a snap ring 116, and frictional material is adhered to both sides of the clutch discs 110.

As shown in FIG. 37A, the prior art differs from the present invention in that a plate spring 200 is mounted between the piston 112 and the clutch retainer 100. A center portion of the plate spring 200 is supported by a protrusion portion 202 of the innermost clutch plate 104, and this center portion of the plate spring 200 acts as an operational point in this structure.

As a result of the above, when the piston 112 is advanced through the supply of hydraulic pressure, the clutch plates 104 are pushed by the operation of the plate spring 200, and operation of the clutch is realized.

However, because of the centrifugal force created when using the above structure, there is the possibility of the first friction element C1 malfunctioning when shifting from the fourth speed stage to the second speed stage.

Accordingly, in the present invention, as shown in FIG. 37B, a coil spring 70 and a balance device 72 are used instead of the plate spring 200 of the prior art.

The above balance device 72 is mounted to the inside of the piston 112, and the coil spring 70 is elastically supported between the balance device 72 and the piston 112.

As a result of the above structure, the piston 112 is returned by the elastic force of the coil spring 70, and the problem created by the centrifugal force is solved by the balance device 72 such that control of the first friction element C1 is easily achieved.

Also, a fail-safe valve 48 is used in the hydraulic pressure control system of the present invention, and because the hydraulic pressure supplied to each friction element operates as a control pressure on the fail-safe valve 48, even when any or all of the solenoid valves are controlled to "OFF" by a malfunctioning TCU, the third speed is held and the fail-safe functions are executed.

Namely, even if there arises a malfunctioning problem in any of the shift stages, the third speed is held and fail safe functions are performed.

As explained above, in the hydraulic control system of the present invention, when shifting from the third speed stage to the fourth speed stage or from the third speed stage to the second speed stage, the creation of centrifugal force is minimized, and damage to the friction elements is prevented. Also, responsiveness is improved when shifting from the fourth speed stage to the second speed stage.

When controlling line pressure changes, as independent control is realized with the damper clutch, control of line pressure is easy. Further fail-safe functions are able to be performed to prevent the brief entry into a neutral state when shifting from the fourth speed stage to the second speed stage and when shifting from the second speed stage to the fourth speed stage, and the fail-safe functions reduce shift shock when shifting from the fourth speed stage to the third speed stage.

Finally, for improving convenience to the driver, the level of transmission oil is able to be checked in the parking "P" range.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A hydraulic control system for an automatic transmission having a plurality of friction elements, comprising:
   pressure regulating means for regulating hydraulic pressure produced by an oil pump;
   a plurality of valves selectively supplying hydraulic pressure to said plurality of friction elements;
   pressure control means for controlling and selectively supplying said regulated hydraulic pressure to a plurality of pressure control lines and at least one of said plurality of valves, said pressure control lines being operationally connected to said plurality of valves;
   said plurality of valves including,
     a first valve operationally controlled by hydraulic pressure in a first one of said pressure control lines to pass said hydraulic pressure output by said pressure control means to at least one of said plurality of friction elements in each operational range except a first speed stage of a drive range,
     a second valve operationally controlled by hydraulic pressure in a second one and third one of said pressure control lines to selectively pass said hydraulic pressure output from said first valve to a first and second friction element in said drive range, and
     a control switch valve operationally controlled by a fourth one of said pressure control lines to selectively supply hydraulic pressure from at least one of said first and second pressure control lines and said first valve to said second friction element in second, third and fourth speed stages of said drive range, and to a third friction element in said third and fourth speed stages of said drive range.

2. The hydraulic control system of claim 1, further comprising:
   a solenoid valve controlling pressure in said fourth pressure control line to control operation of said control switch valve.

3. The hydraulic control system of claim 1, wherein
   said second friction element has an operational side chamber and a release side chamber; and
   said second valve supplies hydraulic pressure to said release side chamber of said second friction element; and said control switch valve supplies hydraulic pressure to said operation side chamber of said second friction element.

4. The hydraulic control system of claim 1, further comprising:

damper clutch control means for controlling a damper clutch of a torque converter operationally connected to said automatic transmission.

5. The hydraulic control system of claim 1, further comprising:

a high-low pressure valve which increases pressure of said regulated pressure supplied by said pressure regulating means after completion of shifting to said third and fourth speed stages of said drive range.

6. The hydraulic control system of claim 1, further comprising:

fail safe means, operationally connected to at least one of said plurality of valves and at least one of said plurality of friction elements, for setting said third speed stage of said drive range if said hydraulic control system malfunctions.

7. The hydraulic control system of claim 1, further comprising:

a release valve operationally connected to said plurality of valves and operationally control led by hydraulic pressure in said third pressure control line to causes said plurality of valves to selectively supply hydraulic pressure to said first and second friction elements and a fourth one of said plurality of friction elements in a reverse range.

8. The hydraulic control system of claim 1, further comprising:

a high-low pressure valve operationally controlled by hydraulic pressure supplied by said fourth pressure control line to increase pressure of said regulated pressure supplied by said pressure regulating means after completion of shifting to said third and fourth speed stages of said drive range; and a solenoid valve controlling pressure in said fourth pressure control line to control operation of said switch control valve and said high-low valve.

9. The hydraulic control system of claim 1, wherein said second valve selectively, simultaneously supplies said hydraulic pressure output from said first valve to said first and second friction elements in said drive range.

10. The hydraulic control system of claim 1, wherein said pressure control means comprises:

automatic shift control means for selectively supplying hydraulic pressure to said first, second and third pressure control lines; and manual shift control means for controlling, in response to manual input, supply of said regulated hydraulic pressure to said automatic shift control means and said fourth pressure control line.

11. The hydraulic control system of claim 10, further comprising:

a high-low pressure valve operationally controlled by hydraulic pressure supplied by said fourth pressure control line to increase pressure of said regulated pressure supplied by said pressure regulating means after completion of shifting to said third and fourth speed stages of said drive range; and a solenoid valve controlling pressure in said fourth pressure control line to control operation of said switch control valve and said high-low valve.

12. The hydraulic control system of claim 10, wherein said pressure control means further comprises:

solenoid control means for controlling a pressure of said regulated hydraulic pressure supplied to said first valve.

* * * * *